(12) United States Patent
Sampath

(10) Patent No.: US 9,352,276 B2
(45) Date of Patent: *May 31, 2016

(54) EXHAUST MIXING DEVICE

(71) Applicant: Tenneco Automotive Operating Company Inc., Lake Forest, IL (US)

(72) Inventor: Manoj Sampath, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/486,213

(22) Filed: Sep. 15, 2014

(65) Prior Publication Data
US 2015/0071825 A1    Mar. 12, 2015

Related U.S. Application Data

(63) Continuation-in-part of application No. 14/165,923, filed on Jan. 28, 2014, which is a continuation-in-part of application No. 13/958,955, filed on Aug. 5, 2013, which is a continuation-in-part of application No. 13/888,861, filed on May 7, 2013.

(51) Int. Cl.
*B01D 50/00* (2006.01)
*B01D 53/92* (2006.01)
*B01F 5/04* (2006.01)
(Continued)

(52) U.S. Cl.
CPC ............ *B01D 53/92* (2013.01); *B01F 3/04049* (2013.01); *B01F 5/0451* (2013.01); *B01F 5/0606* (2013.01); *B01F 5/0616* (2013.01); *B01F 5/0688* (2013.01); *F01N 3/021* (2013.01); *F01N 3/106* (2013.01); *F01N 3/2066* (2013.01); *F01N 3/2892* (2013.01); *F01N 13/009* (2014.06); *F01N 13/0097* (2014.06); *F01N 3/2093* (2013.01); *F01N 2470/02* (2013.01); *F01N 2470/18* (2013.01); *F01N 2560/026* (2013.01); *F01N 2610/02* (2013.01); *F01N 2610/1453* (2013.01); *Y02T 10/24* (2013.01)

(58) Field of Classification Search
CPC . F01N 2470/19; F01N 2610/02; F01N 3/021; F01N 13/0097; B01F 3/04049; B01F 5/0451
USPC .......................................... 422/170, 176, 177
See application file for complete search history.

(56) References Cited

U.S. PATENT DOCUMENTS 3,544,290 A    12/1970    Larson et al.
3,549,333 A    12/1970    Tabak
(Continued)

FOREIGN PATENT DOCUMENTS

DE    4025017 A1    2/1992
DE    4307525 A1    9/1994
(Continued)

*Primary Examiner* — Tom P Duong
(74) *Attorney, Agent, or Firm* — Harness, Dickey & Pierce, P.L.C.

(57) ABSTRACT

A swirl device for intermixing a reagent exhaust treatment fluid and an exhaust produced by an engine. The swirl device includes a cylindrical tube defining an inlet for receipt of the reagent exhaust treatment fluid and the exhaust, and a swirl member attached to the cylindrical tube. The swirl member conically expands outward from the cylindrical tube and includes a plurality of tabs separated by elongate slots. The plurality of tabs are configured to swirl and intermingle the reagent exhaust treatment fluid and the exhaust.

26 Claims, 56 Drawing Sheets

(51) Int. Cl.
*B01F 5/06* (2006.01)
*B01F 3/04* (2006.01)
*F01N 3/10* (2006.01)
*F01N 3/20* (2006.01)
*F01N 3/28* (2006.01)
*F01N 3/021* (2006.01)
*F01N 13/00* (2010.01)

(56) References Cited

U.S. PATENT DOCUMENTS

| | | |
|---|---|---|
| 3,643,623 A | 2/1972 | Eng et al. |
| 3,756,575 A | 9/1973 | Cottell |
| 4,011,922 A | 3/1977 | Goplen |
| 4,209,493 A | 6/1980 | Olson |
| 4,300,924 A | 11/1981 | Coyle |
| 4,538,413 A | 9/1985 | Shinzawa et al. |
| 4,541,239 A | 9/1985 | Tokura et al. |
| 4,571,938 A | 2/1986 | Sakurai |
| 4,576,617 A | 3/1986 | Renevot |
| 4,604,868 A | 8/1986 | Nomoto et al. |
| 4,725,223 A | 2/1988 | Coppin et al. |
| 4,840,028 A | 6/1989 | Kusuda et al. |
| 4,912,920 A | 4/1990 | Hirabayashi |
| 4,951,464 A | 8/1990 | Eickhoff et al. |
| 4,987,738 A | 1/1991 | Lopez-Crevillen et al. |
| 4,989,408 A | 2/1991 | Leonhard et al. |
| 5,094,075 A | 3/1992 | Berendes |
| 5,105,621 A | 4/1992 | Simmons et al. |
| 5,140,814 A | 8/1992 | Kreutmair et al. |
| 5,272,871 A | 12/1993 | Oshima et al. |
| 5,320,523 A | 6/1994 | Stark |
| 5,339,630 A | 8/1994 | Pettit |
| 5,426,269 A | 6/1995 | Wagner et al. |
| 5,826,428 A | 10/1998 | Blaschke |
| 5,829,248 A | 11/1998 | Clifton |
| 5,832,720 A | 11/1998 | Svahn |
| 6,158,214 A | 12/2000 | Kempka et al. |
| 6,312,650 B1 | 11/2001 | Frederiksen et al. |
| 6,314,722 B1 | 11/2001 | Matros et al. |
| 6,449,947 B1 | 9/2002 | Liu et al. |
| 6,712,869 B2 | 3/2004 | Cheng et al. |
| 6,722,123 B2 | 4/2004 | Liu et al. |
| 6,722,124 B2 | 4/2004 | Pawson et al. |
| 7,712,305 B2 | 5/2010 | Kapsos et al. |
| 7,748,212 B2 | 7/2010 | Sedlacek et al. |
| 7,849,676 B2 | 12/2010 | Witte-Merl |
| 7,856,807 B2 | 12/2010 | Gibson |
| 7,896,645 B2 | 3/2011 | Loving |
| 7,908,847 B2 | 3/2011 | Crawley et al. |
| 7,980,069 B2 | 7/2011 | Arellano et al. |
| 8,033,104 B2 | 10/2011 | Zhang |
| 8,141,353 B2 | 3/2012 | Zheng et al. |
| 8,146,343 B2 | 4/2012 | Patterson et al. |
| 8,173,088 B2 | 5/2012 | Makartchouk et al. |
| 8,240,137 B2 | 8/2012 | Liu et al. |
| 8,695,330 B2 | 4/2014 | Davidson et al. |
| 8,745,979 B2 | 6/2014 | Sedlacek et al. |
| 8,938,954 B2 | 1/2015 | De Rudder et al. |
| 2003/0079467 A1 | 5/2003 | Liu et al. |
| 2006/0115402 A1 | 6/2006 | Sun et al. |
| 2009/0019843 A1 | 1/2009 | Levin et al. |
| 2009/0255242 A1 | 10/2009 | Paterson et al. |
| 2009/0313979 A1 | 12/2009 | Kowada |
| 2010/0139258 A1 | 6/2010 | Hackett et al. |
| 2010/0223916 A1 | 9/2010 | Hayashi et al. |
| 2011/0041478 A1 | 2/2011 | Lee et al. |
| 2011/0083428 A1 | 4/2011 | Makartchouk |
| 2011/0099978 A1 | 5/2011 | Davidson et al. |
| 2011/0308234 A1 | 12/2011 | De Rudder et al. |
| 2012/0227390 A1 | 9/2012 | Wikaryasz et al. |
| 2012/0260635 A1 | 10/2012 | Aneja et al. |
| 2013/0170973 A1 | 7/2013 | Staskowiak et al. |
| 2013/0333363 A1 | 12/2013 | Joshi et al. |

FOREIGN PATENT DOCUMENTS

| | | |
|---|---|---|
| DE | 4417238 A1 | 9/1994 |
| DE | 4440716 A1 | 7/1996 |
| DE | 102004000066 A1 | 6/2006 |
| DE | 102009036511 A1 | 2/2011 |
| EP | 0470361 A1 | 2/1992 |
| EP | 0555746 A1 | 8/1993 |
| EP | 2749748 A1 | 7/2014 |
| GB | 2381218 A | 4/2003 |
| JP | S59-174310 U | 11/1984 |
| JP | H01-130009 A | 5/1989 |
| JP | H05-332130 A | 12/1993 |
| JP | H10-259712 A | 9/1998 |
| JP | H11-117729 A | 4/1999 |
| JP | 2000145434 A | 5/2000 |
| JP | 2003074335 A | 3/2003 |
| JP | 2009103019 A | 5/2009 |
| JP | 2011064069 A | 3/2011 |
| JP | 2011519400 A | 7/2011 |
| JP | H05288047 A | 2/2013 |
| WO | WO-9612877 A1 | 5/1996 |
| WO | WO-2008030259 A1 | 3/2008 |
| WO | WO-2008112343 A2 | 9/2008 |
| WO | WO-2012044233 | 4/2012 |
| WO | WO-2013048309 A1 | 4/2013 |

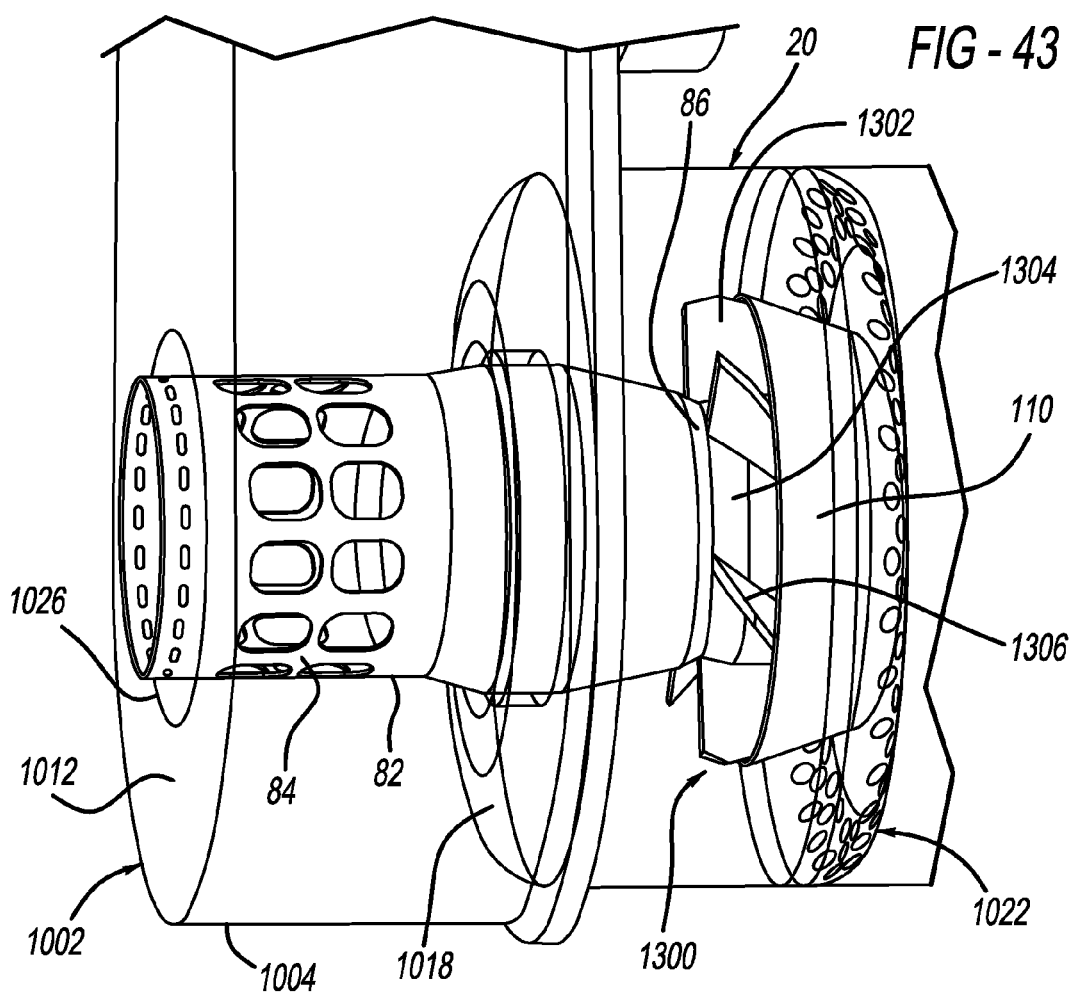
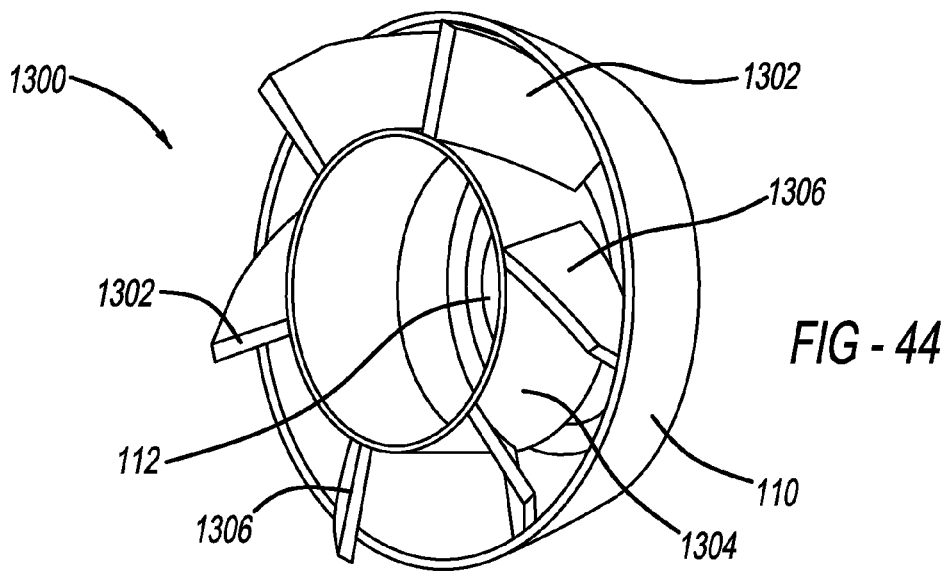

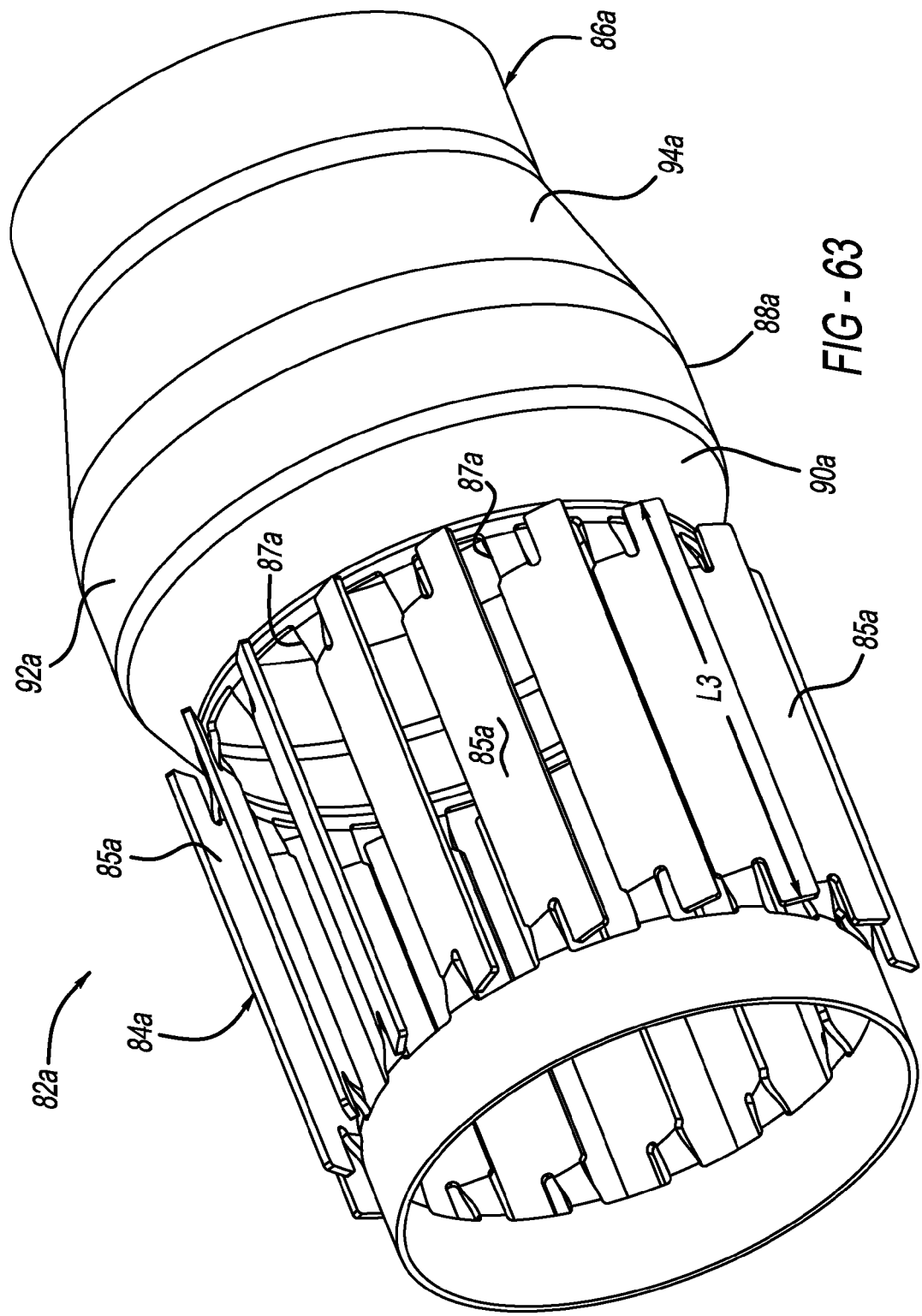

EXHAUST MIXING DEVICE

CROSS-REFERENCE TO RELATED APPLICATIONS

This application is a continuation-in-part of U.S. patent application Ser. No. 14/165,923 filed Jan. 28, 2014, which is a continuation-in-part of U.S. patent application Ser. No. 13/958,955 filed Aug. 5, 2013, which is a continuation-in-part of U.S. patent application Ser. No. 13/888,861 filed May 7, 2013. The entire disclosure of each of the above applications is incorporated herein by reference.

FIELD

The present disclosure relates to an exhaust after-treatment system including an exhaust gas mixing device.

BACKGROUND

This section provides background information related to the present disclosure which is not necessarily prior art.

Exhaust after-treatment systems may dose a reagent exhaust treatment fluid into the exhaust stream before the exhaust stream passes through various exhaust after-treatment components. A urea exhaust treatment fluid, for example, may be dosed into the exhaust stream before the exhaust passes through a selective catalytic reduction (SCR) catalyst. The SCR catalyst is most effective, however, when the exhaust has sufficiently mixed with the urea exhaust treatment fluid.

SUMMARY

This section provides a general summary of the disclosure, and is not a comprehensive disclosure of its full scope or all of its features.

The present disclosure provides a swirl device for intermixing a reagent exhaust treatment fluid and an exhaust produced by an engine. The swirl device includes a cylindrical tube defining an inlet for receipt of the reagent exhaust treatment fluid and the exhaust, and a swirl member attached to the cylindrical tube. The swirl member conically expands outward from the cylindrical tube and includes a plurality of tabs separated by elongate slots. The plurality of tabs are configured to swirl and intermingle the reagent exhaust treatment fluid and the exhaust.

The present disclosure also provides an exhaust treatment system for treating an exhaust produced by an engine including a first exhaust treatment component; a second exhaust treatment component; a common hood that fluidly and mechanically connects the first and second exhaust treatment components; and a dosing module mounted to the common hood at a position downstream from the first exhaust treatment component. The dosing module is operable to dose a reagent exhaust treatment fluid into the exhaust.

A cylindrical tube defines an inlet for receipt of the reagent exhaust treatment fluid and the exhaust, and a swirl member is attached to the cylindrical tube at a position upstream of the second exhaust treatment component. The swirl member conically expands outward from the cylindrical tube and including a plurality of tabs separated by elongate slots. The plurality of tabs are configured to swirl and intermingle the reagent exhaust treatment fluid and the exhaust.

The present disclosure also provides an exhaust treatment system for treating an exhaust produced by an engine including a first exhaust treatment component; a second exhaust treatment component; a common hood that fluidly and mechanically connects the first and second exhaust treatment components; and a dosing module mounted to the common hood at a position downstream from the first exhaust treatment component. The dosing module operable to dose a reagent exhaust treatment fluid into the exhaust.

A mixing assembly is located within the housing and positioned downstream from the dosing module. The mixing device includes a cylindrical tube defining an inlet for receipt of the reagent exhaust treatment fluid and the exhaust; a swirl member attached to the cylindrical tube at a position upstream of the second exhaust treatment component, the swirl member conically expanding outward from the cylindrical tube and including a plurality of tabs separated by elongate slots, the plurality of tabs being configured to swirl and intermingle the reagent exhaust treatment fluid and the exhaust; a decomposition tube having a first end and a second end, the first end being configured to receive the swirled and intermingled exhaust from the swirl member; and a flow reversing device disposed proximate the second end of the decomposition tube, the flow reversing device configured to direct a mixture of the exhaust and reagent exhaust treatment fluid as the mixture exits the second end of the decomposition tube in a direction back toward the first end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 43 is a is a perspective view of a mixing assembly according to a principle of the present disclosure;

FIG. 44 is a perspective view of a flow-reversing device according to a principle of the present disclosure;

Figure 45:
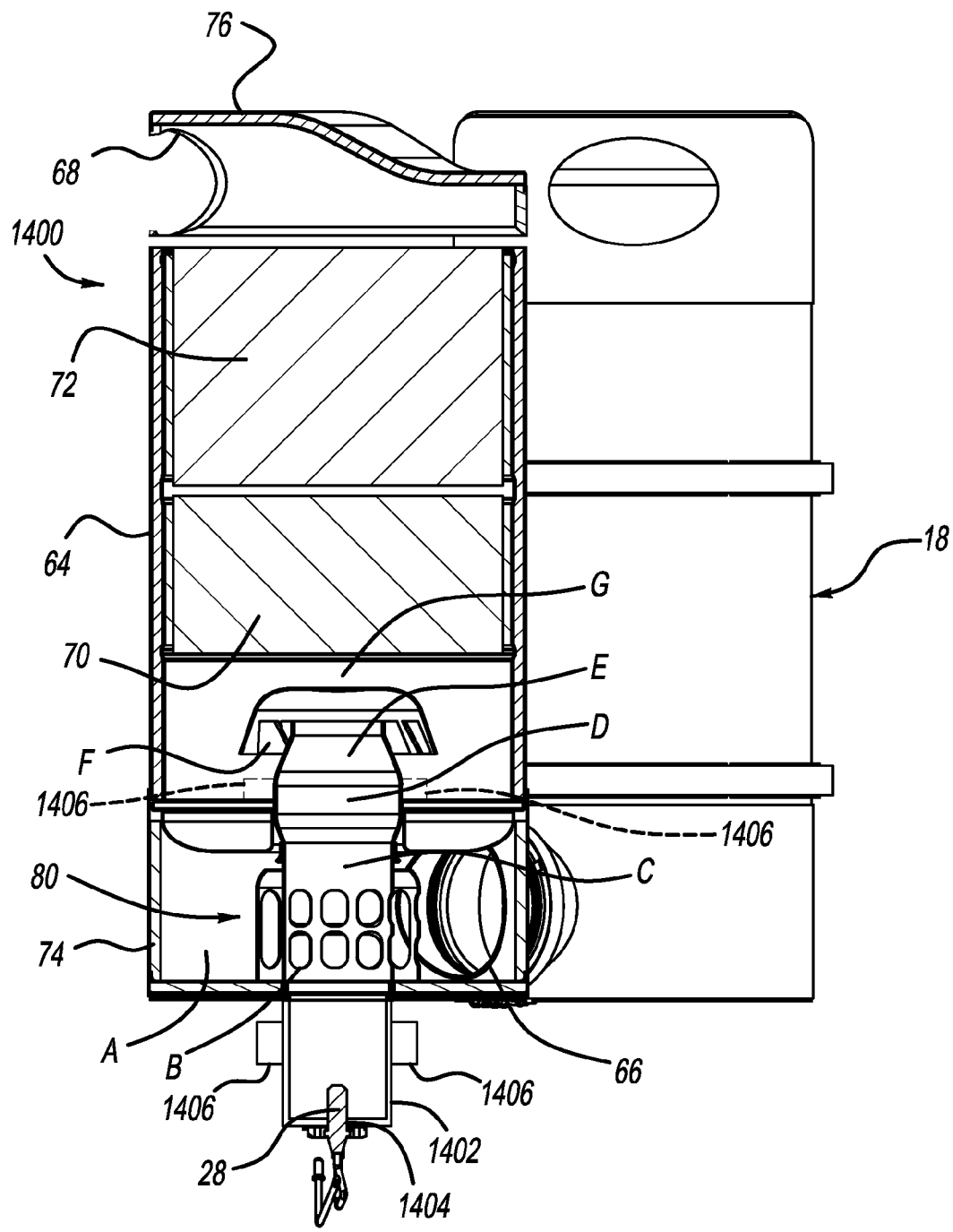
FIG. 45 illustrates an exhaust treatment component according to a principle of the present disclosure.
Figure 45A:
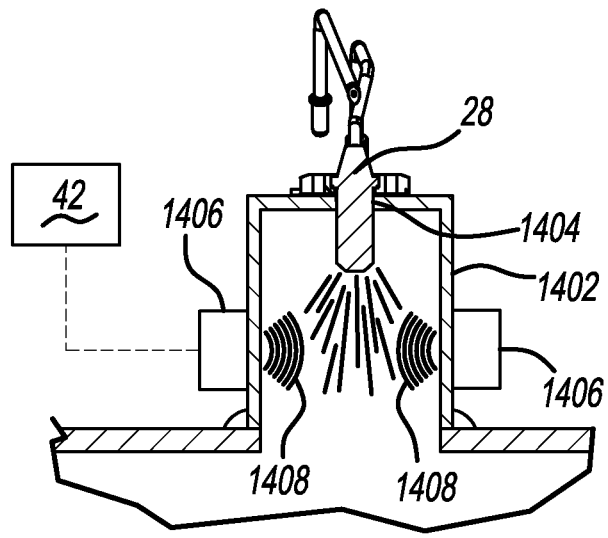
Figure 45B:
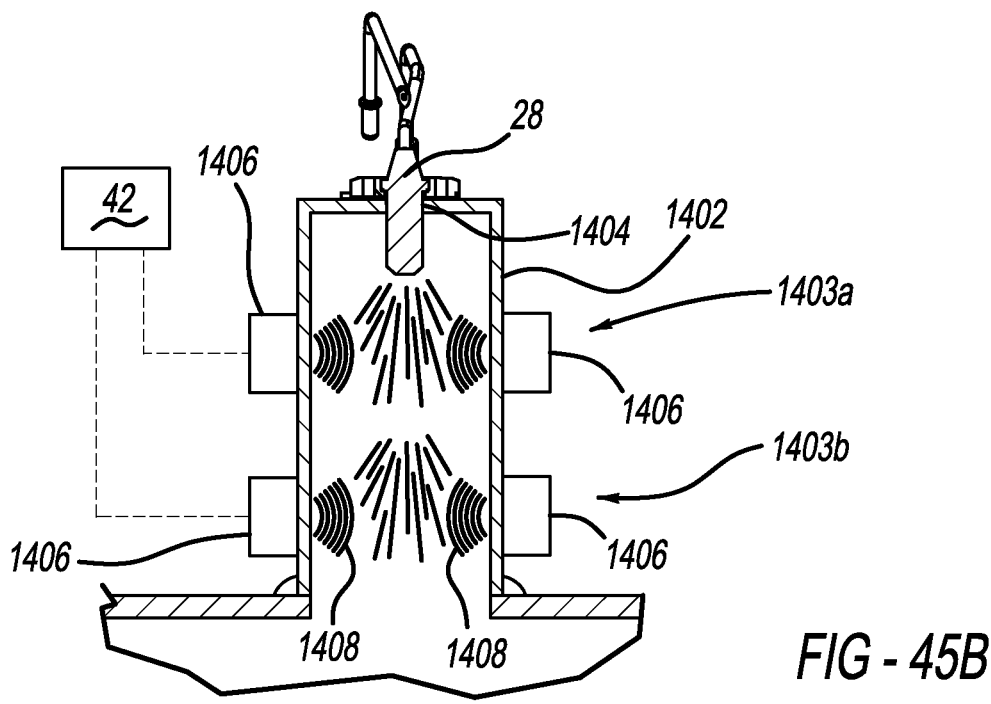
Figure 46:
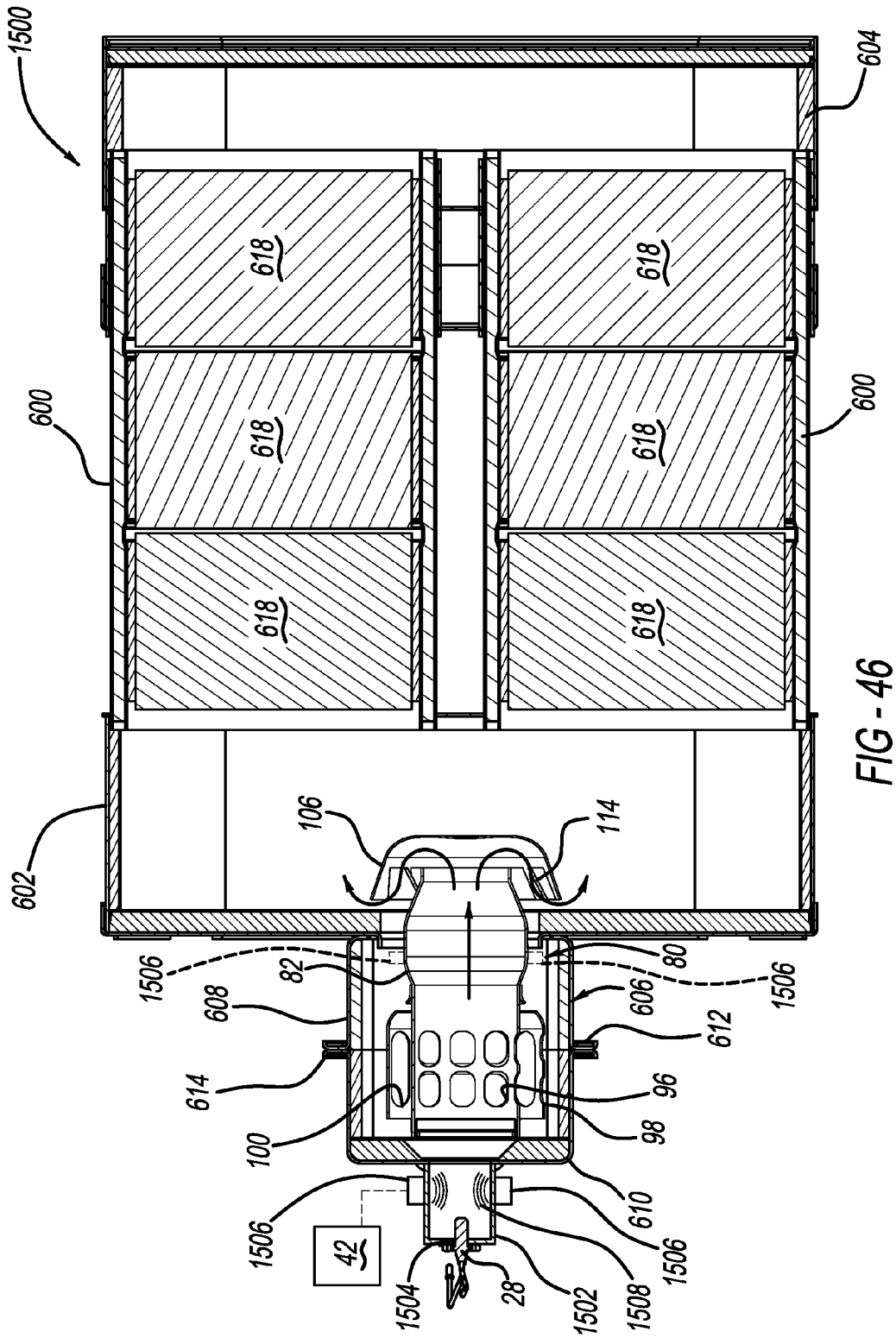
Figure 47:
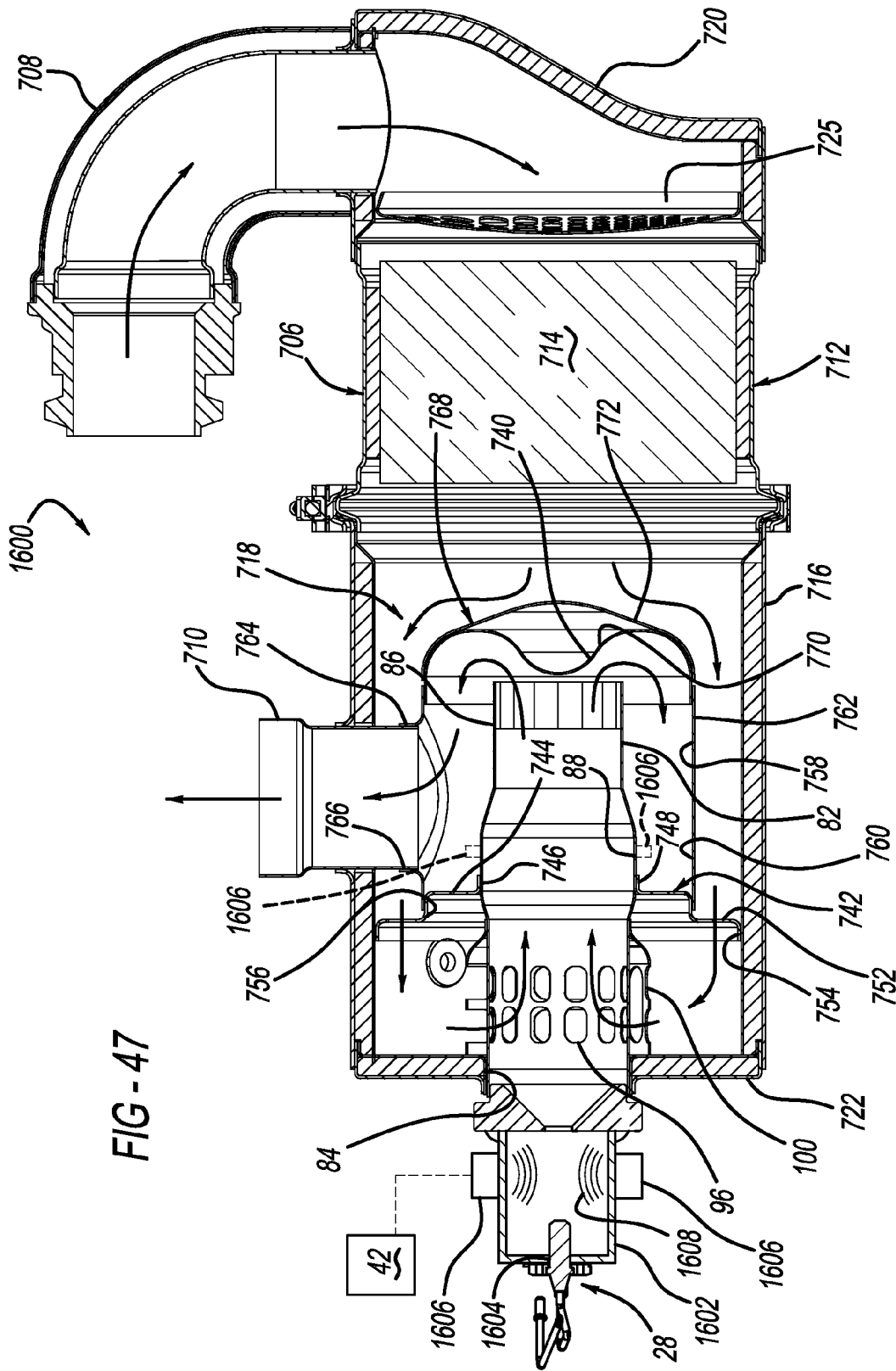
Figure 48:
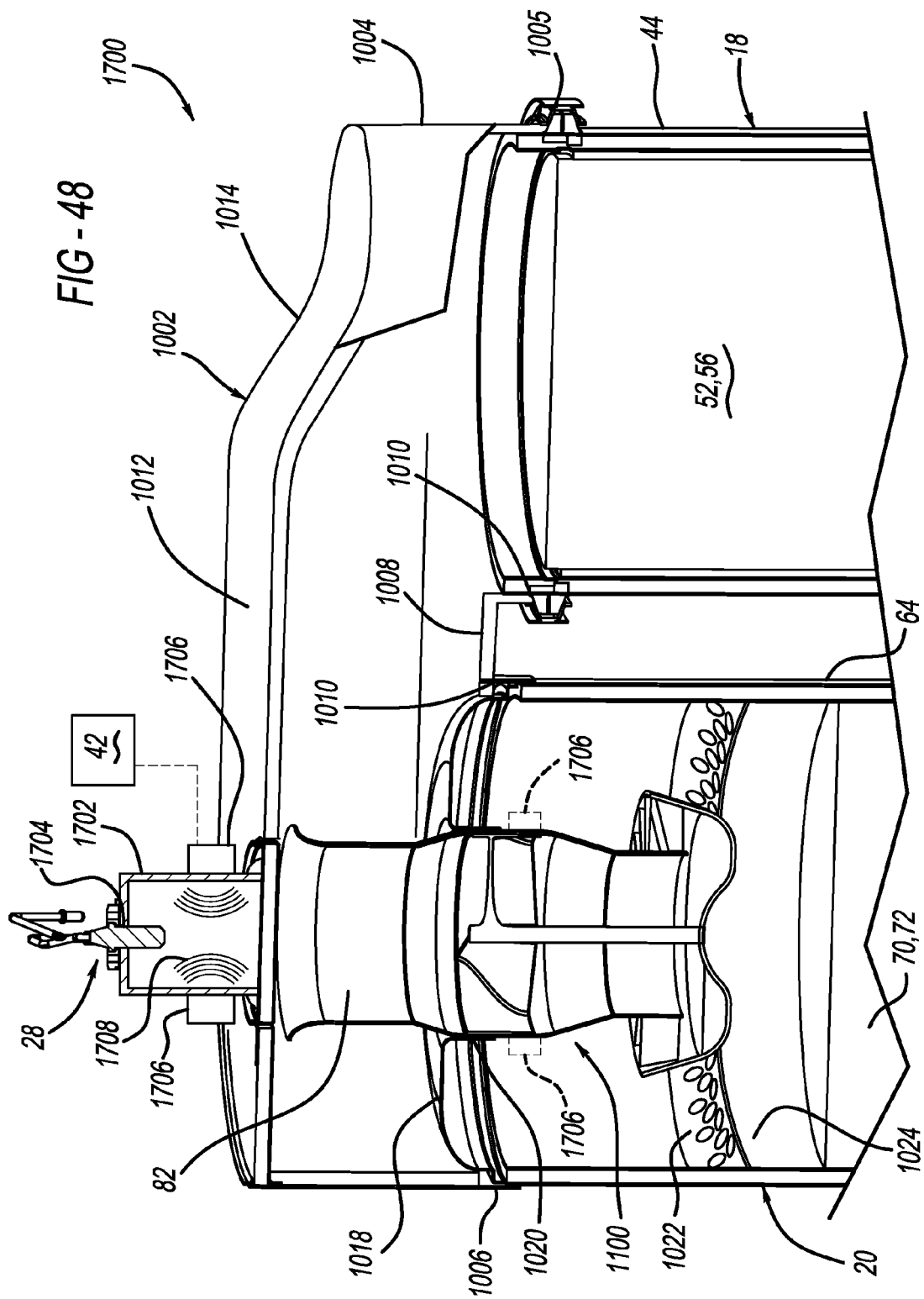
Figure 49:
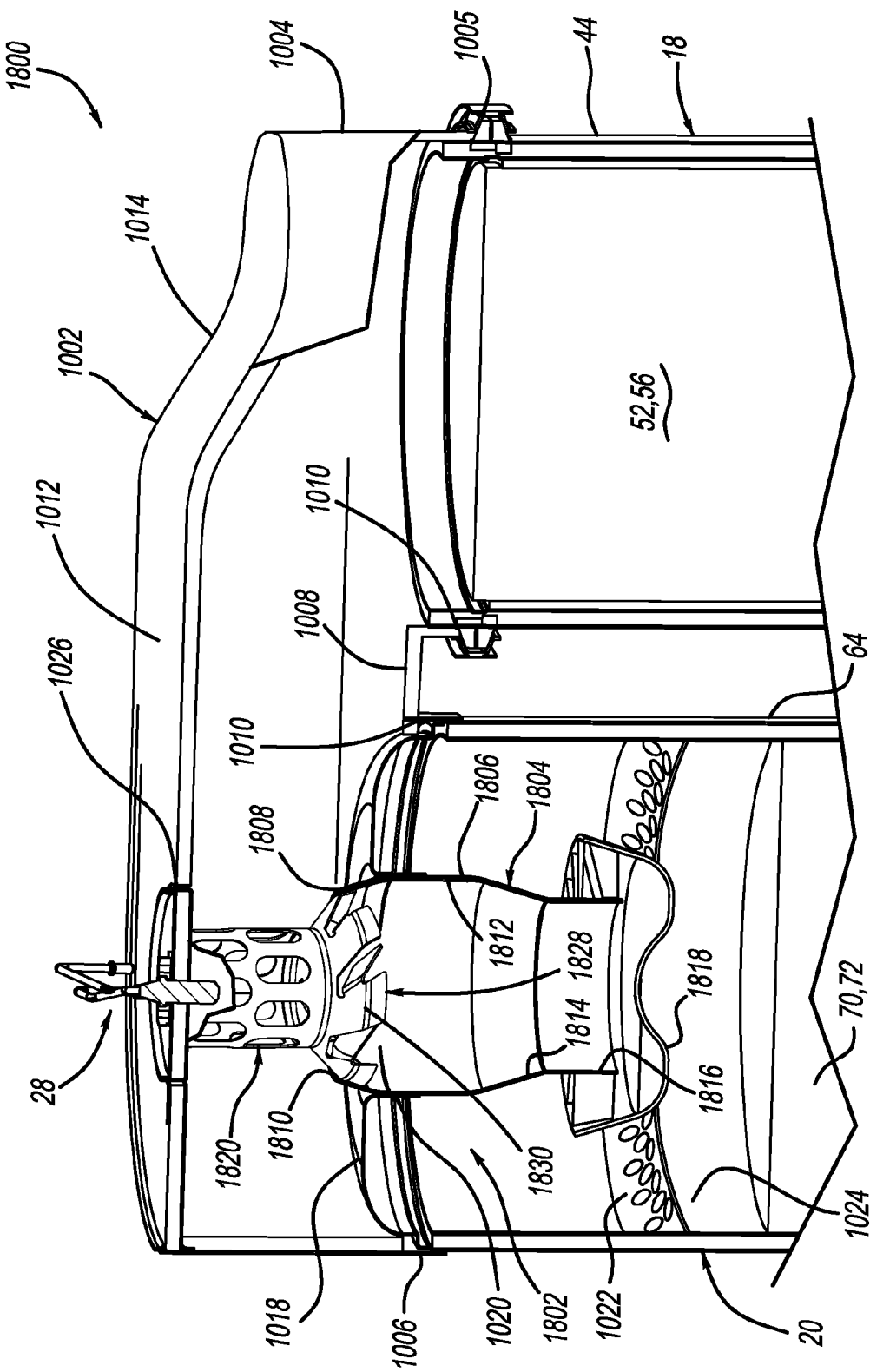
Figure 50:
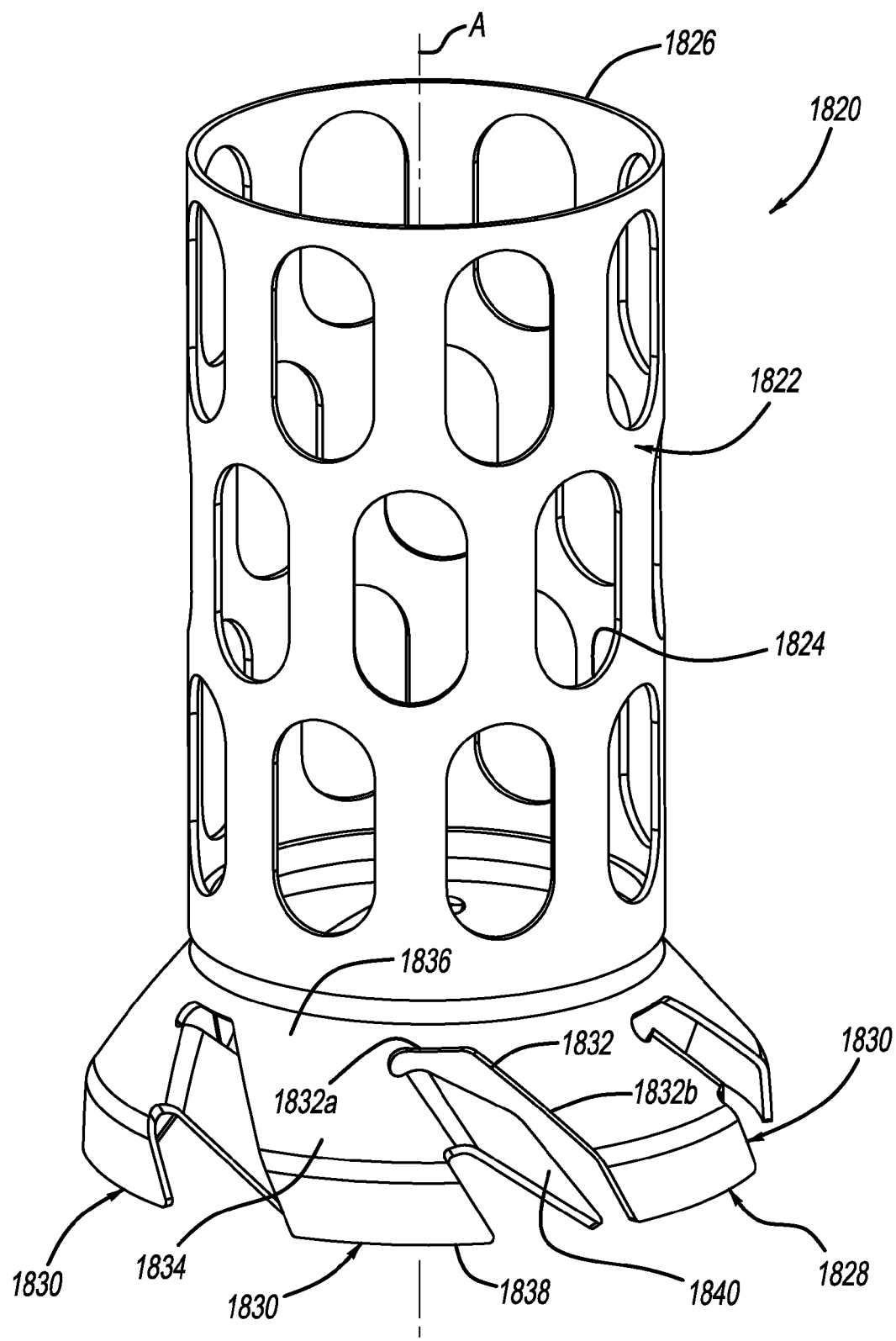
Figure 51:
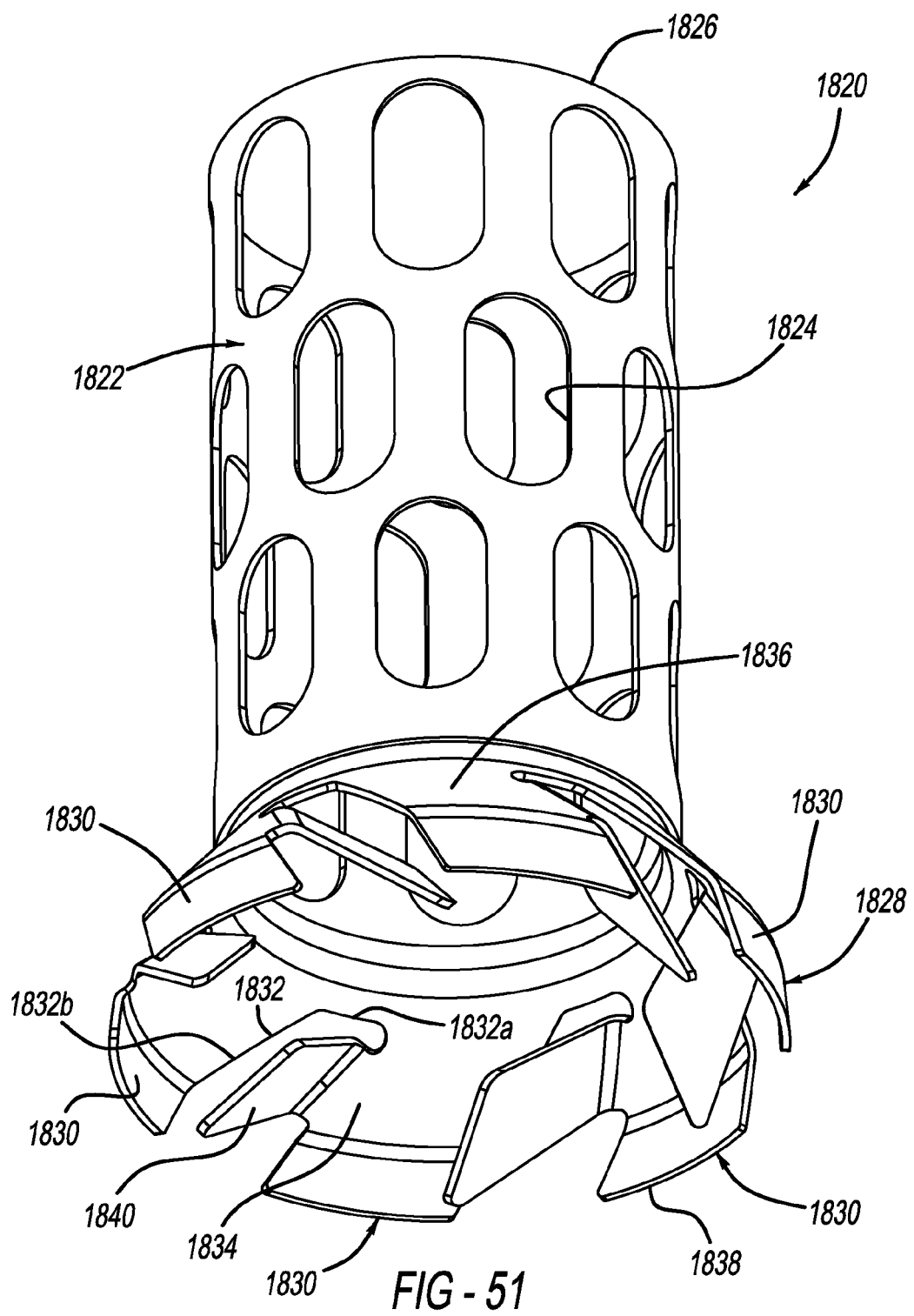
Figure 52:
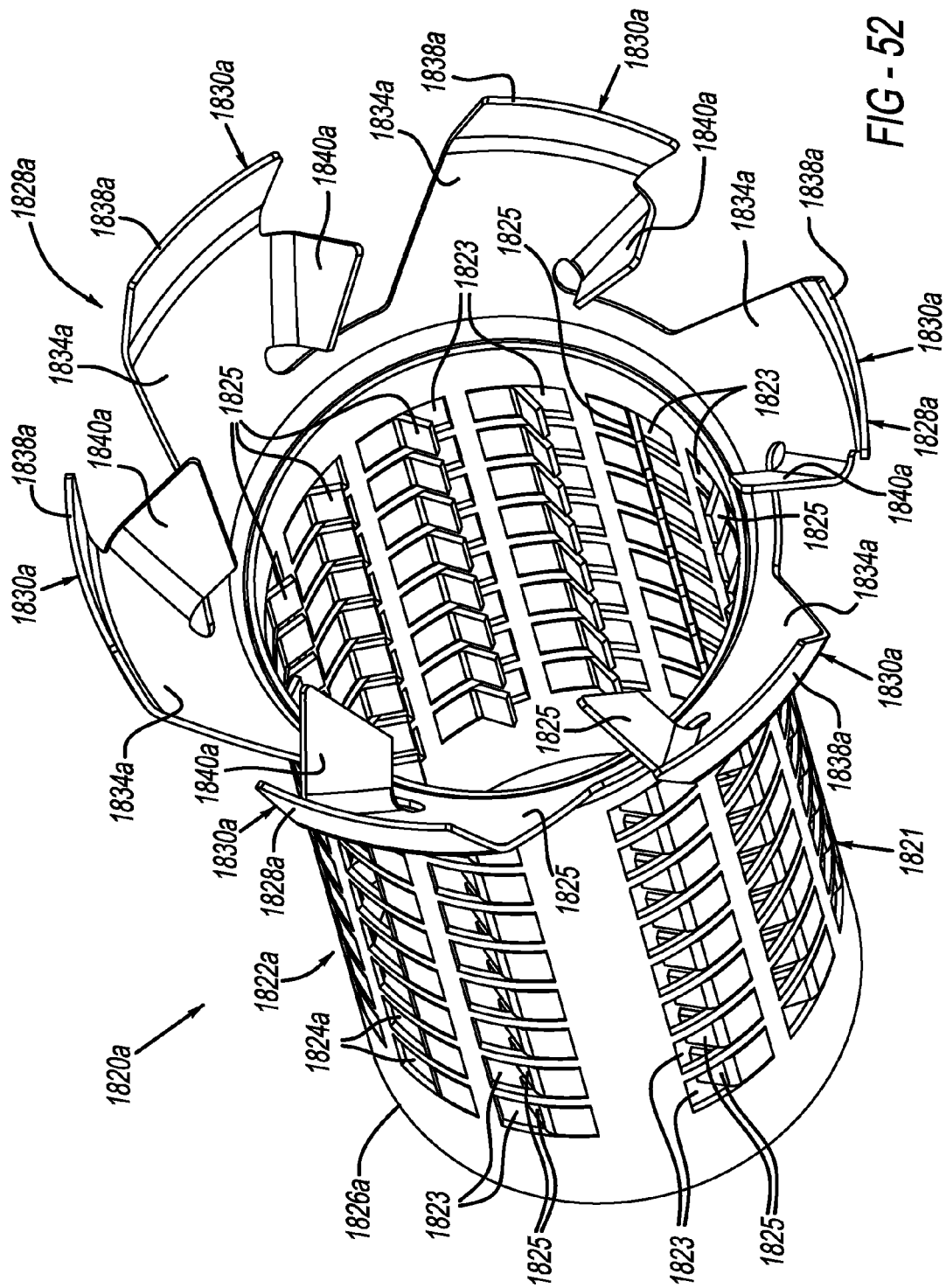
Figure 53:
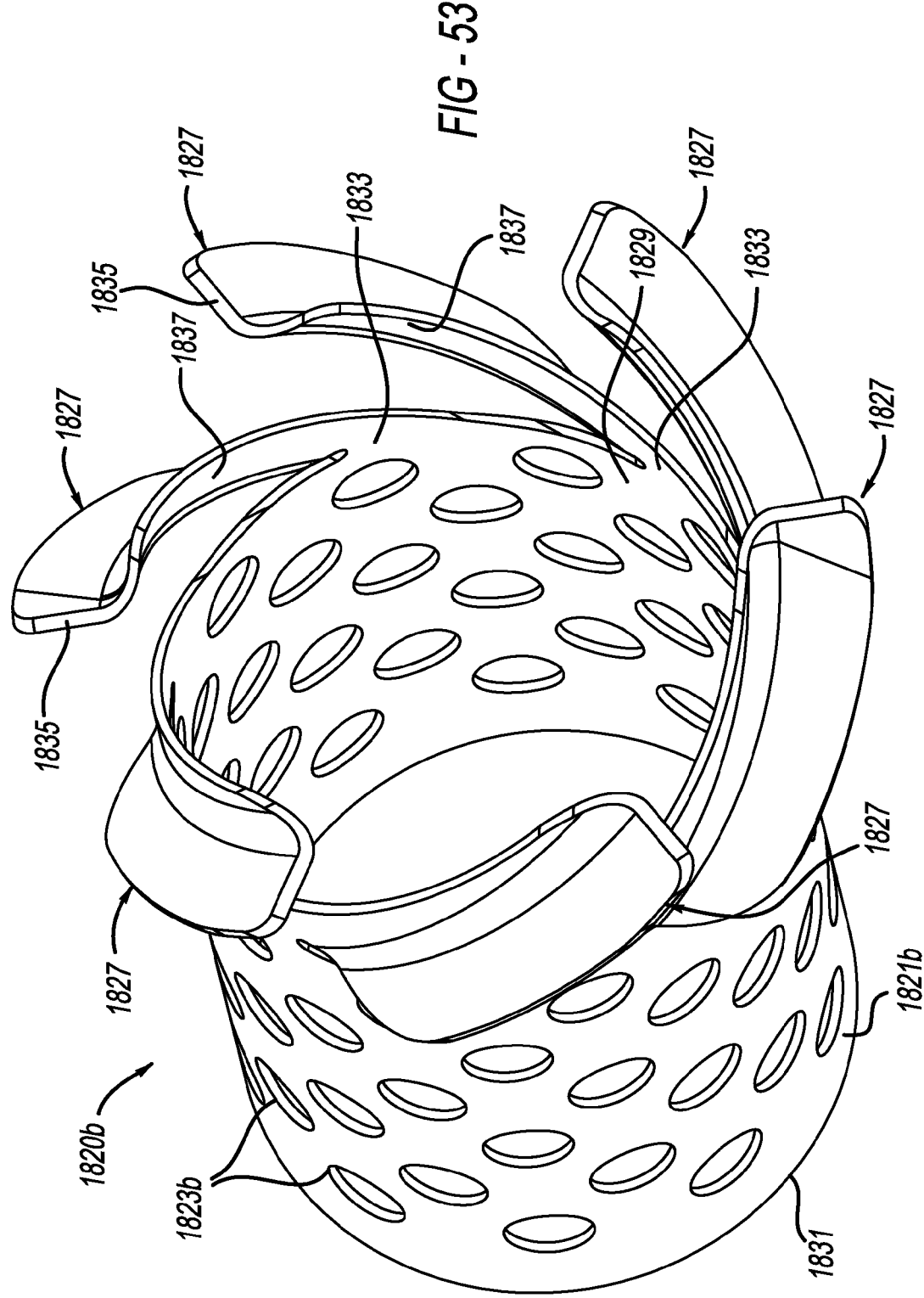
Figure 54:
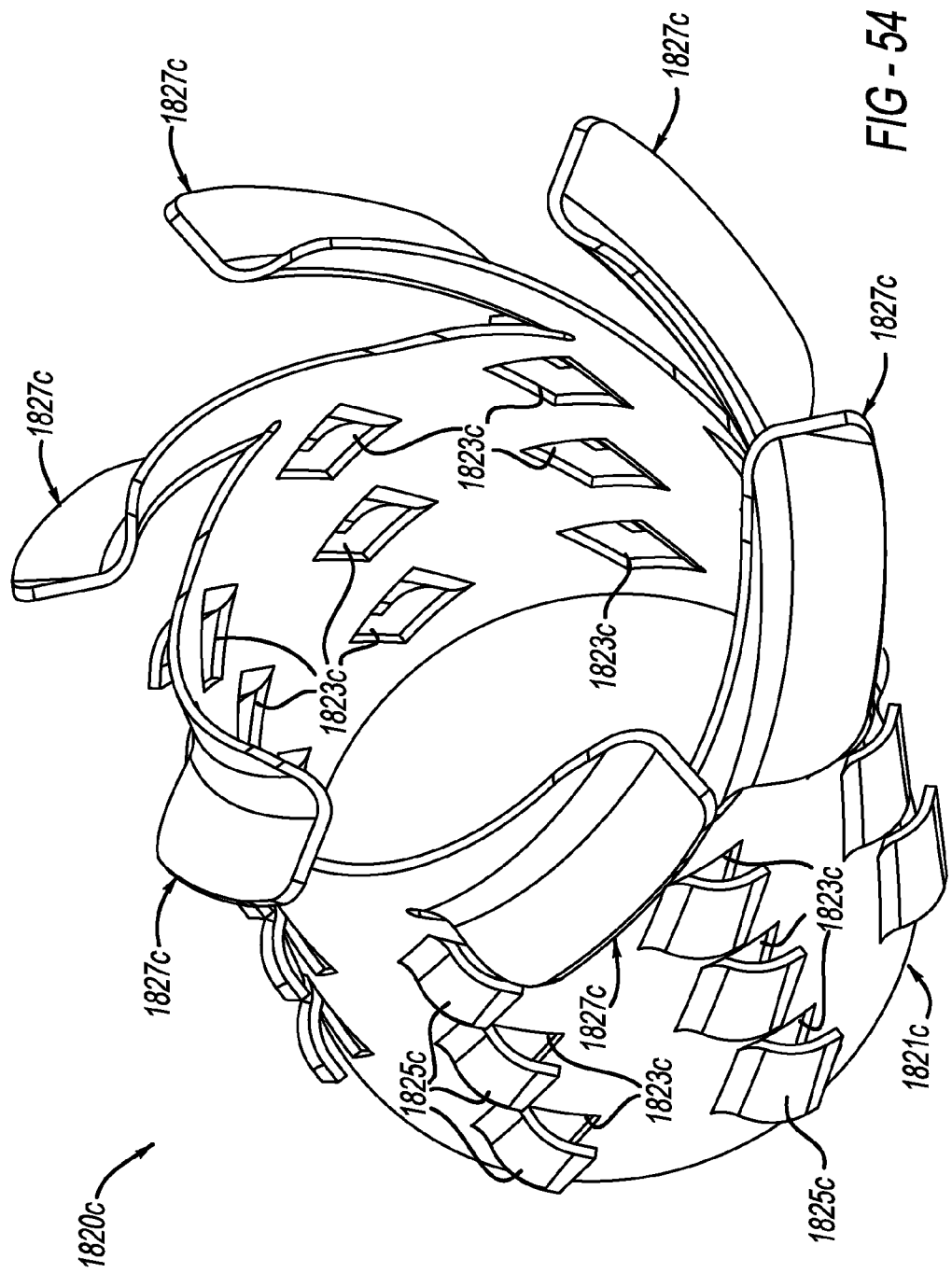
Figure 55:
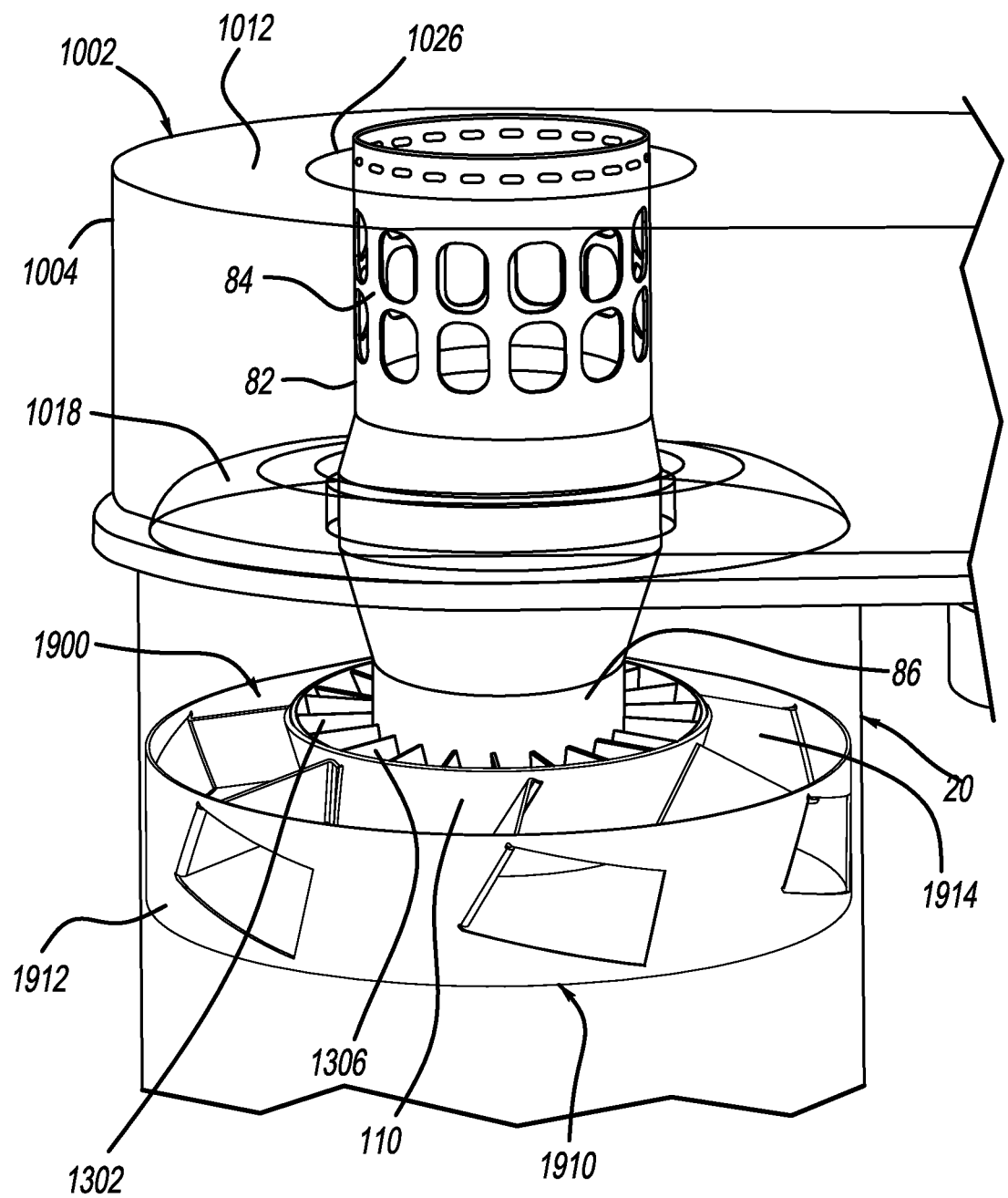
Figure 56:
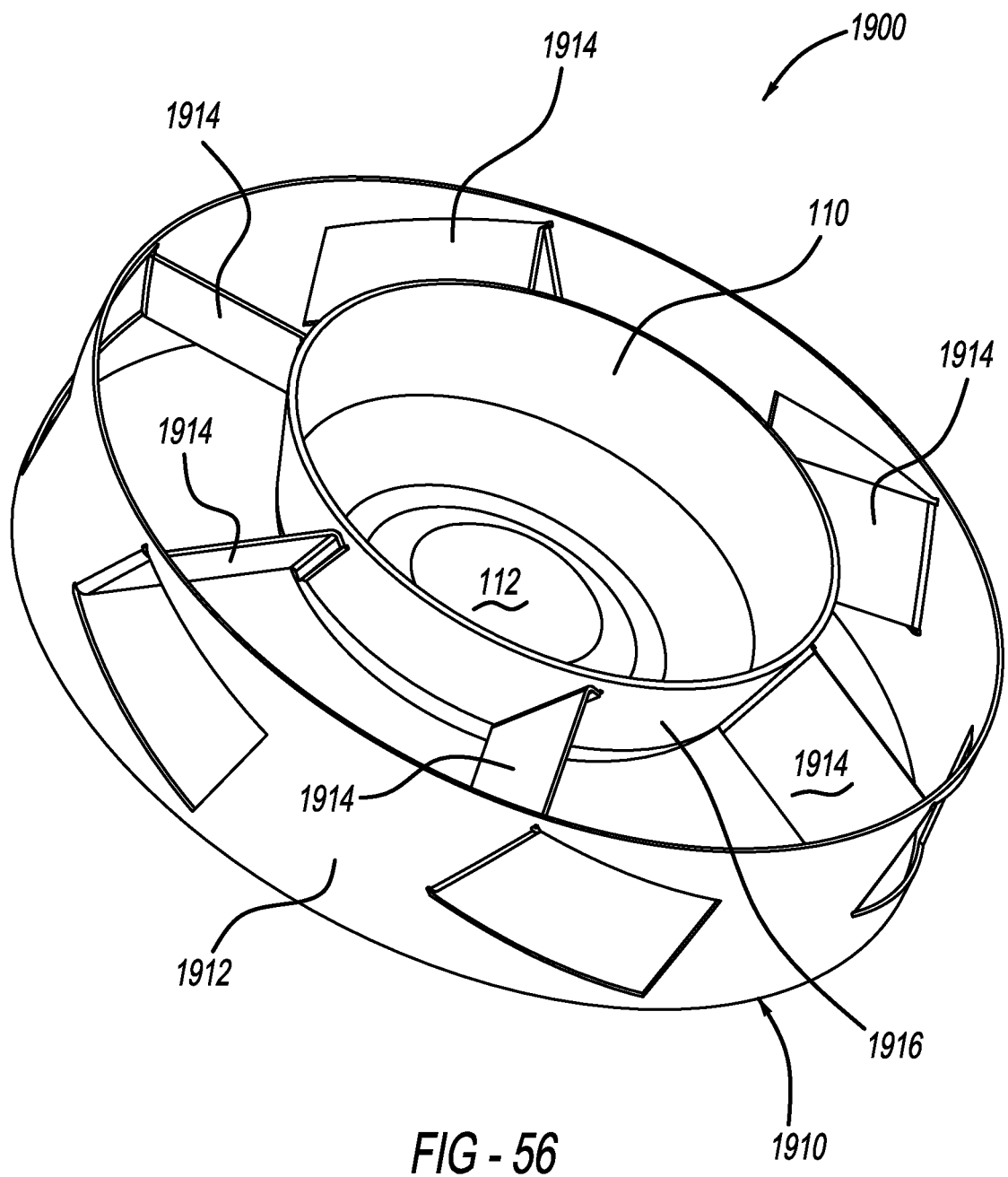
Figure 57:
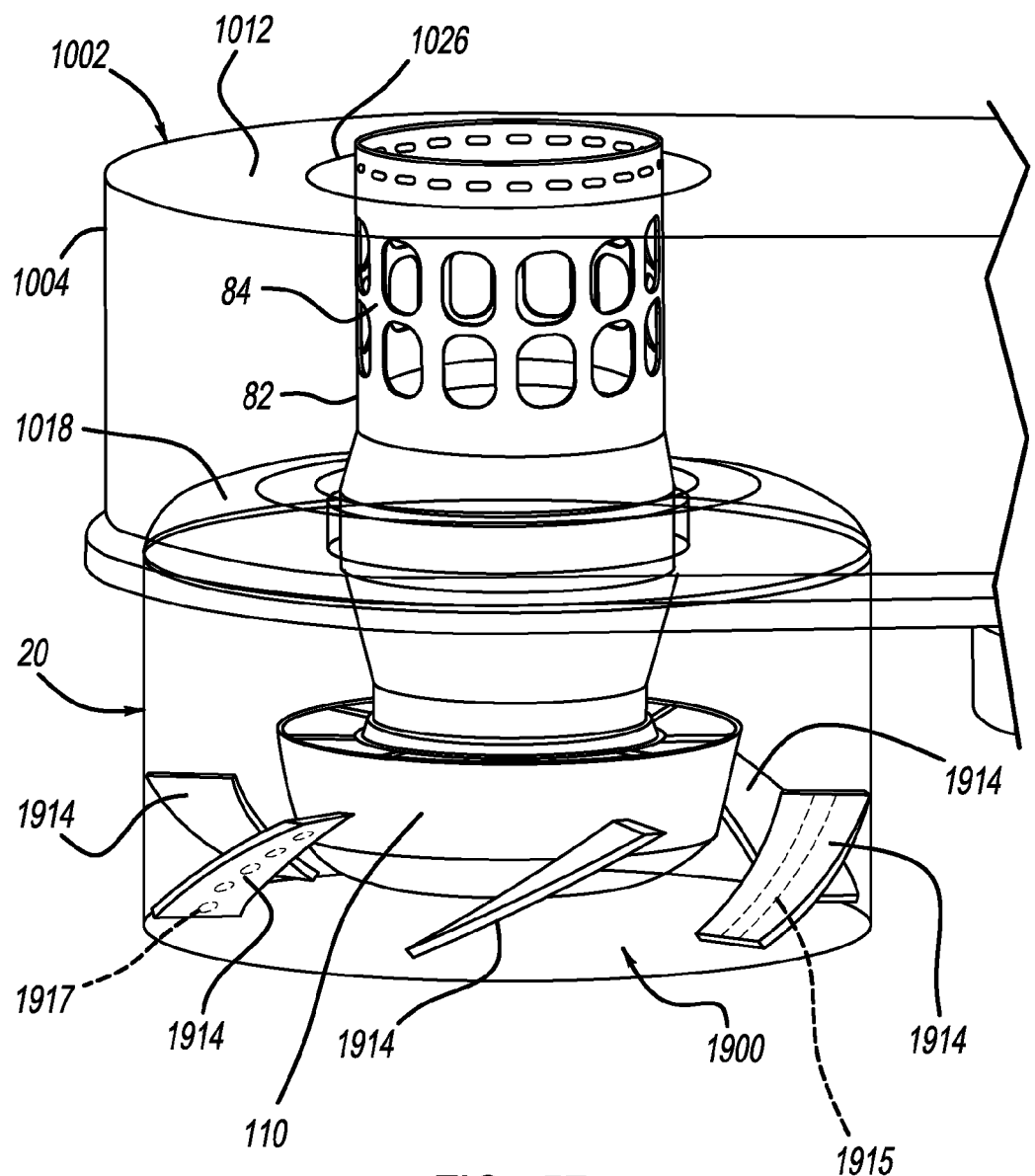
Figure 58:
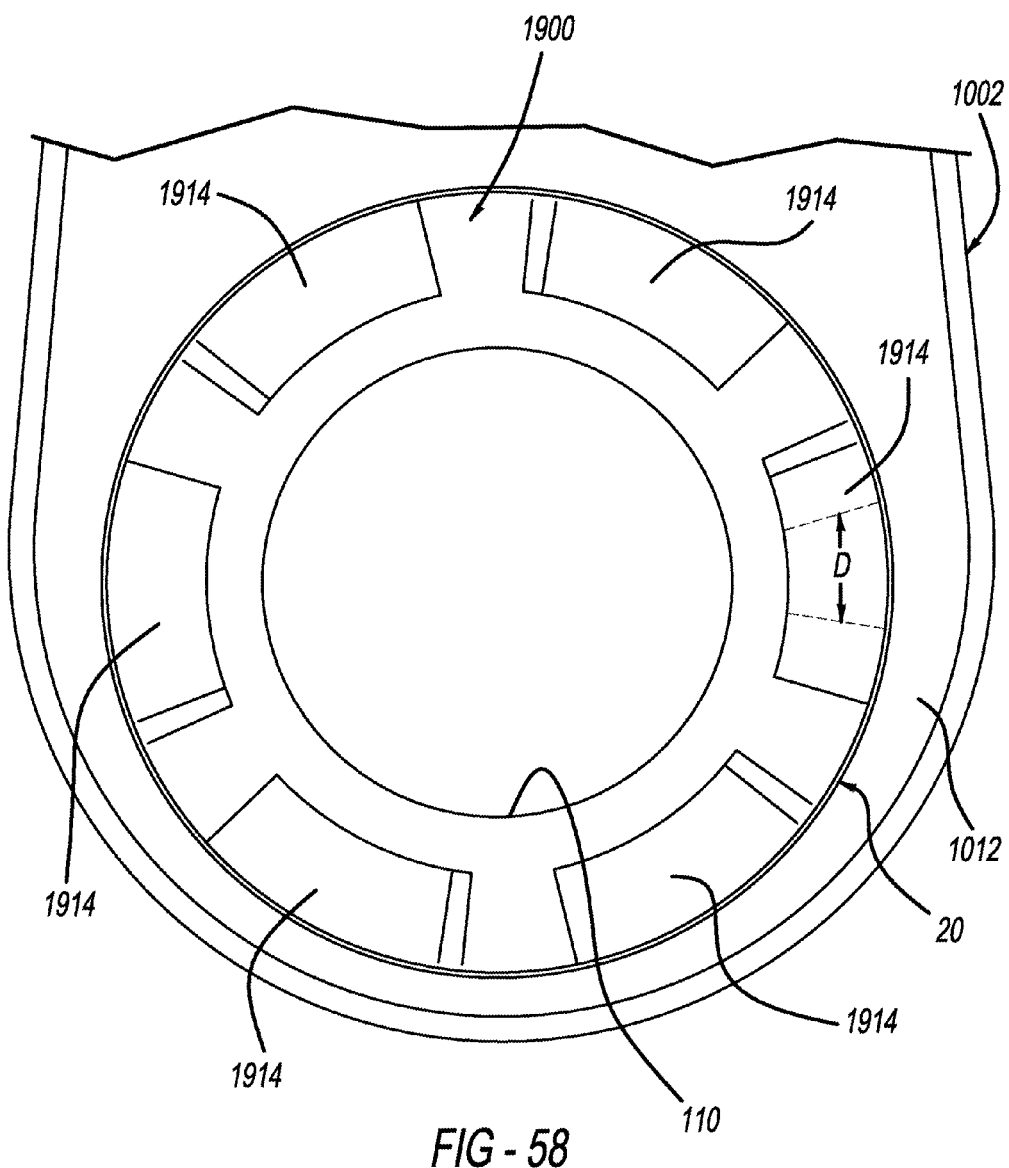
Figure 59:
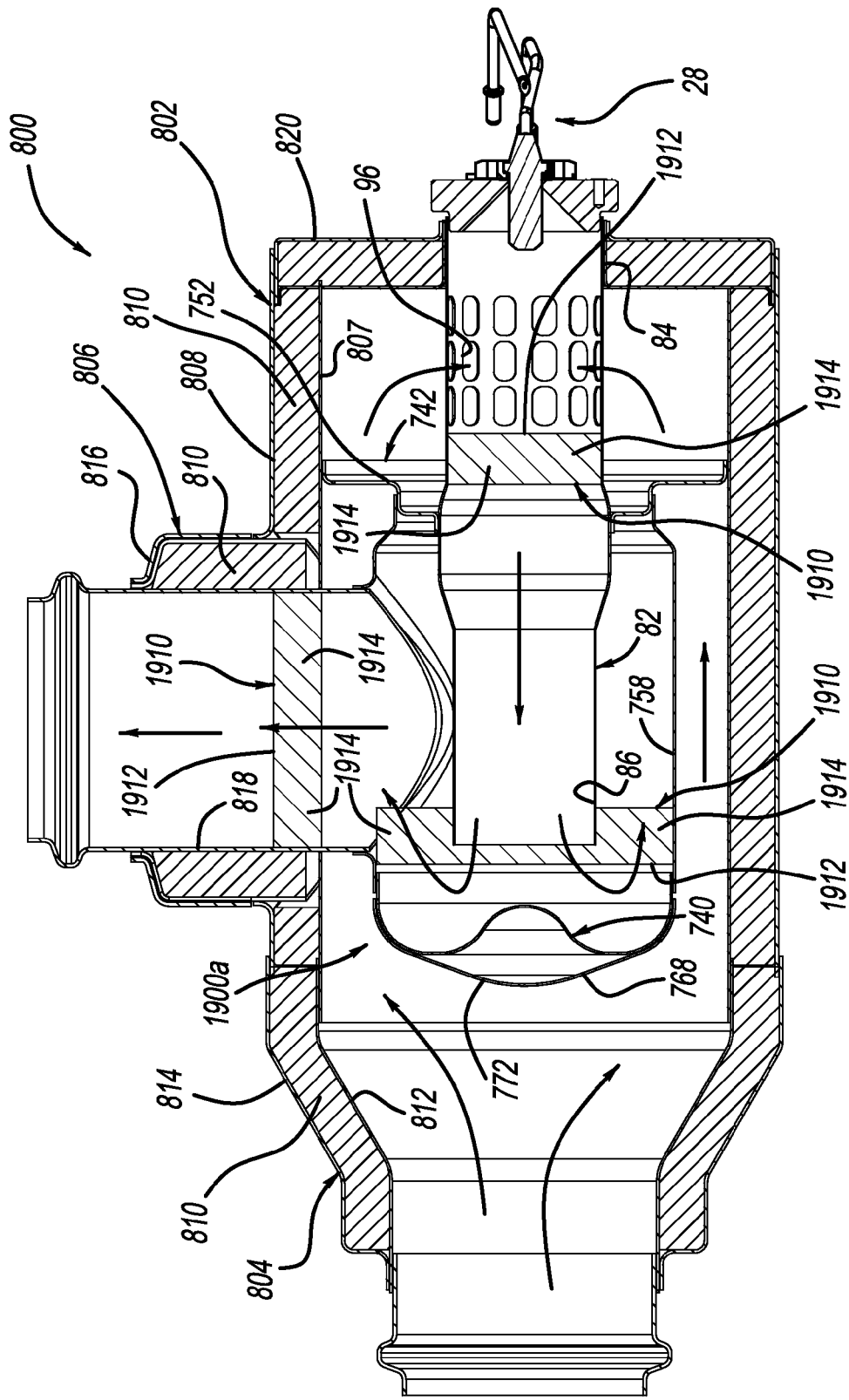
Figure 60:
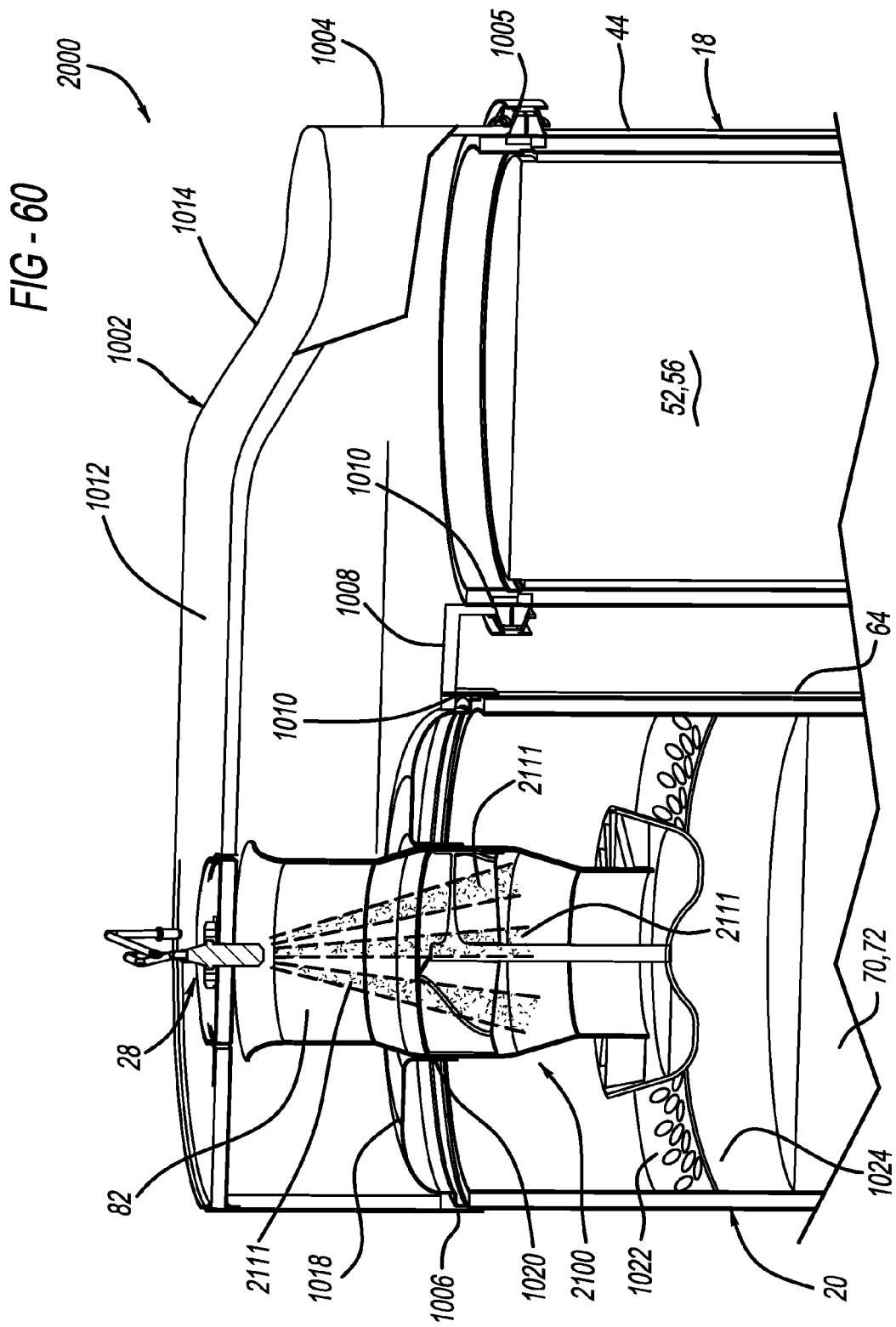
Figure 60A:
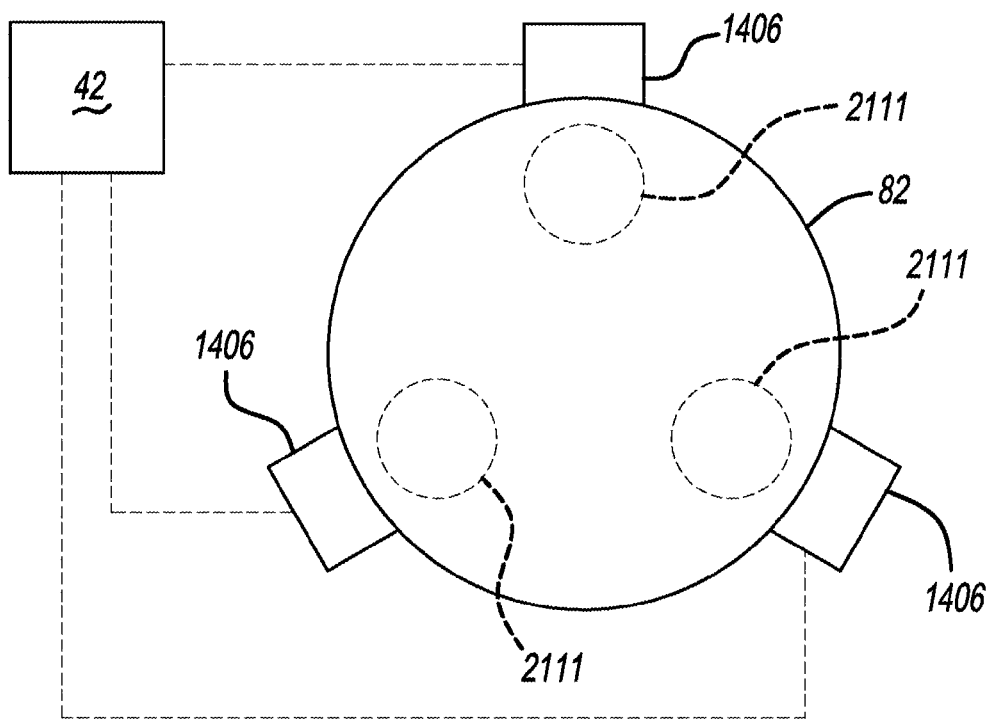
Figure 62:
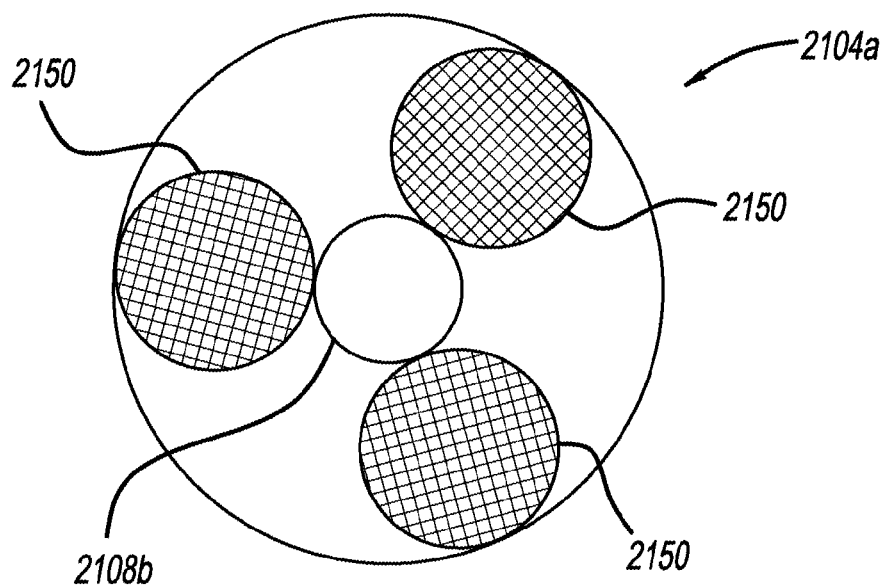
Figure 61:
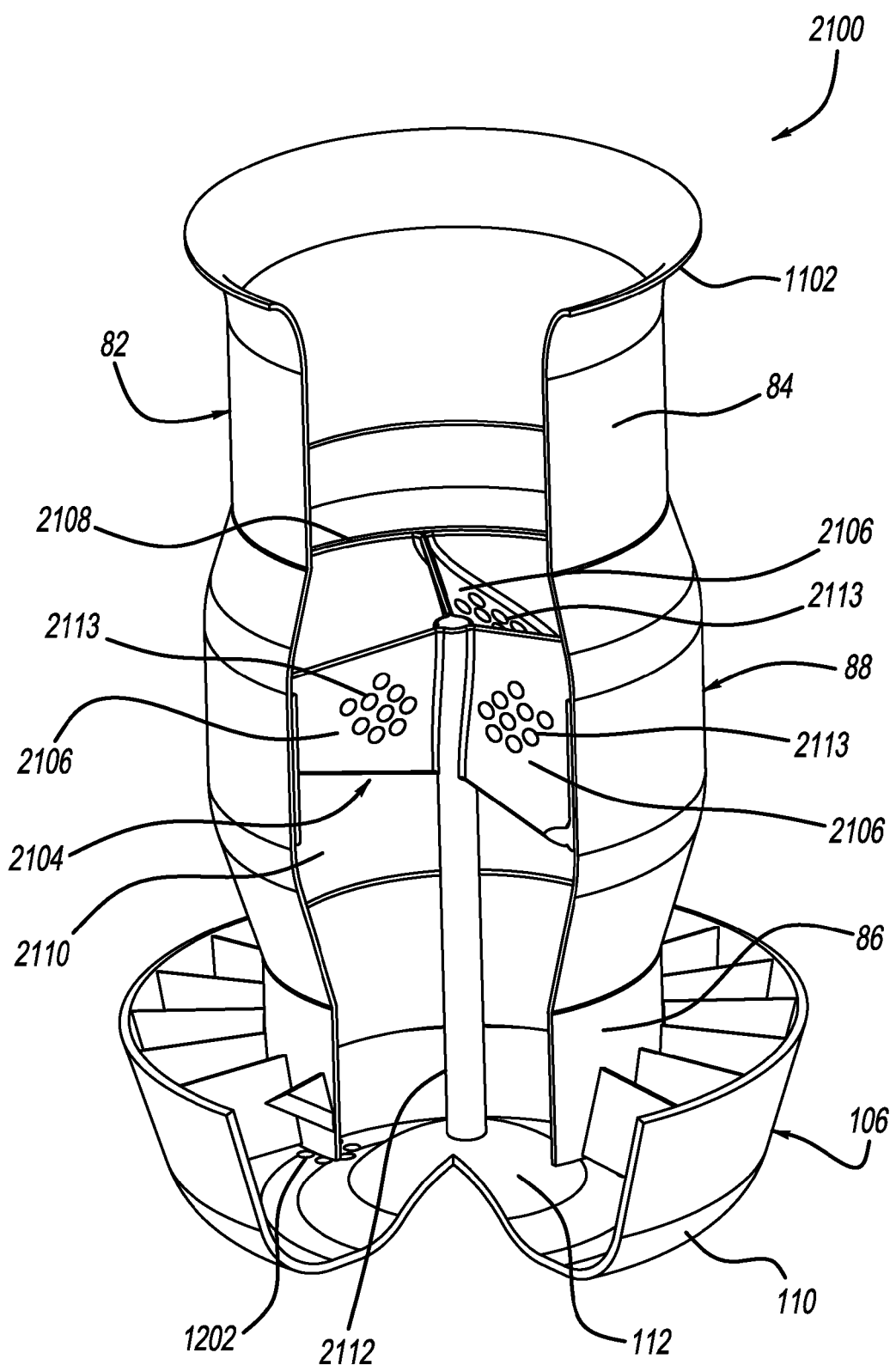
Figure 64:
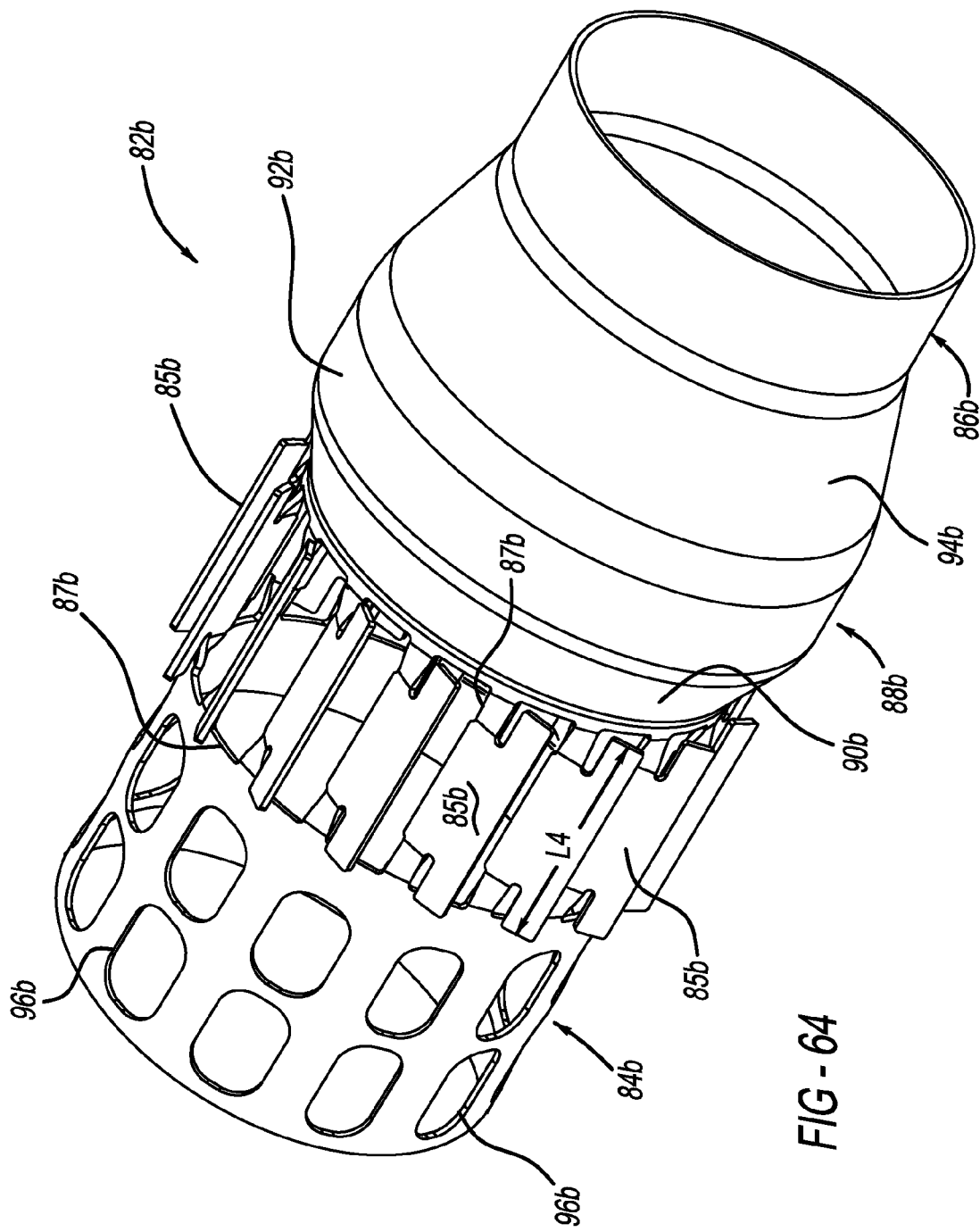

FIGS. 45A and 45B each illustrate an injector mount according to a principle of the present disclosure;

FIG. 46 illustrates an exhaust treatment component according to a principle of the present disclosure;

FIG. 47 illustrates an exhaust treatment component according to a principle of the present disclosure;

FIG. 48 is a perspective partial cross-sectional view of an exhaust treatment system according to a principle of the present disclosure;

FIG. 49 is a perspective partial cross-sectional view of an exhaust treatment system according to a principle of the present disclosure;

FIG. 50 is a perspective view of a perforated swirl device according to a principle of the present disclosure;

FIG. 51 is another perspective view of a perforated swirl device according to a principle of the present disclosure;

FIG. 52 is a perspective view of another perforated swirl device according to a principle of the present disclosure;

FIG. 53 is a perspective view of another perforated swirl device according to a principle of the present disclosure;

FIG. 54 is a perspective view of another perforated swirl device according to a principle of the present disclosure FIG. 55 is a partial perspective view of an exhaust treatment device according to a principle of the present disclosure;

FIG. 56 is a perspective view of a flow reversing device according to a principle of the present disclosure;

FIG. 57 is a partial perspective view of an exhaust treatment device according to a principle of the present disclosure;

FIG. 58 is a perspective view of an exhaust treatment device according to a principle of the present disclosure;

FIG. 59 is a cross-sectional view of an exhaust treatment device according to a principle of the present disclosure;

FIG. 60 is a perspective partial cross-sectional view of an exhaust treatment device according to a principle of the present disclosure;

FIG. 60A is a sectional view of an exhaust treatment component according to a principle of the present disclosure;

FIG. 61 is a perspective view of a mixing assembly according to a principle of the present disclosure;

FIG. 62 is a perspective view of a mixing assembly according to a principle of the present disclosure;

FIG. 63 is a perspective view of a decomposition tube according to a principle of the present disclosure; and FIG. 64 is a perspective view of another decomposition tube according a principle of the present disclosure.

Corresponding reference numerals indicate corresponding parts throughout the several views of the drawings.

DETAILED DESCRIPTION

Example embodiments will now be described more fully with reference to the accompanying drawings.

Figure 1:
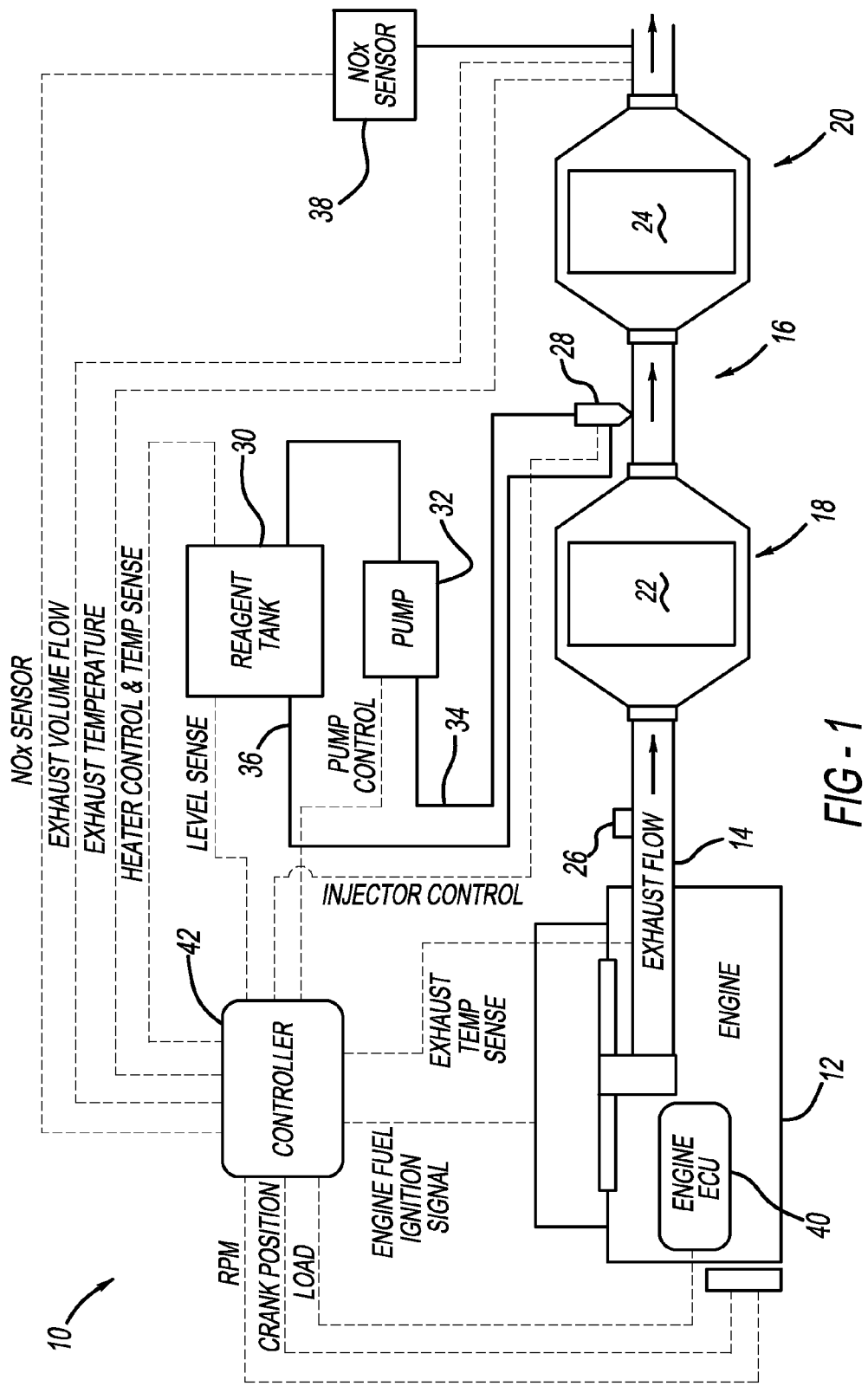
FIG. 1 is a schematic representation of an exhaust system according to a principle of the present disclosure.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed a pair of exhaust treatment components 18 and 20, which can include catalyst-coated substrates or filters 22 and 24. Catalyst-coated substrates or filters 22 and 24 can be any combination of a diesel particulate filter (DPF), a diesel oxidation catalyst (DOC), a selective catalytic reduction (SCR) component, a lean $NO_x$ catalyst, an ammonia slip catalyst, or any other type of exhaust treatment device known to one skilled in the art. If a DPF is used, it may be catalyst-coated.

Although not required by the present disclosure, exhaust after-treatment system 16 can further include components such as a thermal enhancement device or burner 26 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment substrate 22 or 24 is a DPF.

To assist in reduction of the emissions produced by engine 12, exhaust after-treatment system 16 can include a dosing module 28 for periodically dosing an exhaust treatment fluid into the exhaust stream. As illustrated in FIG. 1, dosing module 28 can be located upstream of exhaust treatment component 18, and is operable to inject an exhaust treatment fluid into the exhaust stream. In this regard, dosing module 28 is in fluid communication with a reagent tank 30 and a pump 32 by way of inlet line 34 to dose an exhaust treatment fluid such as diesel fuel or urea into the exhaust passage 14 upstream of exhaust treatment components 18 and 20. Dosing module 28 can also be in communication with reagent tank 30 via return line 36. Return line 36 allows for any exhaust treatment fluid not dosed into the exhaust stream to be returned to reagent tank 30. Flow of the exhaust treatment fluid through inlet line 34, dosing module 28, and return line 36 also assists in cooling dosing module 28 so that dosing module 28 does not overheat. Although not illustrated in the drawings, dosing module 28 can be configured to include a cooling jacket that passes a coolant around dosing module 28 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 38 may be positioned downstream from exhaust treatment component 18. $NO_x$ sensor 38 is operable to output a signal indicative of the exhaust $NO_x$ content to an engine control unit 40. All or some of the engine operating parameters may be supplied from engine control unit 40 via the engine/vehicle databus to a reagent electronic dosing controller 42. The reagent electronic dosing controller 42 could also be included as part of the engine control unit 40. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 28. Accordingly, although only a single dosing module 28 is illustrated for dosing exhaust treatment fluid, it should be understood that multiple dosing modules 28 for reagent injection are contemplated by the present disclosure.

Figure 2:
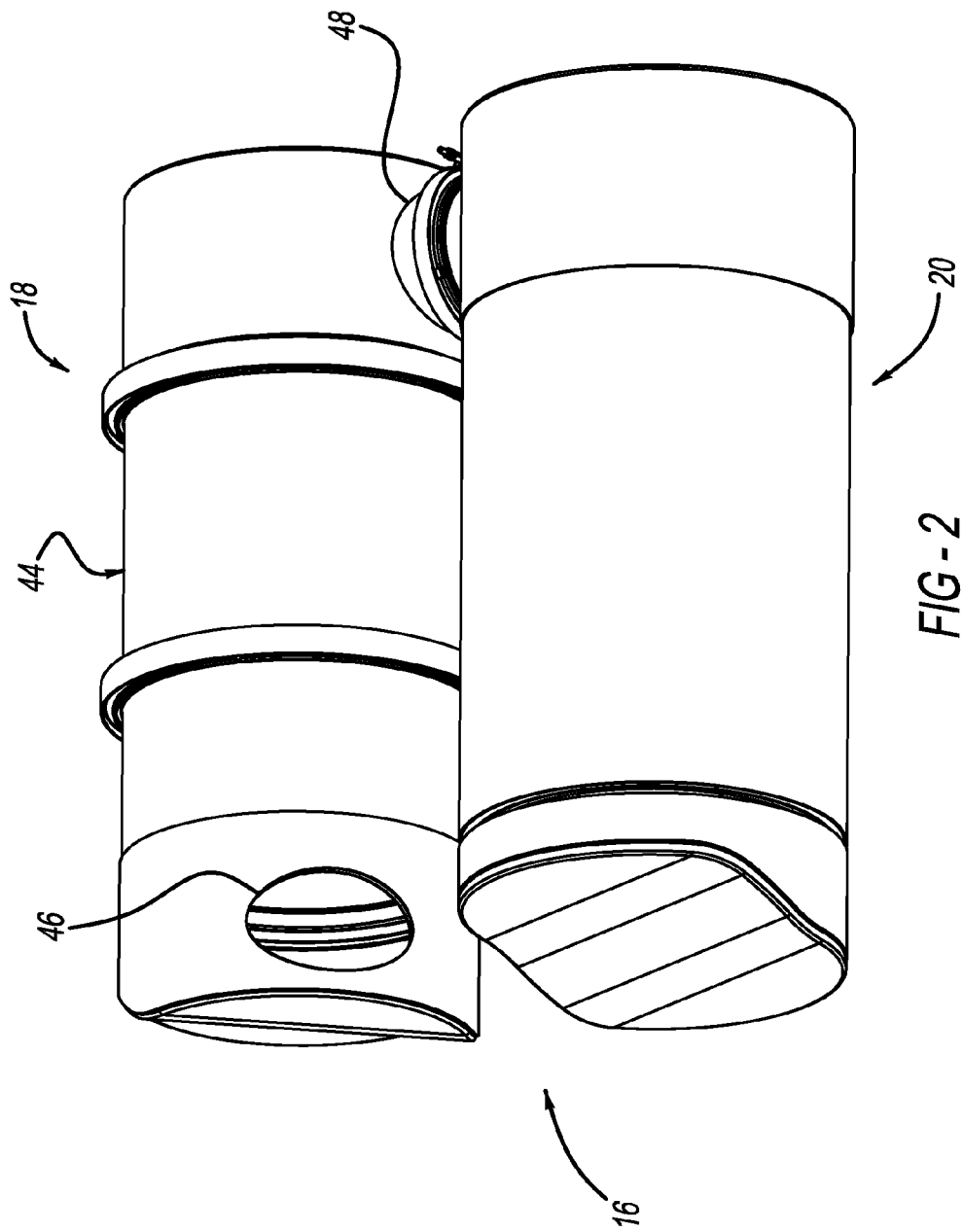
FIG. 2 is a perspective view of an exhaust treatment component according to a principle of the present disclosure.
Figure 3:
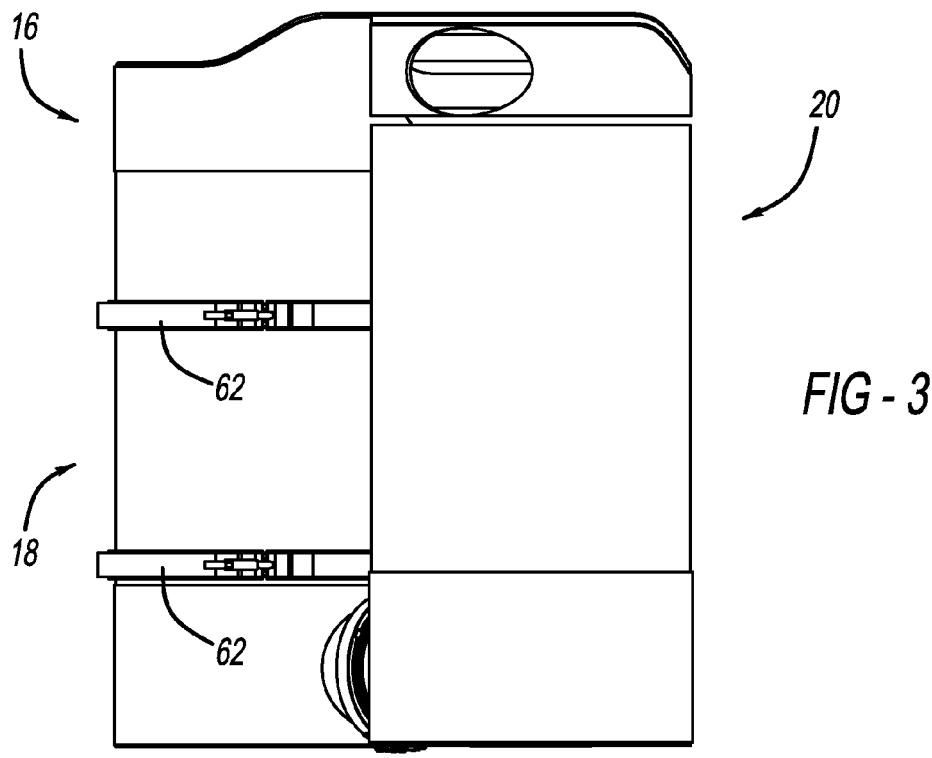
FIG. 3 is a side-perspective view of the exhaust treatment component illustrated in FIG. 2.
Figure 4:
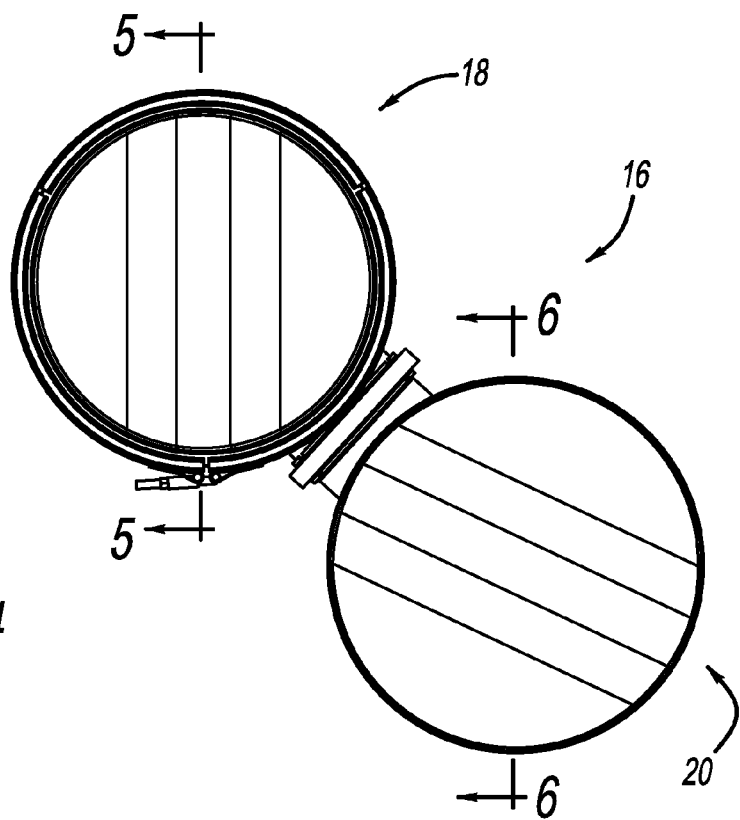
FIG. 4 is a front-perspective view of the exhaust treatment component illustrated in FIG. 2.
Figure 5:
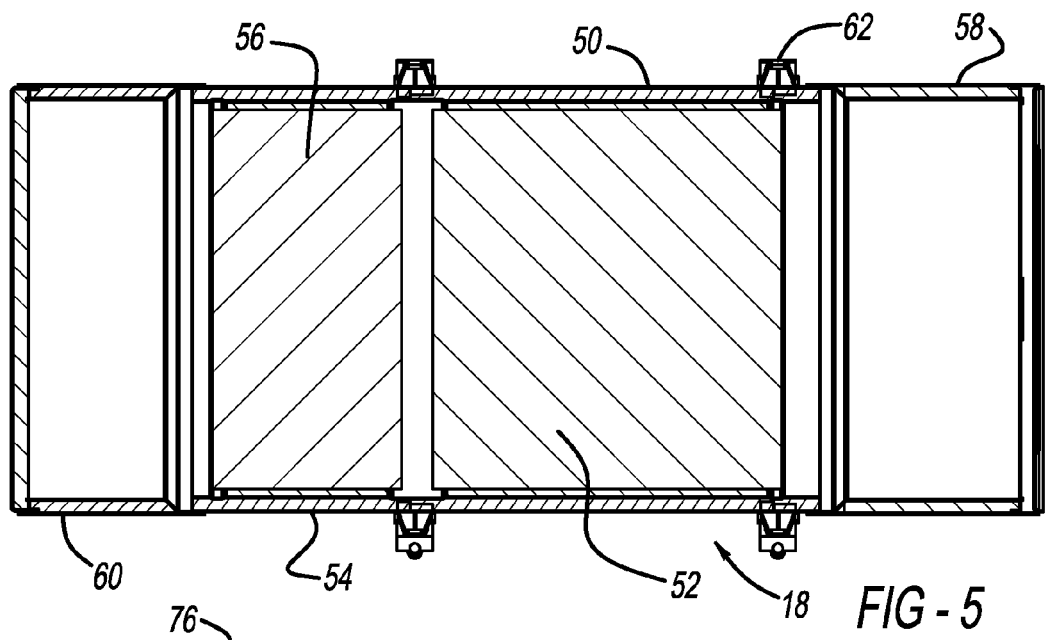
FIG. 5 is a cross-sectional view along line 5-5 in FIG. 4.

Referring to FIGS. 2-6, an exemplary configuration of exhaust treatment components 18 and 20 is illustrated. As best shown in FIG. 2, exhaust treatment components 18 and 20 are arranged parallel to one another. It should be understood, however, that exhaust treatment components 18 and 20 can be arranged substantially co-axially, without departing from the scope of the present disclosure.

Exhaust treatment component 18 may include a housing 44, an inlet 46, and an outlet 48. Inlet 46 may be in communication with exhaust passage 14, and outlet 48 may be in communication with exhaust treatment component 20.

Although outlet 48 is illustrated as being directly connected to exhaust treatment component 20, it should be understood that an additional conduit (not shown) may be positioned between outlet 48 and exhaust treatment component 20. The additional conduit can be non-linear such that the flow of exhaust through the conduit must turn before entering exhaust treatment component 20. Housing 44 can be cylindrically-shaped and may include a first section 50 supporting a DOC 52, and a second section 54 supporting DPF 56. Although DOC 52 is illustrated as being upstream of DPF 56, it should be understood that DPF 56 can be positioned upstream of DOC 52 without departing from the scope of the present disclosure. Opposing ends of housing 44 can include end caps 58 and 60 to hermetically seal housing 44. End caps 58 and 60 can be slip-fit and welded to first and second sections 50 and 54, respectively. First and second sections 50 and 54 may be secured by clamps 62. The use of clamps 62 allows for easy removal of DOC 52 or DPF 56 for maintenance, cleaning, or replacement of these components. Exhaust from exhaust passage 14 will enter inlet 46, pass through DOC 52 and DPF 56, and exit outlet 48 before entering exhaust treatment component 20.

Exhaust treatment component 20 is substantially similar to exhaust treatment component 18. In this regard, exhaust treatment component 20 may include a housing 64, an inlet 66, and an outlet 68. Inlet 66 communicates with outlet 48 of exhaust treatment component 18, and outlet 68 may be in communication with a downstream section of exhaust passage 14.

Housing 64 can be cylindrically-shaped and may support an SCR 70 and ammonia slip catalyst 72. SCR is preferably located upstream of ammonia slip catalyst 72. Opposing ends of housing 64 can include end caps 74 and 76 to hermetically seal housing 64. End caps 74 and 76 can be slip-fit and welded to housing 64. Alternatively, end caps 74 and 76 can be secured to housing 64 by clamps (not shown). Exhaust from outlet 48 of exhaust treatment component 18 will enter inlet 66, pass through SCR 70 and ammonia slip catalyst 72, and exit outlet 68 before entering the downstream section of exhaust passage 14.

Dosing module 28 may be positioned on end cap 74 at a location proximate inlet 66. Dosing module 28 is operable to inject a reductant such as a urea exhaust treatment fluid into the exhaust stream before the exhaust stream passes through SCR 70. A sufficient intermingling of the exhaust and exhaust treatment fluid should occur to optimize the removal of $NO_x$ from the exhaust stream during as the mixture passes through SCR 70. To assist in intermingling of the exhaust stream and the urea exhaust treatment fluid, a mixing assembly 80 may be positioned downstream from inlet 66 and upstream of SCR 70. Mixing assembly 80 is positioned proximate dosing module 28 such that dosing module 28 may dose the urea exhaust treatment fluid directly into mixing assembly 80 where it may intermingle with the exhaust stream.

Figure 7:
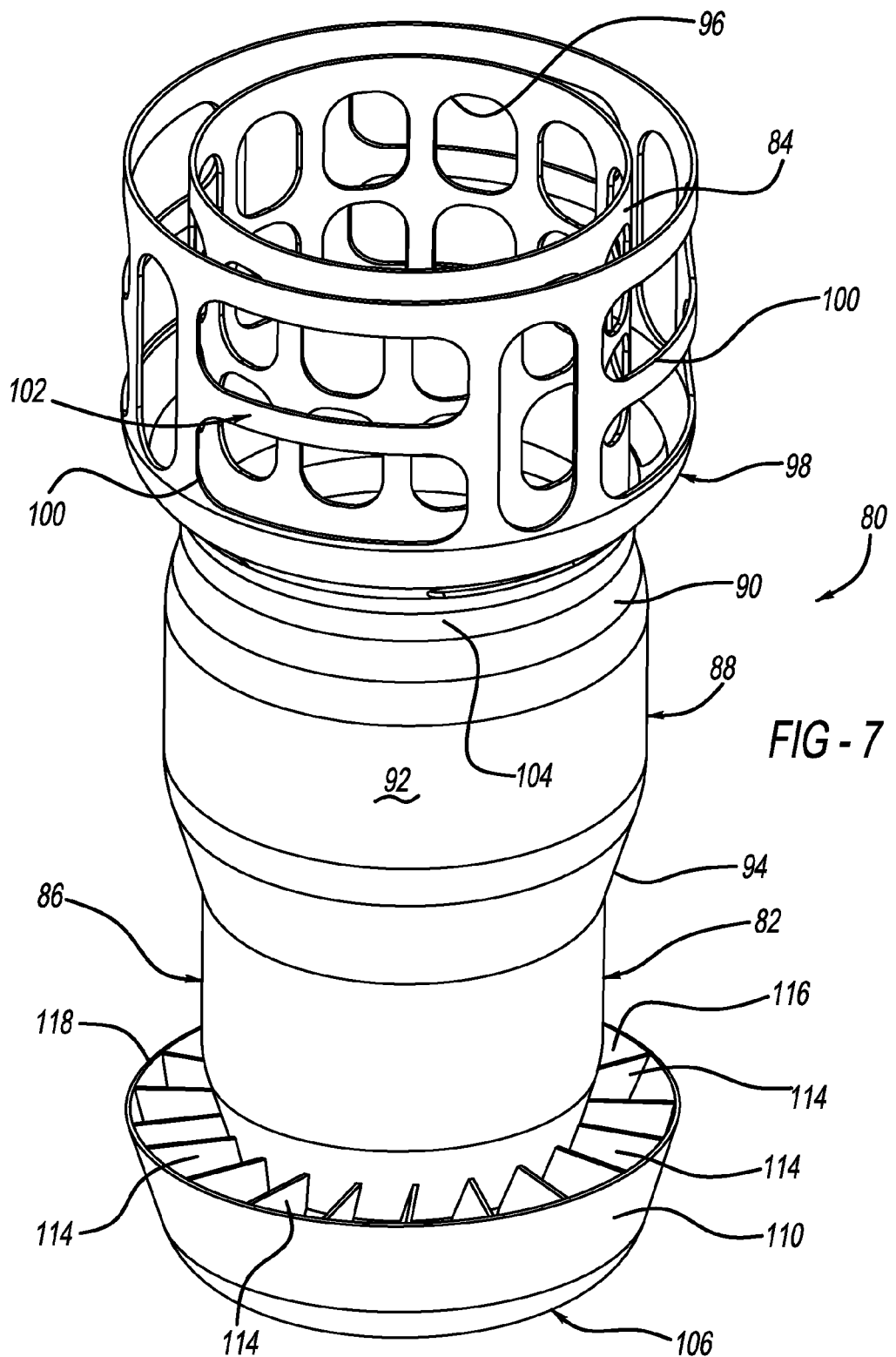
FIG. 7 is a perspective view of a mixing assembly according to a first exemplary embodiment of the present disclosure.
Figure 8:
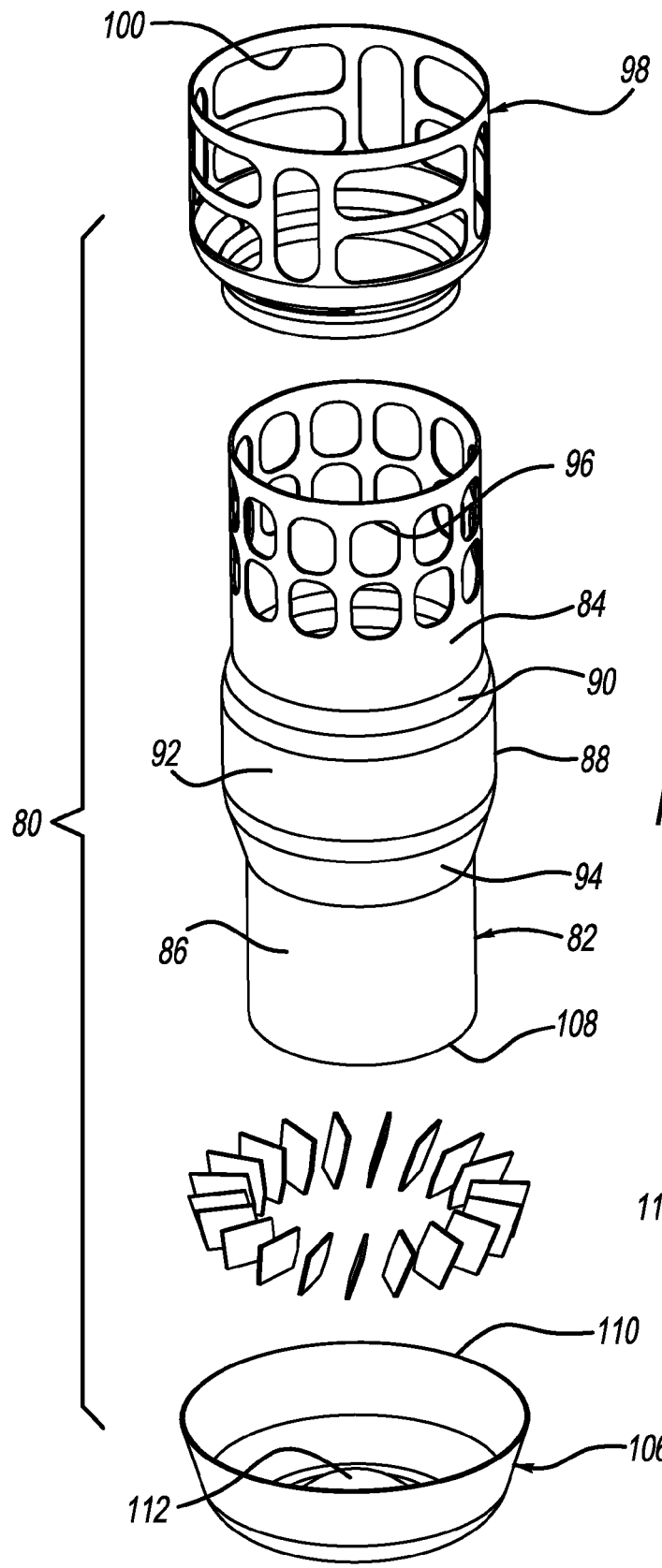
FIG. 8 is an exploded perspective view of the mixing assembly illustrated in FIG. 7.
Figure 9:
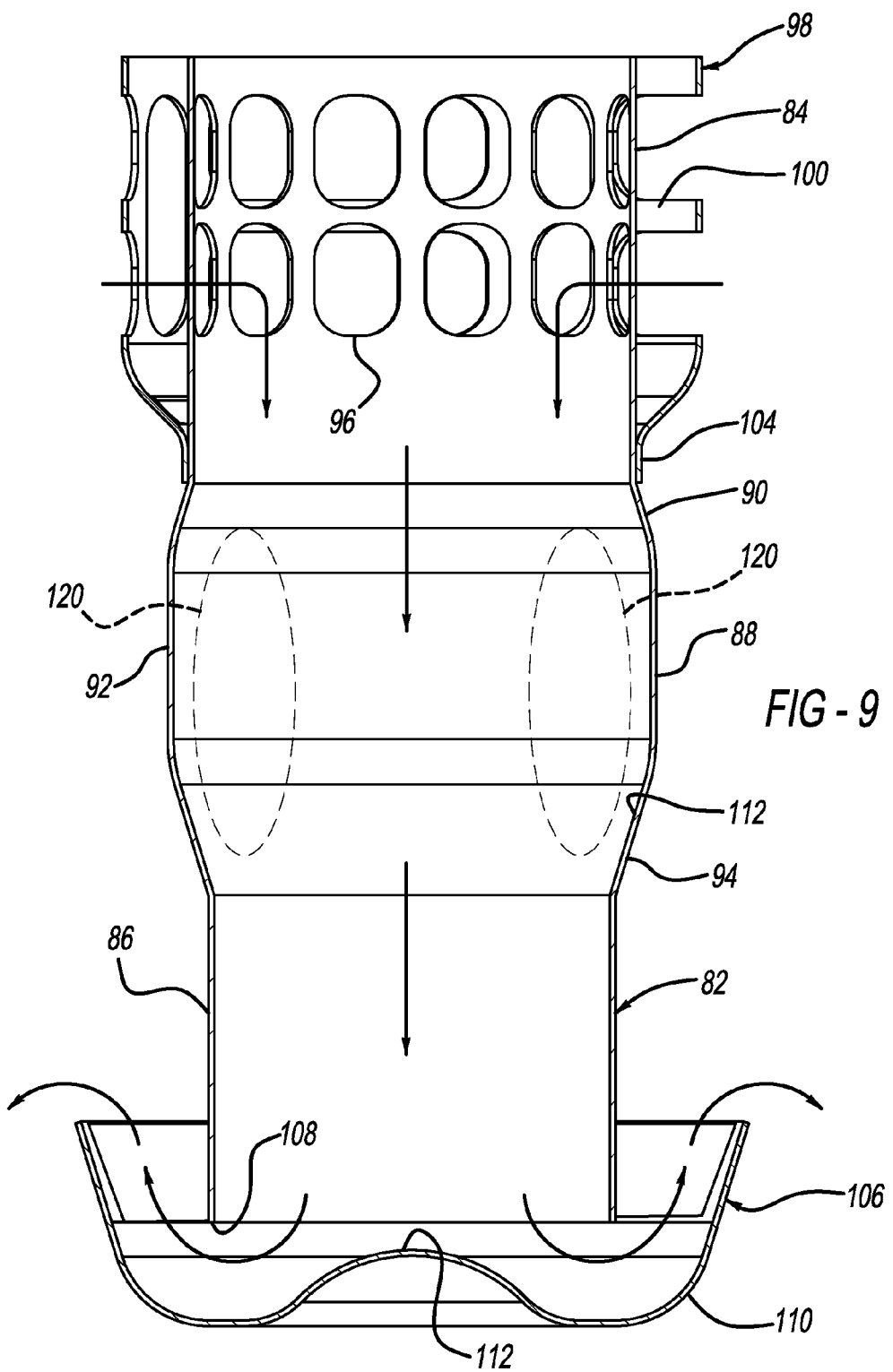
FIG. 9 is a cross-sectional view of the mixing assembly illustrated in FIG. 7.
Figure 10:
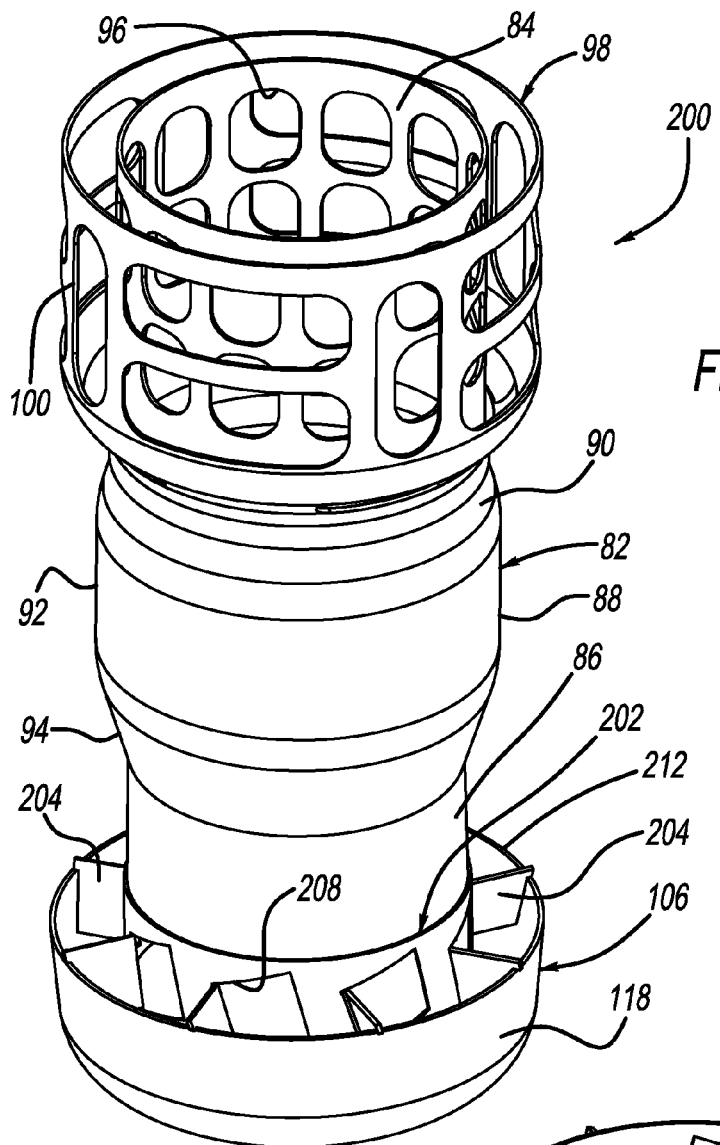
FIG. 10 is a perspective view of a mixing assembly according to a second exemplary embodiment of the present disclosure.
Figure 11:
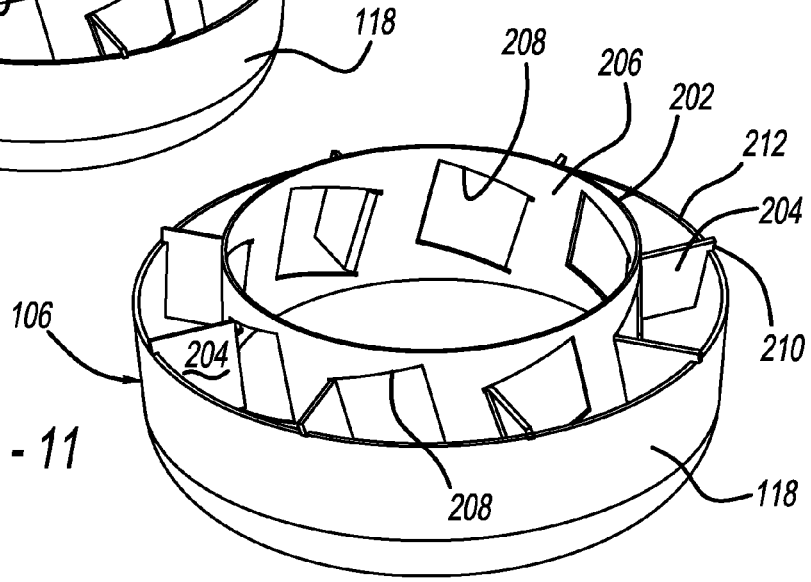
FIG. 11 is a perspective view of a flow-reversing device and dispersion device of the mixing assembly illustrated in FIG. 10.

FIGS. 7-9 illustrate a first exemplary embodiment of mixing assembly 80. Mixing assembly 80 includes a decomposition tube 82 including a first end portion 84 that may be secured to end cap 74 and a second end portion 86 that is positioned proximate SCR 70. Decomposition tube 82 may be substantially cylindrical, with a radially expanded portion 88 positioned between the first and second end portions 84 and 86. Radially expanded portion 88 includes a conically-expanding portion 90 that expands the decomposition tube 82, a cylindrical portion 92 downstream from the conically-expanding portion 90 having a diameter that is greater than that of first and second end portions 84 and 86, and a conically-narrowing portion 94 that narrows decomposition tube 82. It should be understood that first and second end portions 84 and 86 may have different diameters, without departing from the scope of the present disclosure. It should also be understood that the present disclosure does not require conically-narrowing portion 94. That is, radially expanded portion 88 may extend over the entire length of second end portion 86.

First end portion 84 may be perforated such that first end portion 84 includes a plurality of first perforations 96. First perforations 96 can vary in size around the circumference of first end portion 84, and assist in creating turbulence and increasing a velocity of the exhaust stream as it enters decomposition tube 82. Although not required by the present disclosure, a perforated collar 98 including a plurality of second perforations formed as elongate slots 100 may be positioned around and secured to first end portion 84. Perforated collar 98 includes a cylindrical portion 102 having a diameter greater than that of first end portion 84. Cylindrical portion 102 radially narrows into an axially-extending flange 104 that may be fixedly coupled to decomposition tube 82 at a position proximate radially expanded portion 88 by welding, brazing, or any other secure attachment method known to one skilled in the art.

Elongate slots 100 may be dimensioned larger than first perforations 96. Elongate slots 100 can be oriented in various directions including directions parallel with an axis of decomposition tube 82, and directions arranged orthogonal to the axis of decomposition tube 82. It should be understood, however, that each elongate slot 100 can be oriented in the same direction without departing from the scope of the present disclosure. Similar to first perforations 96, elongate slots 100 assist in creating turbulence and increasing a velocity of the exhaust stream as it enters decomposition tube 82.

Mixing assembly 80 includes a flow reversing device 106 at second end portion 86. Flow reversing device 106 may be fixed to second end portion 86, or may be supported by a baffle (not shown) that secures flow reversing device 106 to end cap 74 at a position proximate terminal edge 108 of second end portion 86. Flow reversing device 106 is a substantially cup-shaped member 110 having a central bulge 112 formed therein. Flow reversing device 106 has a diameter greater than that of second end portion 86 of decomposition tube 82 such that as the exhaust flow enters the cup-shaped member 110, the exhaust flow will be forced to flow in a reverse direction back toward inlet 66 of housing 64. The reversing of the exhaust flow assists in intermingling of the reagent exhaust treatment fluid and the exhaust stream before the exhaust stream reaches SCR 70.

Flow reversing device 106 may include a plurality of deflecting members 114 to further assist in intermingling the reagent exhaust treatment fluid and the exhaust stream. Deflecting members 114 may be formed as a plurality of vanes that extend radially inward from an inner surface 116 of outer wall 118 of flow reversing device 106. In addition to extending radially inward, vanes 114 may also be angled relative to an axis of decomposition tube 82 to further direct the exhaust flow as it exits flow reversing device 106. Vanes 114 may be planar members, or may be slightly curved. Although vanes 114 are illustrated as being secured to inner surface 116 of flow-reversing device 106, it should be understood that vanes 114 may be secured to second end portion 86 of decomposition tube 82.

Figure 6:
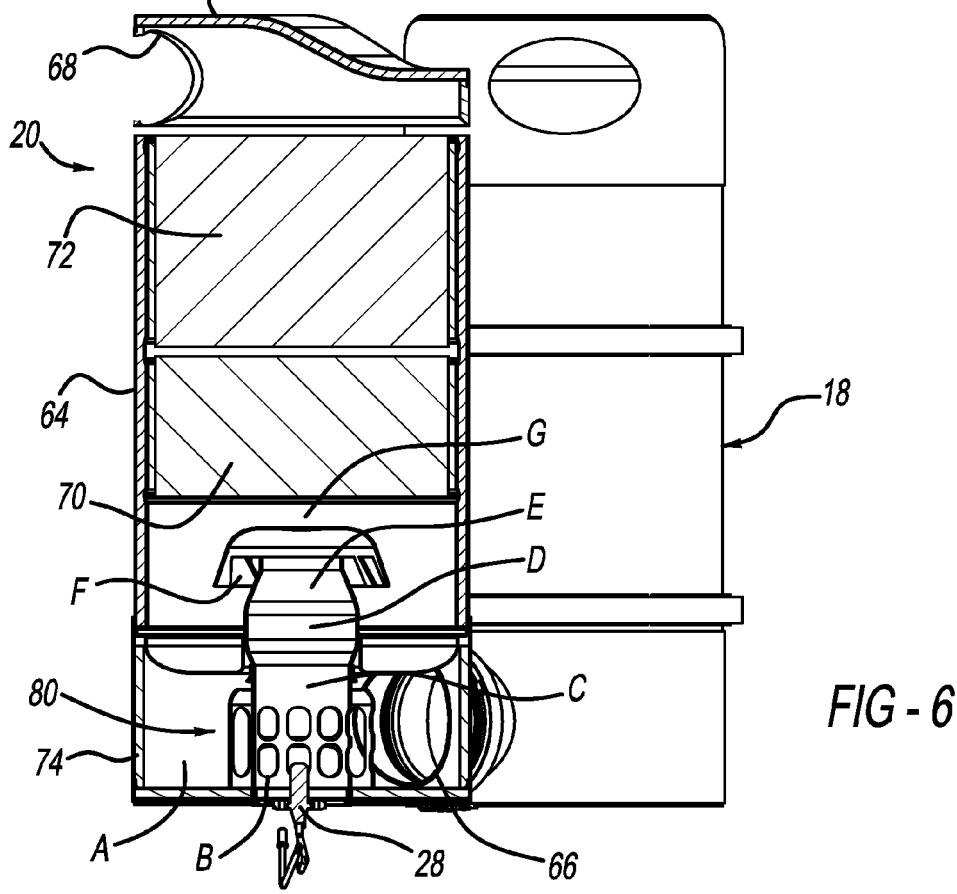
FIG. 6 is a cross-sectional view along line 6-6 in FIG. 4.

As illustrated in FIG. 6, mixing assembly 80 may be arranged in a direction orthogonal to an axis of inlet 66. The exhaust stream, therefore, will enter mixing assembly 80 orthogonally before being directed toward SCR 70. As the exhaust stream enters first end 84 of decomposition tube 82, a velocity of the exhaust stream may increase and the flow of the exhaust stream will become tortuous due to first and second perforations 96 and 100. As the exhaust enters radially expanded portion 88, the flow may tend to stay along the axis of the decomposition tube 82. Although the velocity of the exhaust stream may slow, the velocity only slows to a minimal extent that ensures satisfactory intermingling of the exhaust and reagent exhaust treatment fluid. In this regard, radially expanded portion 88 diffuses the turbulence in the exhaust flow created by perforations 96 and 100, which aids in minimizing any potential loss in velocity. Table 1, below, summarizes the peak velocity of the exhaust stream at various regions within exhaust treatment component 20.

TABLE 1

| Region | Peak Velocity (m/S) |
|---|---|
| A | 84 |
| B | 120 |
| C | 102 |
| D | 102 |
| E | 120 |
| F | 120 |
| G | 25 |

As can be seen in Table 1 and FIG. 6, as the exhaust stream enters from inlet 66, the exhaust may have a peak velocity of 84 m/s (Region A). As the exhaust enters mixing assembly 80 through collar 98 and first end portion 84 of decomposition tube 82, the velocity may increase (Region B). The increase in velocity at region B creates a large velocity differential between a velocity of the exhaust treatment fluid injected by dosing module 28 and the exhaust gas flowing through perforations 96 and 100. The velocity differential of the bulk exhaust flow results in aerodynamic forces greater than the surface tension characteristic of the exhaust treatment fluid, which leads to droplet breakup and atomization of the exhaust treatment fluid.

Then, as the exhaust enters radially expanded portion 88, the exhaust may slightly slow (Regions C and D). As the exhaust exits radially expanded portion and enters flow reversing device 106, the velocity may then increase (Regions E and F). The exhaust velocity may then decrease as the exhaust reaches SCR 70 (Region G). Because the exhaust velocity increases at a location (Region B) where the exhaust treatment fluid is dosed into the exhaust stream, and increases as it exits flow reversing device 106, the exhaust and exhaust treatment fluid can be sufficiently intermingled to ensure satisfactory atomization of the exhaust treatment fluid.

Regardless, while the exhaust stream is in radially expanded portion 88 (Region D), zones 120 of low velocity flow are present at positions adjacent inner walls 122 of decomposition tube 82 (FIG. 9). These zones 120 surround the exhaust stream as it passes through radially expanded portion 88, and assist in preventing wetting of inner walls 122 with the reagent exhaust treatment fluid. The prevention of the inner walls 122 being wetted prevents, or at least substantially minimizes, the build-up of solid urea deposits on the inner walls 122.

As the exhaust stream enters second end portion 86 of decomposition tube 82, a velocity of the exhaust stream will again increase and remain increased as it enters and exits flow reversing device 106. Upon entry into flow reversing device 106, the flow direction of the exhaust stream will be reversed back toward inlet 66. As the exhaust flow exits flow reversing device 106, the exhaust will be directed by vanes 114, which will assist in further intermingling of the exhaust and reagent exhaust treatment fluid. Additionally, the exhaust stream may impinge upon conically-narrowing portion 94 of decomposition tube 82, which can further assist in directing the exhaust stream away from mixing assembly 80. The exhaust stream is then free to flow towards SCR 70. It should be understood that the above-noted velocities may vary in later-described embodiments. In this regard, the velocities may be increased anywhere from 10%-20%.

Figure 12:
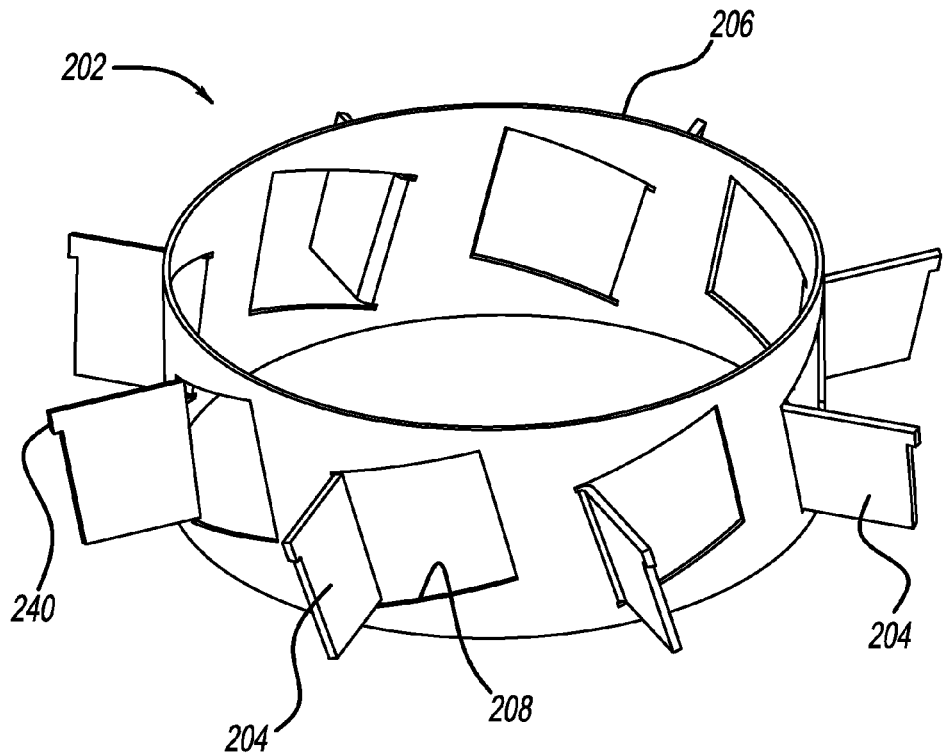
FIG. 12 is a perspective view of the dispersion device illustrated in FIG. 11 in an assembled state.
Figure 13:
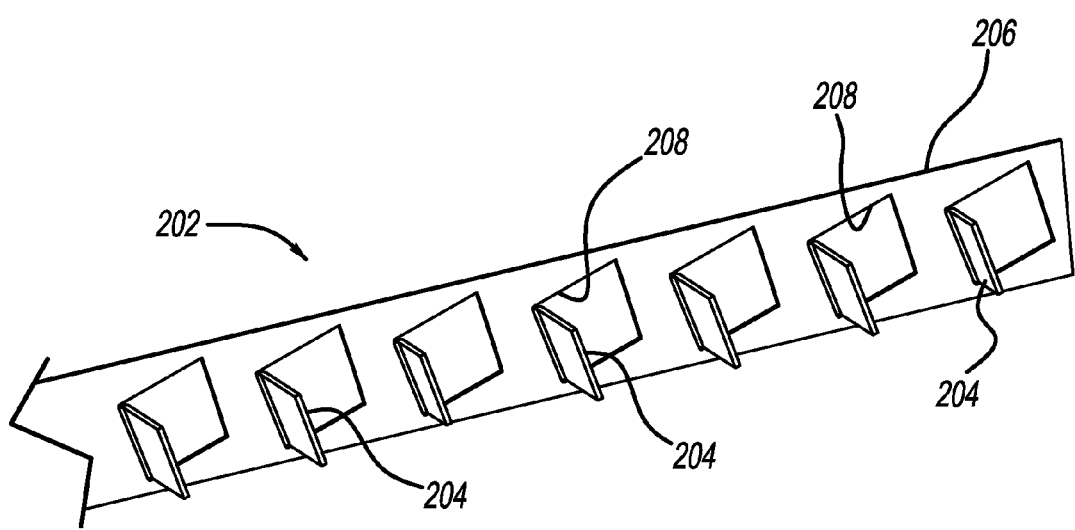
FIG. 13 is another perspective view of the dispersion device illustrated in FIG. 11 in an un-assembled state.

Now referring to FIGS. 10 to 13, a second exemplary mixing assembly 200 will be described. Mixing assembly 200 is similar to mixing assembly 80 illustrated in FIGS. 7 to 9. Description of components that are common to each assembly, therefore, is omitted herein for clarity. Mixing assembly 200 includes deflecting device 202 including a plurality of deflecting members 204. As best shown in FIG. 13, deflecting device 202 may be formed from an elongate strip 206 of metal such as aluminum, steel, titanium, or any other material known to one skilled in the art. Deflecting members 204 are integral (i.e., unitary) with elongate strip 206 and are formed as planar tabs that are bent radially outward from elongate strip 206 from a plurality of cut-outs 208 formed in elongate strip 206.

Deflecting members 204 may be designed to function in a manner similar to vanes 114. In this regard, as the exhaust flow exits flow reversing device 106, the exhaust will be directed by deflecting members 204, which will assist in further intermingling of the exhaust and reagent exhaust treatment fluid. As best shown in FIGS. 12 and 13, cut-outs 208 are angled relative to a length of elongate strip 206. When deflecting members 204 are bent outward from elongate strip 206, deflecting members 204 will also be angled relative to an axis of mixing assembly 200, which may be used to direct the exhaust flow in predetermined directions upon exiting flow reversing device 106.

Deflecting members 204 may have a length that is substantially equal to a distance between second end portion 86 of decomposition tube 82 and outer wall 118 of flow reversing device 106. Alternatively, deflecting members 204 may have a length that is less than the distance between second end portion 86 and outer wall 118. In another alternative, deflecting members 204 may each have a terminal projection 210 that provides deflecting members 204 with a length that is greater than the distance between second end portion 86 and outer wall 118. Terminal projection 210 may then abut a terminal end 212 of outer wall 118 of flow reversing device 106, which assists in positioning deflecting device 202 relative to flow reversing device 106. Terminal projections 210 may also assist in securing deflecting device 202 to flow reversing device 106, by providing a location to weld, braze, or secure each tab to flow reversing device 106, if desired.

Figure 14:
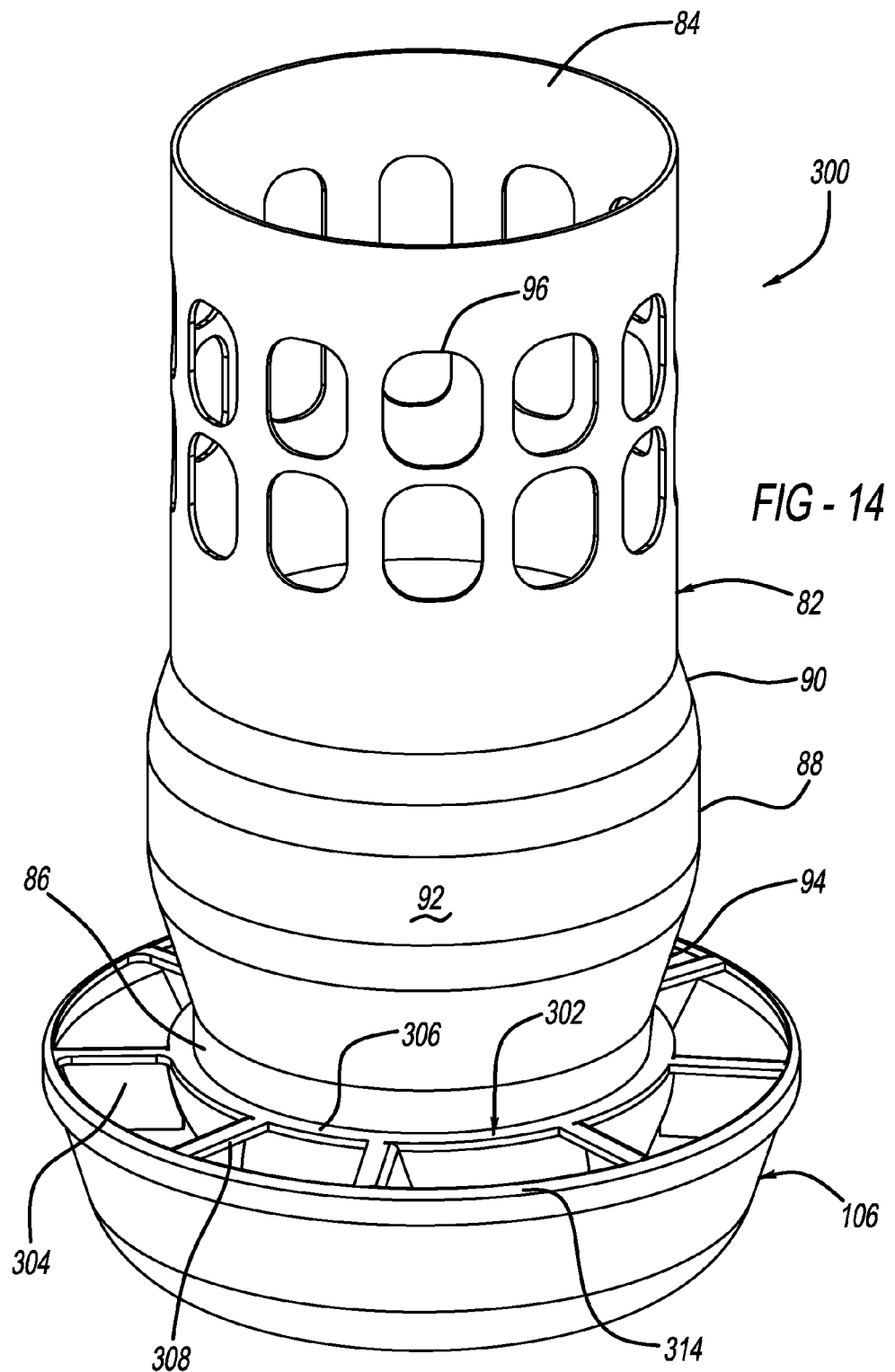
FIG. 14 is a perspective view of a mixing assembly according to a third exemplary embodiment of the present disclosure.
Figure 15:
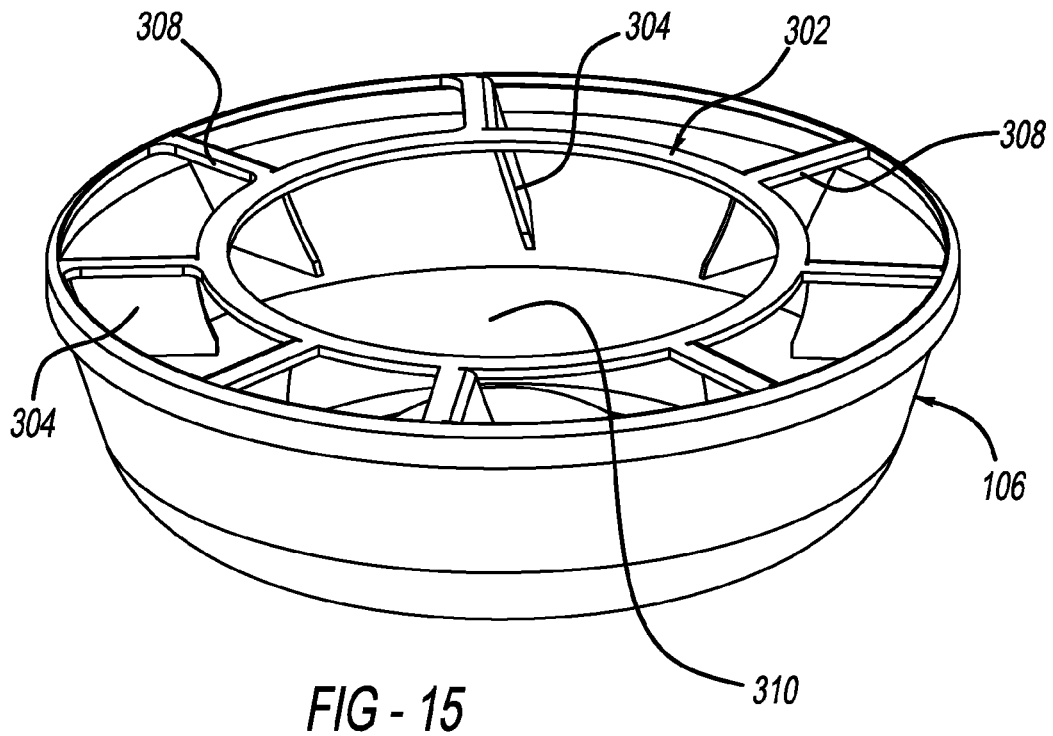
FIG. 15 is a perspective view of a flow-reversing device and dispersion device of the mixing assembly illustrated in FIG. 14.
Figure 16:
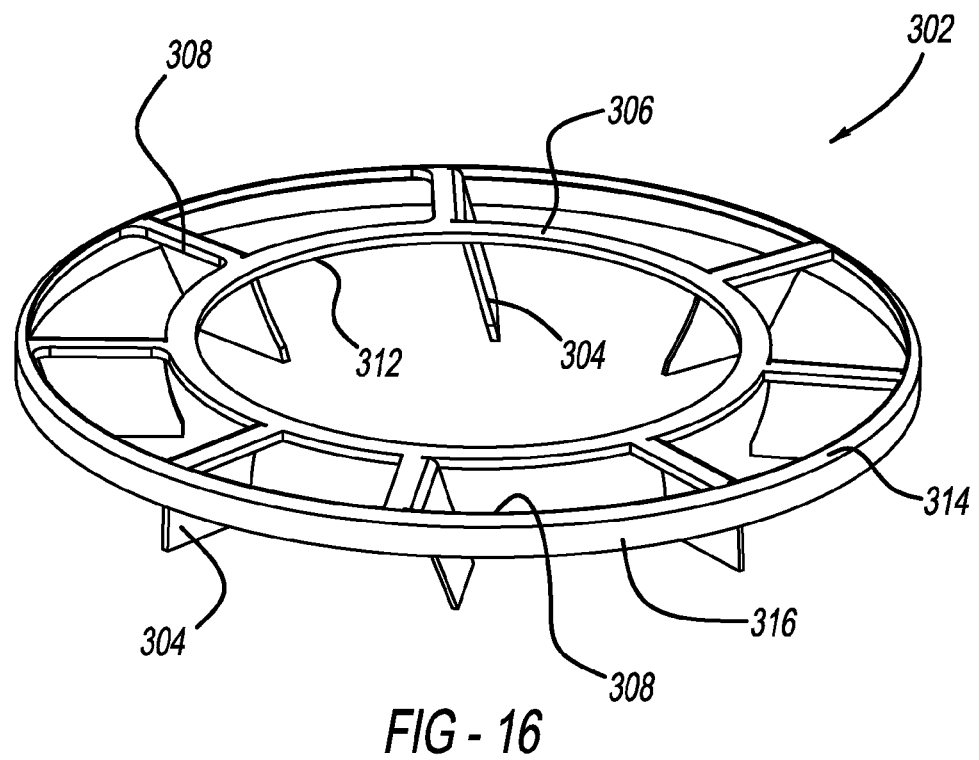
FIG. 16 is a perspective view of the dispersion device illustrated in FIG. 15.

Now referring to FIGS. 14 to 16, a third exemplary mixing assembly 300 is illustrated. Mixing assembly 300 is substantially similar to mixing assembly 80 illustrated in FIGS. 7 to 9. Description of components that are common to each assembly, therefore, is omitted herein for clarity. Although collar 98 is not illustrated in FIG. 14, it should be understood that mixing assembly 300 may include collar 98. Mixing assembly 300 includes deflecting device 302 including a plurality of deflecting members 304. As best shown in FIG. 15, deflecting device 302 may be formed from an annular ring 306 of metal such as aluminum, steel, titanium, or any other material known to one skilled in the art. Deflecting members 304 are integral (i.e., unitary) with annular ring 306 and are formed as planar tabs that may be bent axially outward from annular ring from a plurality of cut-outs 308 formed in annular ring 306. Although deflecting members 304 are illustrated as being bent in a direction toward an interior 310 of flow reversing device 106, it should be understood that deflecting members 304 can be bent in a direction away from interior 310.

Deflecting members 304 may be designed to function in a manner similar to vanes 114. In this regard, as the exhaust flow exits flow reversing device 106, the exhaust will be directed by deflecting members 304, which will assist in further intermingling of the exhaust and reagent exhaust treatment fluid. Deflecting members 304 may also be angled relative to an axis of mixing assembly 300, which may be used to direct the exhaust flow in predetermined directions upon exiting flow reversing device 106.

Once deflecting members 304 are bent into the desired orientation, an inner ring 312 and an outer ring 314 of deflecting device will be defined. Inner ring 312 may be used to secure deflecting device 302 to second end portion 86 of decomposition tube 82 by welding, brazing, or any other fixing method known in any manner known to one skilled in the art. Deflecting device 302 may also include an axially-extending flange 316 that extends outward from outer ring 314. Axially-extending flange 316 may correspond to terminal end 212 of flow reversing device 106 (FIG. 11), and overlap terminal end 212 such that axially-extending flange 316 may be secured to flow reversing device 106 by welding, brazing, or any other attachment method known.

Figure 17:
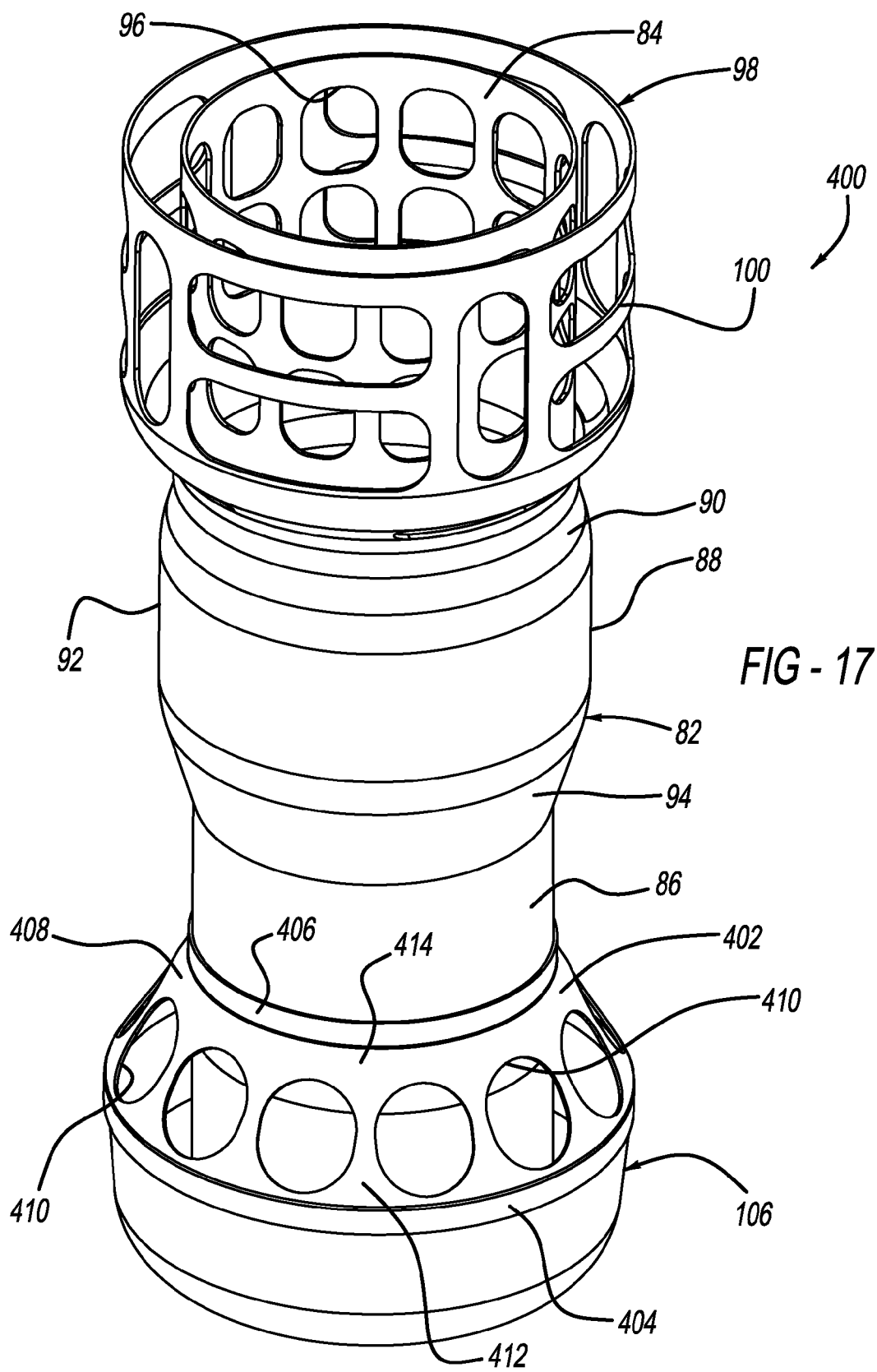
FIG. 17 is a perspective view of a mixing assembly according to a fourth exemplary embodiment of the present disclosure.
Figure 18:
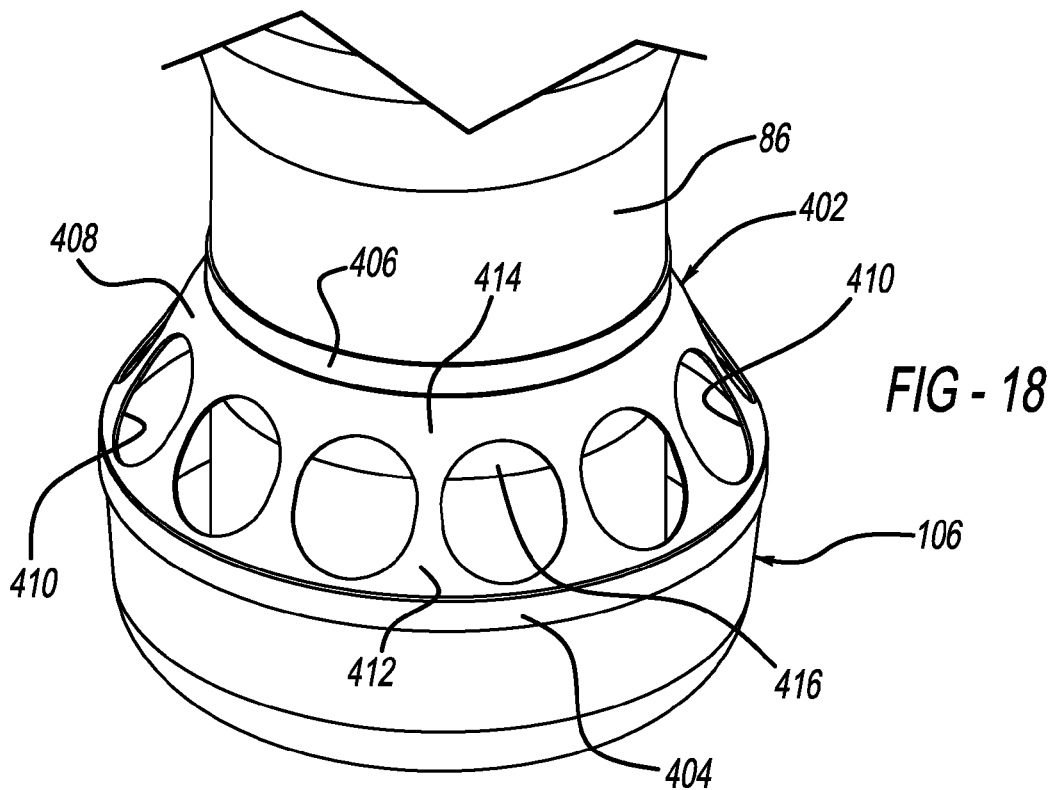
FIG. 18 is a partial-perspective view of the mixing assembly illustrated in FIG. 17.
Figure 19:
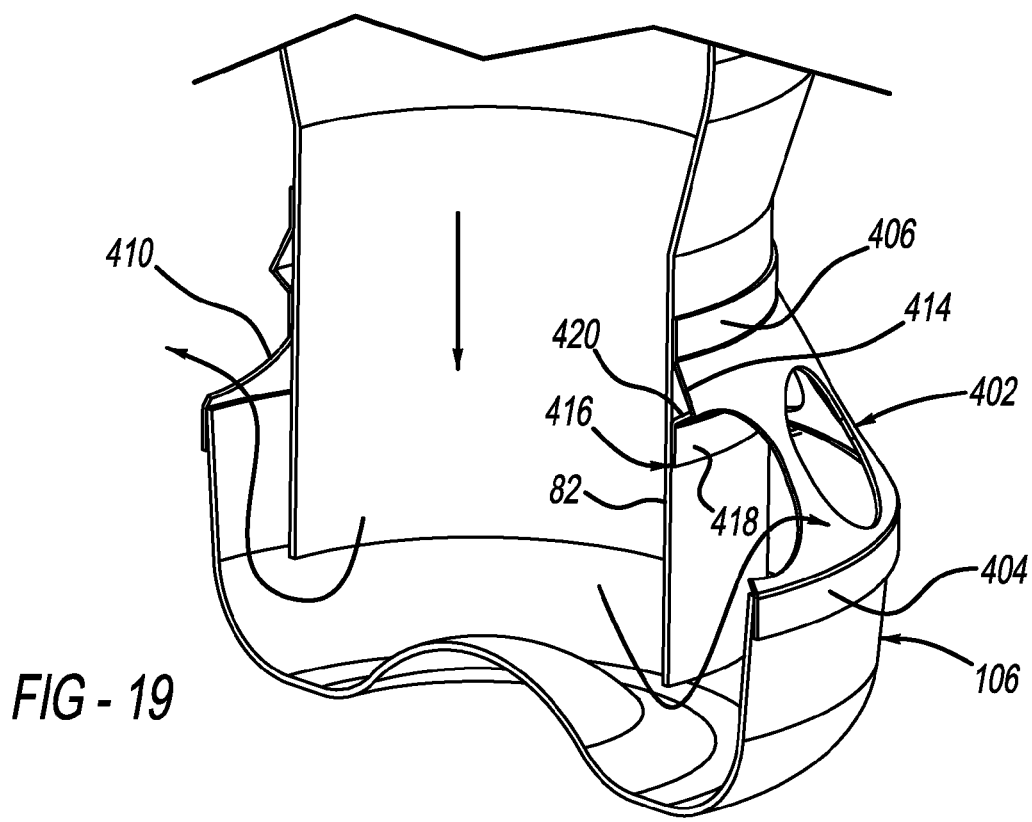
FIG. 19 is a perspective cross-sectional view of FIG. 17.

Now referring to FIGS. 17 to 19, a fourth exemplary embodiment is illustrated. Mixing assembly 400 is similar to mixing assembly 80 illustrated in FIGS. 7 to 9. Description of components that are common to each assembly, therefore, is omitted herein for clarity. Mixing assembly 400 includes flow reversing device 106 at second end portion 86, which is a substantially cup-shaped member having a central bulge formed therein. In contrast to deflecting members 204 and 304 described above, mixing assembly 400 may include a flow-dispersing cap 402 coupled between flow reversing device 106 and decomposition tube 82.

Flow-dispersing cap 402 includes a first axially-extending lip 404 that couples flow-dispersing cap 402 to flow reversing device 106, and a second axially-extending lip 406 that couples flow-dispersing cap 402 to decomposition tube 82. Between axially-extending lips 404 and 406 is a perforated conically-shaped ring 408 having a plurality of through-holes 410. Similar to first and second perforations 96 and 100, through-holes 410 assist in creating turbulence and increasing a velocity of the exhaust stream as it exits flow reversing device 106. Through-holes 410 can be sized and shaped in any manner desired. In this regard, although through-holes 410 are illustrated as being circular, it should be understood that through-holes can be any shape including square, rectangular, triangular, oval, and the like. Conically-shaped ring 408 can include a first portion 412 adjacent first axially-extending lip 404, and a second portion 414 adjacent second axially-extending lip 406.

A diverter ring 416 may be positioned between second portion 414 and decomposition tube 82. As best shown in FIG. 19, diverter ring 416 includes a cylindrical portion 418 coupled to decomposition tube 82, and an angled flange 420 extending away from cylindrical portion 418 between decomposition tube 82 and conically-shaped ring 408. Angled flange 420 may be positioned at any angle desired to further assist in diverting flow out from mixing assembly 400. In this regard, angled flange may be angled relative to cylindrical portion 418 in the range of 25 to 75 degrees, preferably in the range of 35 to 65 degrees, and most preferably at an angle of degrees.

Upon entry into flow reversing device 106, the flow direction of the exhaust stream will be reversed back toward inlet 66. As the exhaust flow exits flow reversing device 106, the exhaust will be directed by diverter ring 416 out through through-holes 410, which will assist in further intermingling of the exhaust and reagent exhaust treatment fluid. The exhaust stream is then free to flow towards SCR 70.

Figure 20:
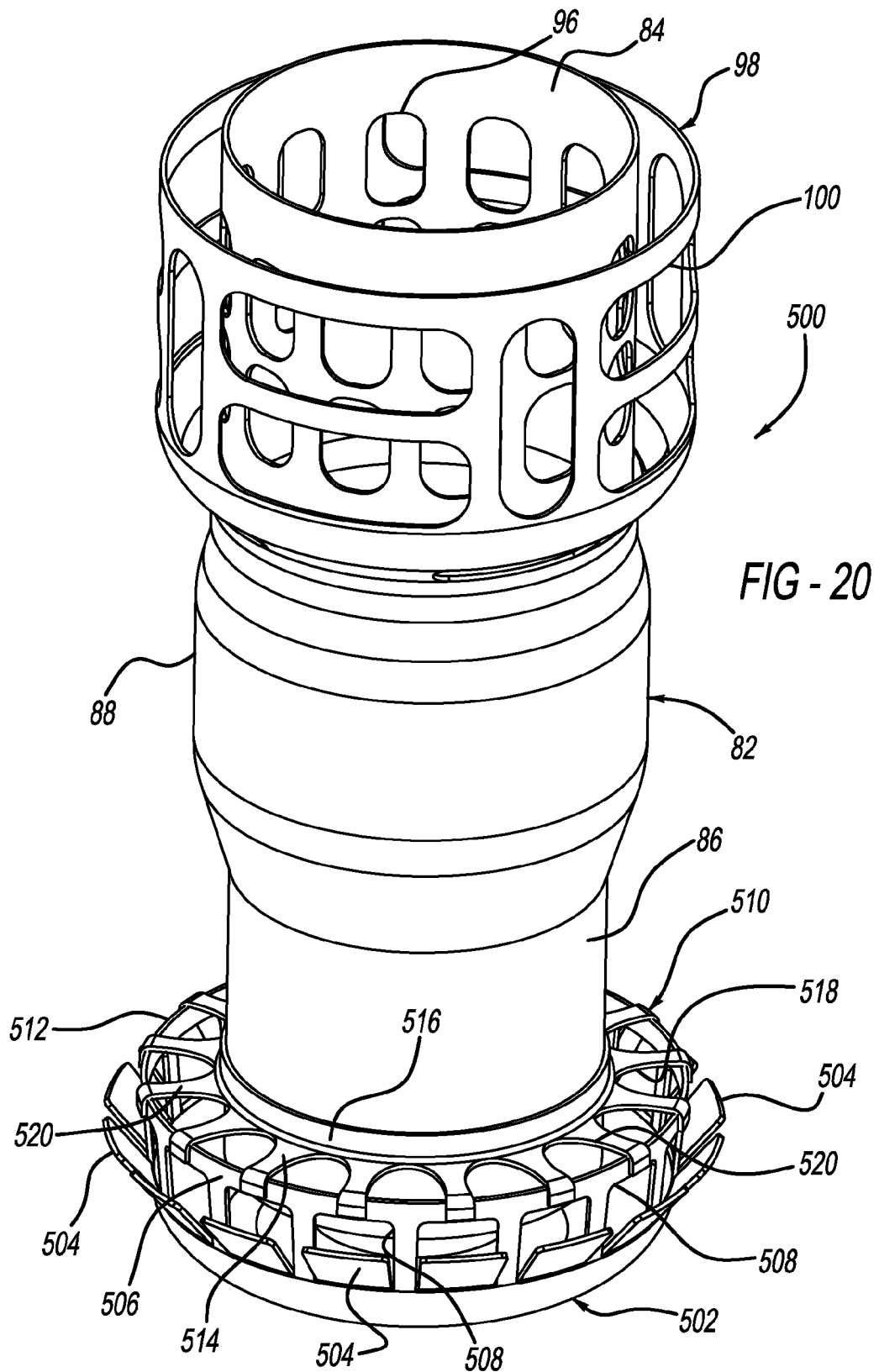
FIG. 20 is a perspective view of a mixing assembly according to a fifth exemplary embodiment of the present disclosure.
Figure 21:
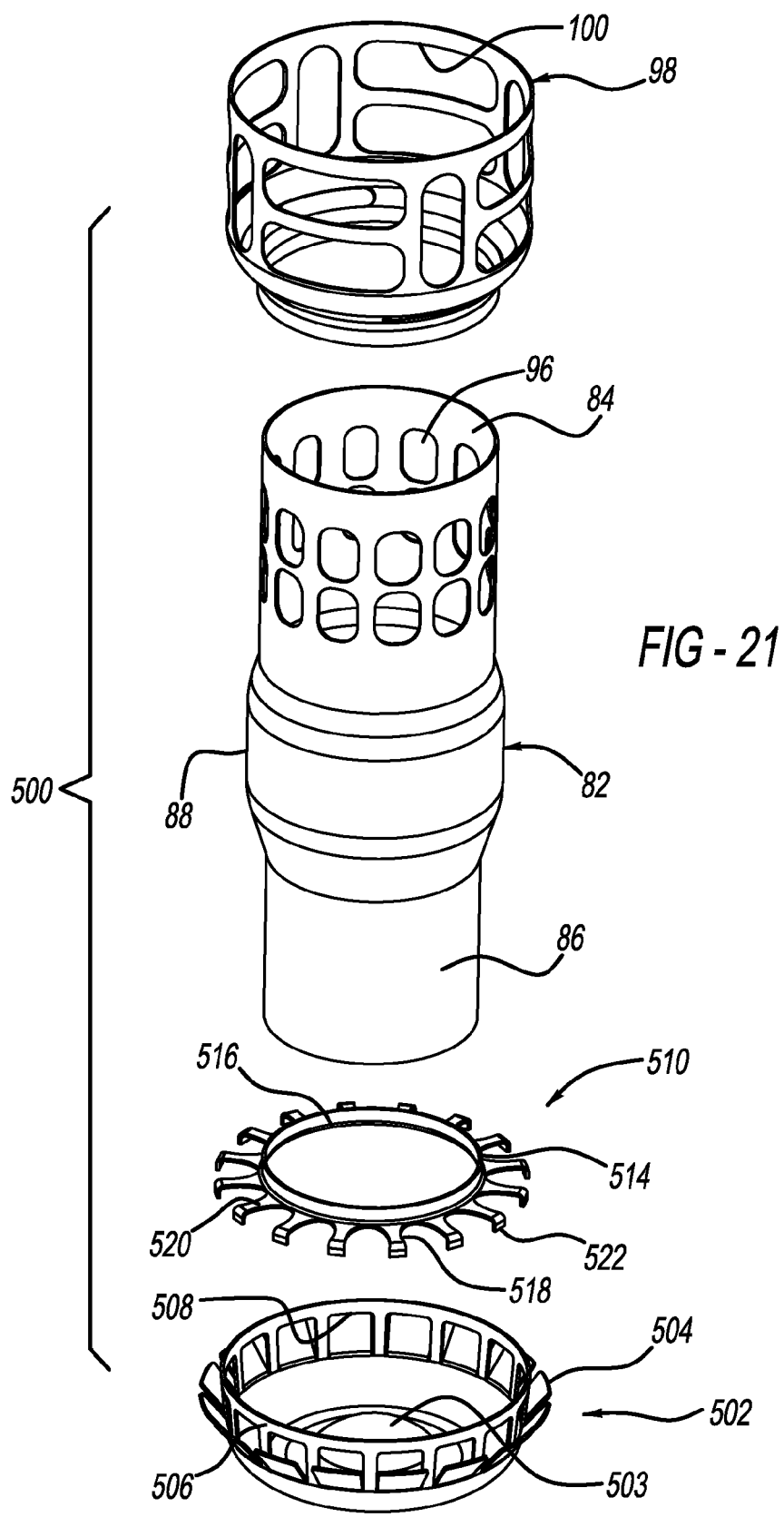
FIG. 21 is an exploded perspective view of the mixing assembly illustrated in FIG. 10.

Now referring to FIGS. 20 and 21, a fifth exemplary embodiment is illustrated. Mixing assembly 500 is substantially similar to mixing assembly 80 illustrated in FIGS. 7 to 9. Description of components that are common to each assembly, therefore, is omitted herein for clarity. Mixing assembly 500 includes flow reversing device 502 at second end portion 86 of decomposition tube 82, which is a substantially cup-shaped member having a central bulge 503 formed therein. Flow reversing device 502 may include a plurality of flow deflecting members 504 formed in an outer wall 506 thereof. Deflecting members 504 are integral (i.e., unitary) with flow reversing device 502 and are formed as planar tabs that are that are bent radially outward from outer wall 506 from a plurality of cut-outs 508 formed in outer wall 506. Deflecting members 504 may be designed to function in a manner similar to vanes 114. In this regard, as the exhaust flow exits flow reversing device 502 through cut-outs 508, the exhaust flow will become turbulent and deflected by deflecting members 504, which will assist in further intermingling of the exhaust and reagent exhaust treatment fluid.

Mixing assembly 500 may further include a dispersing ring 510 positioned between a terminal end 512 of flow reversing device 502 and decomposition tube 82. Dispersing ring 510 may be formed from an annular ring 514 of metal such as aluminum, steel, titanium, or any other material known to one skilled in the art. A cylindrical flange 516 may extend axially away from annular ring 514. Cylindrical flange 516 may be welded, brazed, or secured in any manner known, to decomposition tube 82. Annular ring 514 includes a plurality of scallop-shaped recesses 518 formed therein. Recesses 518 serve as exit ports to allow the exhaust stream to exit mixing assembly 500. Accordingly, the exhaust stream may exit through cut-outs 508, or may exit through recesses 518. Adjacent recesses 518 may be separated by a land portion 520 of the annular ring 514. A terminal end 522 of each land portion 520 located opposite to cylindrical flange 516 may be bent in the axial direction to provide an abutment surface that can position dispersing ring 510 relative to flow reversing device 502 before dispersing ring 510 is secured to decomposition tube 82.

Upon entry into flow reversing device 502, the flow direction of the exhaust stream will be reversed back toward inlet 66. As the exhaust flow exits flow reversing device 502, the exhaust may exit through cut-outs 508 and be deflected in a desired direction by deflecting members 504, or the exhaust stream may exit through recesses 518 formed in dispersing ring 510. Regardless of the location at which the exhaust stream exits mixing assembly 500, the exhaust stream is further intermingled with the reagent exhaust treatment fluid before flowing toward SCR 70.

Figure 22:
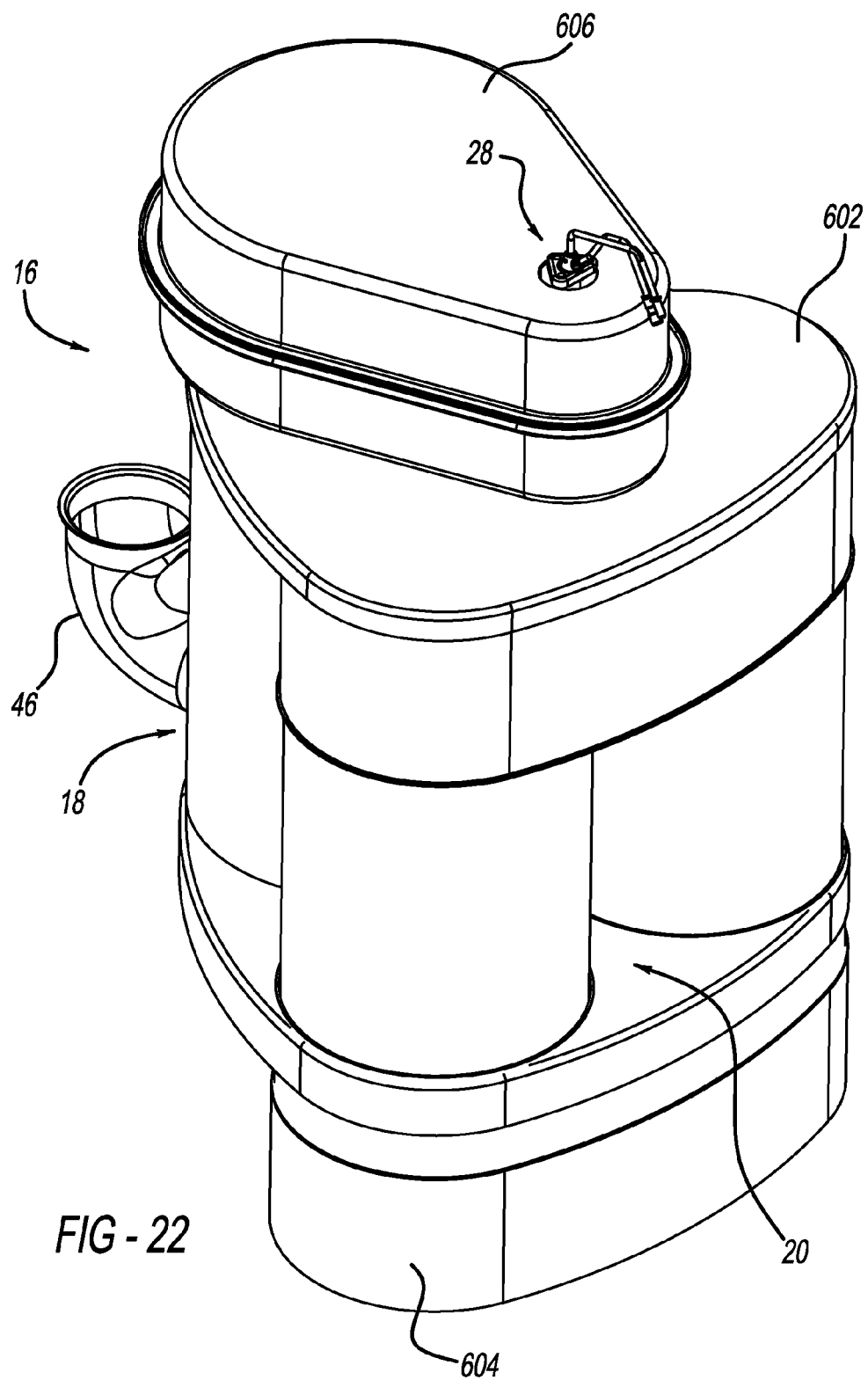
FIG. 22 is a perspective view of an exhaust treatment component according to a principle of the present disclosure.
Figure 23:
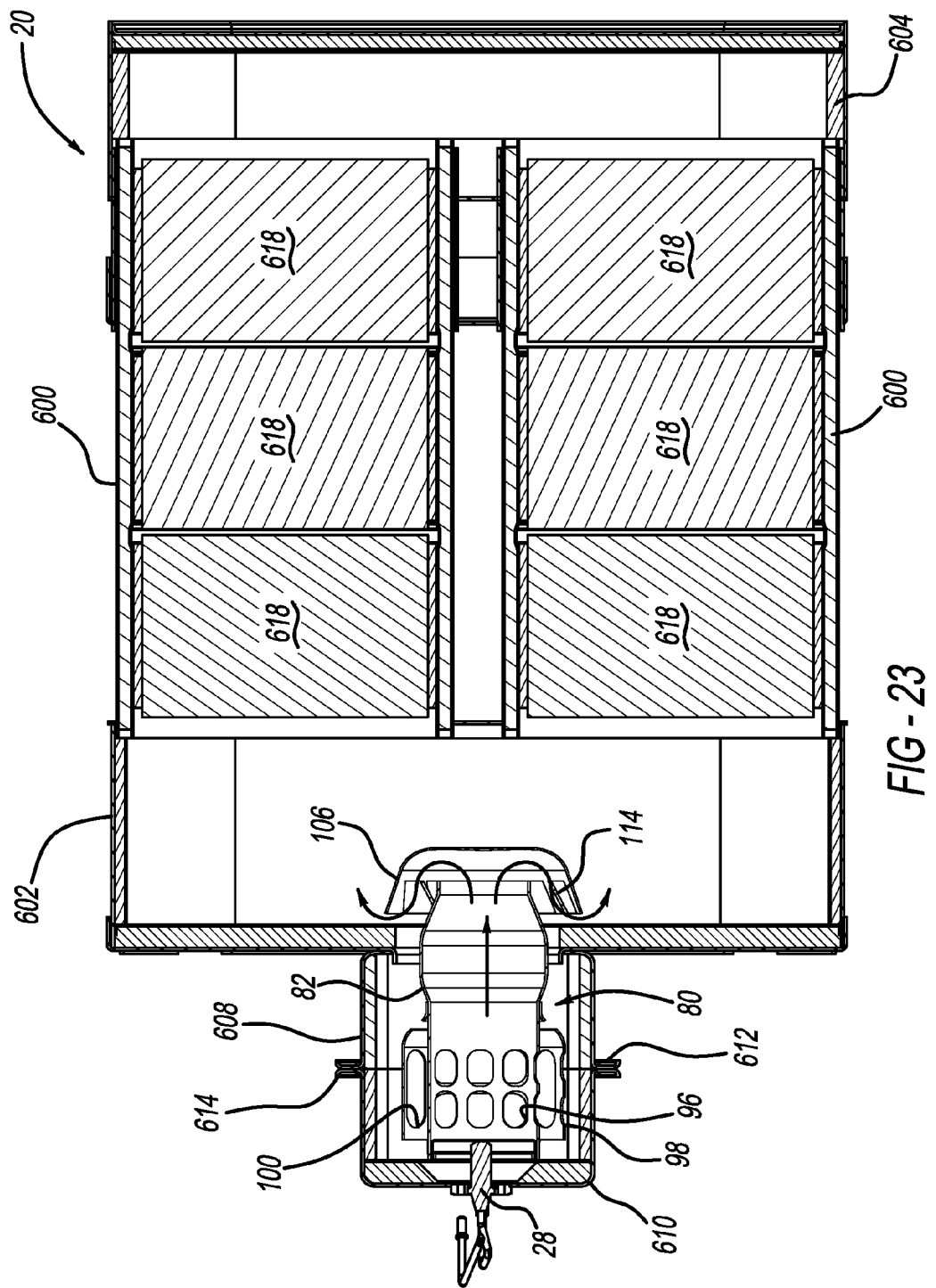
FIG. 23 is a cross-sectional view of the exhaust treatment component illustrated in FIG. 22.

Although each mixing assembly has been described relative to use in an exhaust treatment component 20 including a single SCR 70, the present disclosure should not be limited thereto. As best shown in FIGS. 22 and 23, mixing assemblies can be used in an exhaust treatment component 20 having a pair of SCRs 70. FIG. 22 illustrates a pair of exhaust treatment components 18 and 20, arranged in parallel. Exhaust treatment component 18 is similar to the previously-described embodiments so description thereof will be omitted.

Exhaust treatment component 20, as best shown in FIG. 23, includes mixing assembly 80 (or any other mixing assembly described above) for intermingling exhaust treatment fluid dosed into the exhaust stream by dosing module 28. Exhaust treatment component 20 includes a pair of housings 600 in communication with a pair of end caps 602 and 604. End caps 602 and 604 may be secured to housings 600 by welding, or may be secured to housings 600 by clamps (not shown). Mixing assembly 80 and dosing module 28 are secured in a conduit 606 that provides communication between exhaust treatment component 18 and exhaust treatment component 20. Conduit 606 may include a first portion 608 and a second portion 610 each including a flange 612 and 614, respectively, that may be secured by welding, or by a clamp (not shown). Each housing 600 supports a plurality of exhaust treatment component substrates 618, which may be a combination of SCRs, ammonia slip catalysts, and filters for treating the mixture of exhaust and exhaust treatment fluid.

As the exhaust enters mixing assembly 80, the urea exhaust treatment fluid may be dosed directly into mixing assembly 80 by dosing module 28. As the mixture of exhaust and exhaust treatment fluid travels through decomposition tube 82 and flow reversing device 106, the exhaust treatment fluid and exhaust stream will be sufficiently intermingled before passing through exhaust treatment component substrates 618. Mixing assembly 80 may include deflecting members or vanes 114 to assist in intermingling the exhaust and exhaust treatment fluid. Because a pair of housings 600 each including exhaust treatment component substrates 618 is used in the exemplary embodiment, vanes 114 may be positioned within flow reversing device 106 to ensure that a substantially equal amount of the exhaust stream is directed to each housing 600. That is, it should be understood that deflecting members 114 (and the deflecting members in each exemplary embodiment) can be oriented and positioned to direct the exhaust in the desired direction. In this manner, the exhaust can be properly treated by exhaust treatment component substrates 618.

Figure 24:
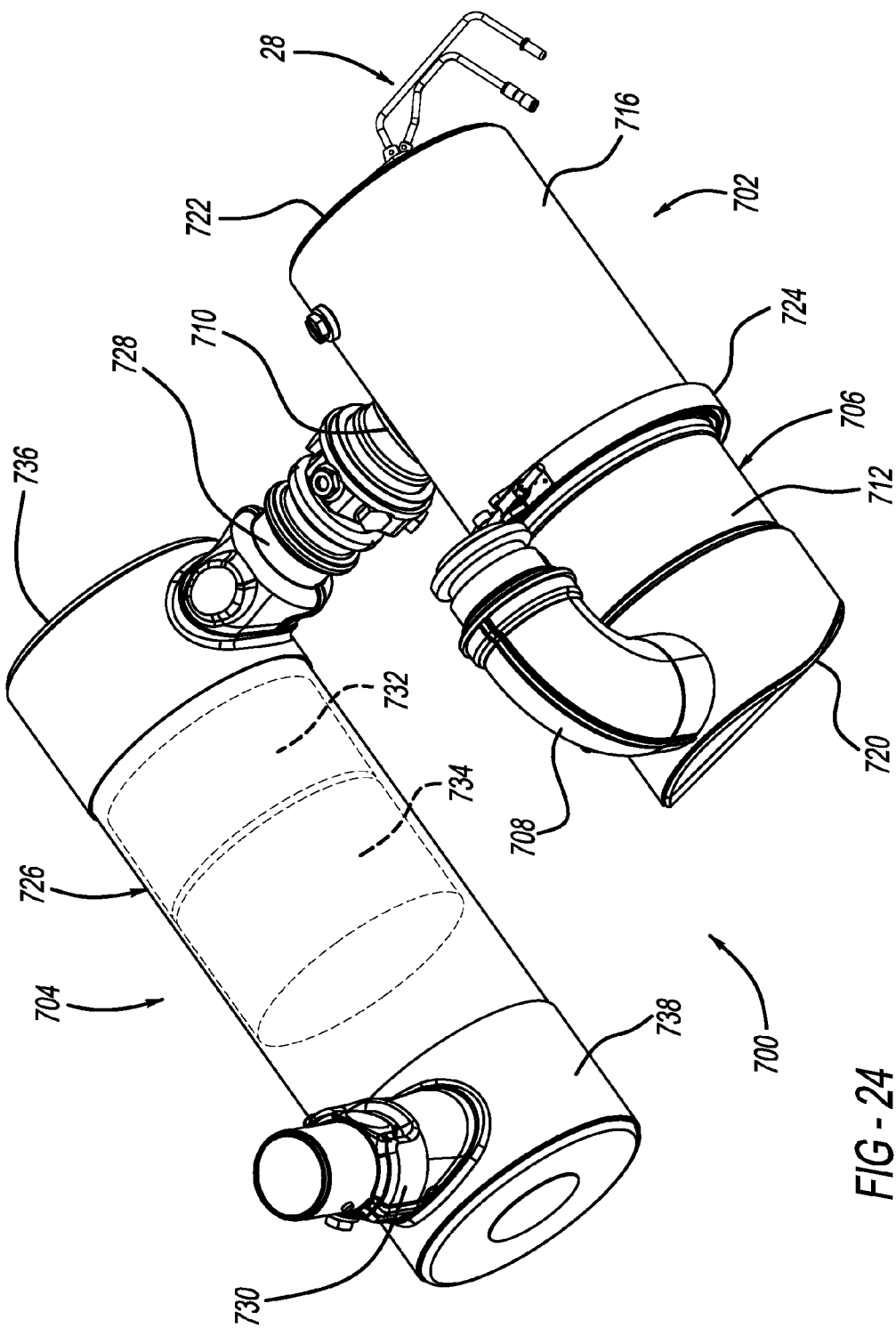
FIG. 24 is a perspective view of an exhaust after-treatment system according to a principle of the present disclosure.
Figure 25:
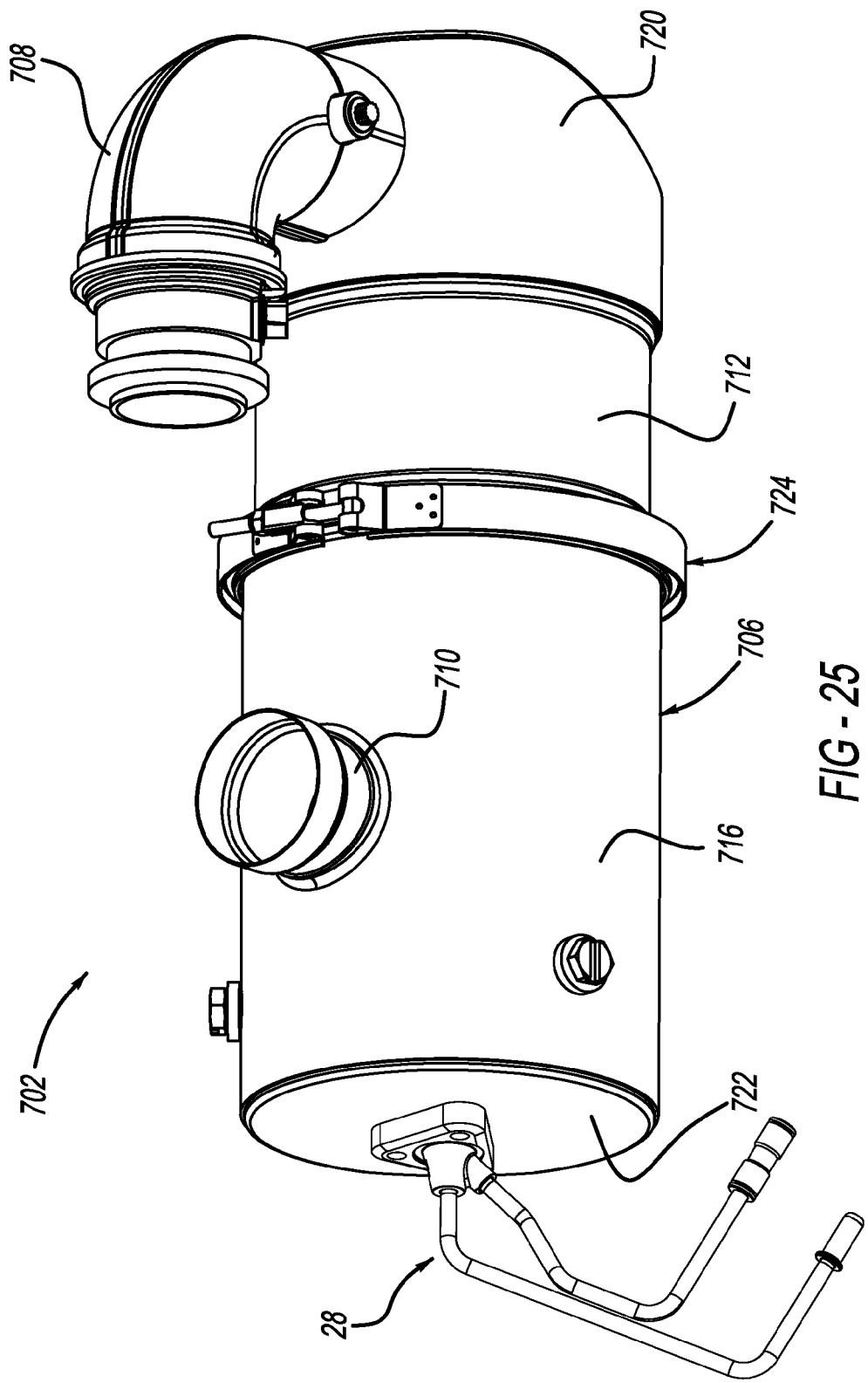
FIG. 25 is a perspective view of an exhaust treatment component that forms part of the exhaust after-treatment system illustrated in FIG. 24.
Figure 26:
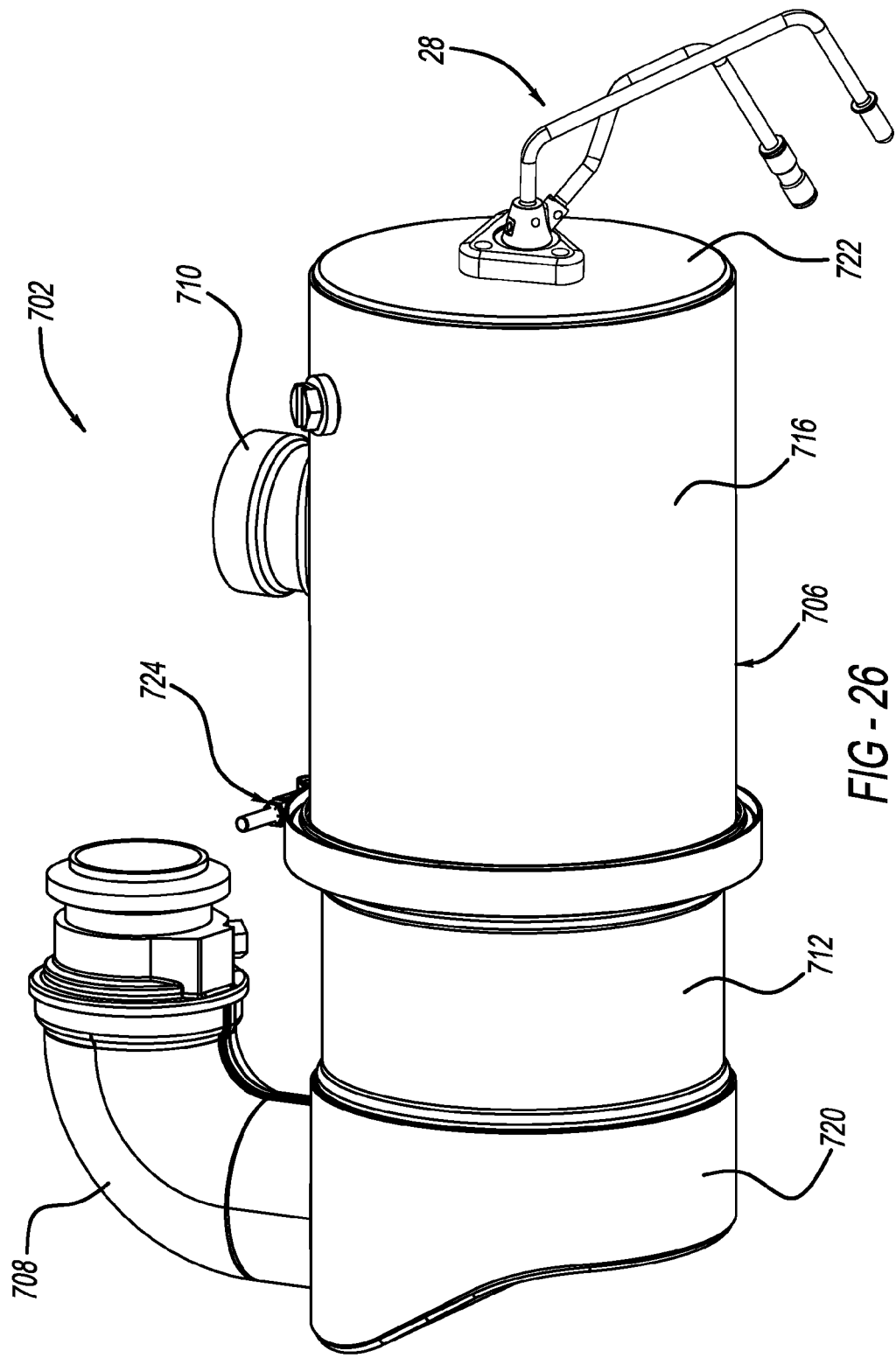
FIG. 26 is another perspective view of the exhaust treatment component illustrated in FIG. 25.
Figure 27:
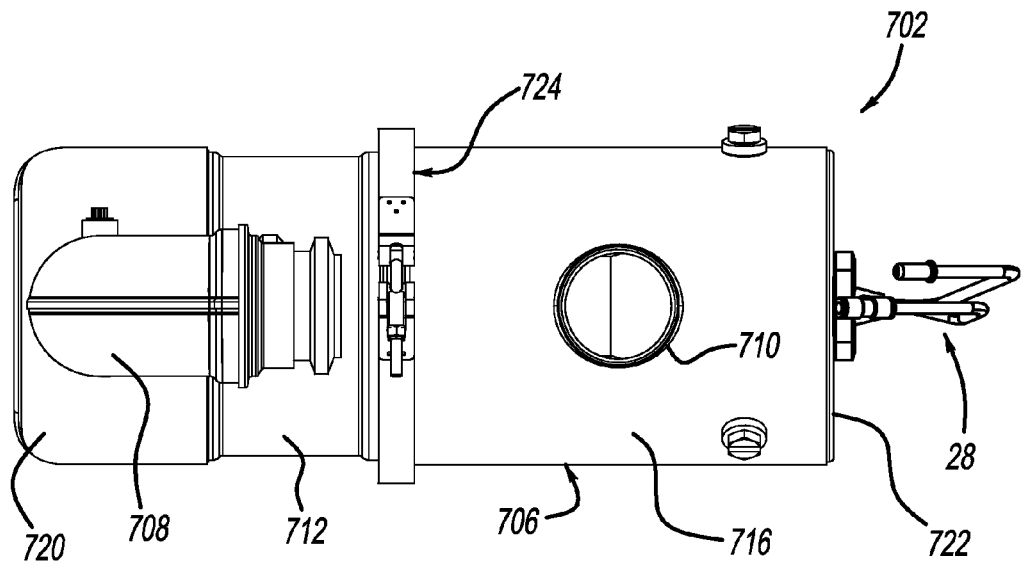
FIG. 27 is a top-perspective view of the exhaust treatment component illustrated in FIG. 25.
Figure 28:
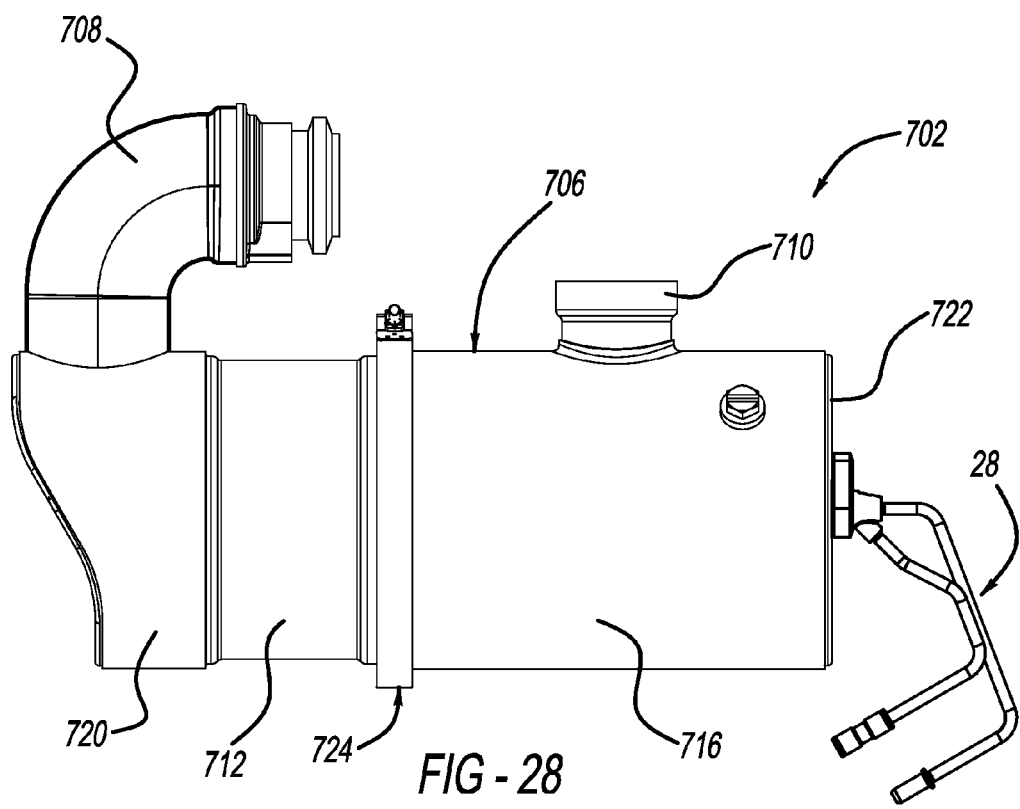
FIG. 28 is a side-perspective view of the exhaust treatment component illustrated in FIG. 25.

Now referring to FIGS. 24-30, an exemplary exhaust treatment assembly 700 including exhaust treatment components 702 and 704 is illustrated. As best shown in FIG. 24, exhaust treatment components 702 and 704 are arranged parallel to one another. It should be understood, however, that exhaust treatment components 702 and 704 can be arranged substantially co-axially, without departing from the scope of the present disclosure.

Exhaust treatment component 702 may include a housing 706, an inlet 708, and an outlet 710. Inlet 708 may be in communication with exhaust passage 14, and outlet 710 may be in communication with exhaust treatment component 704. Although outlet 710 is illustrated as being directly connected to exhaust treatment component 704, it should be understood that an additional conduit (not shown) may be positioned between outlet 710 and exhaust treatment component 704. The additional conduit can be non-linear such that the flow of exhaust through the conduit must turn before entering exhaust treatment component 704.

Figure 29:
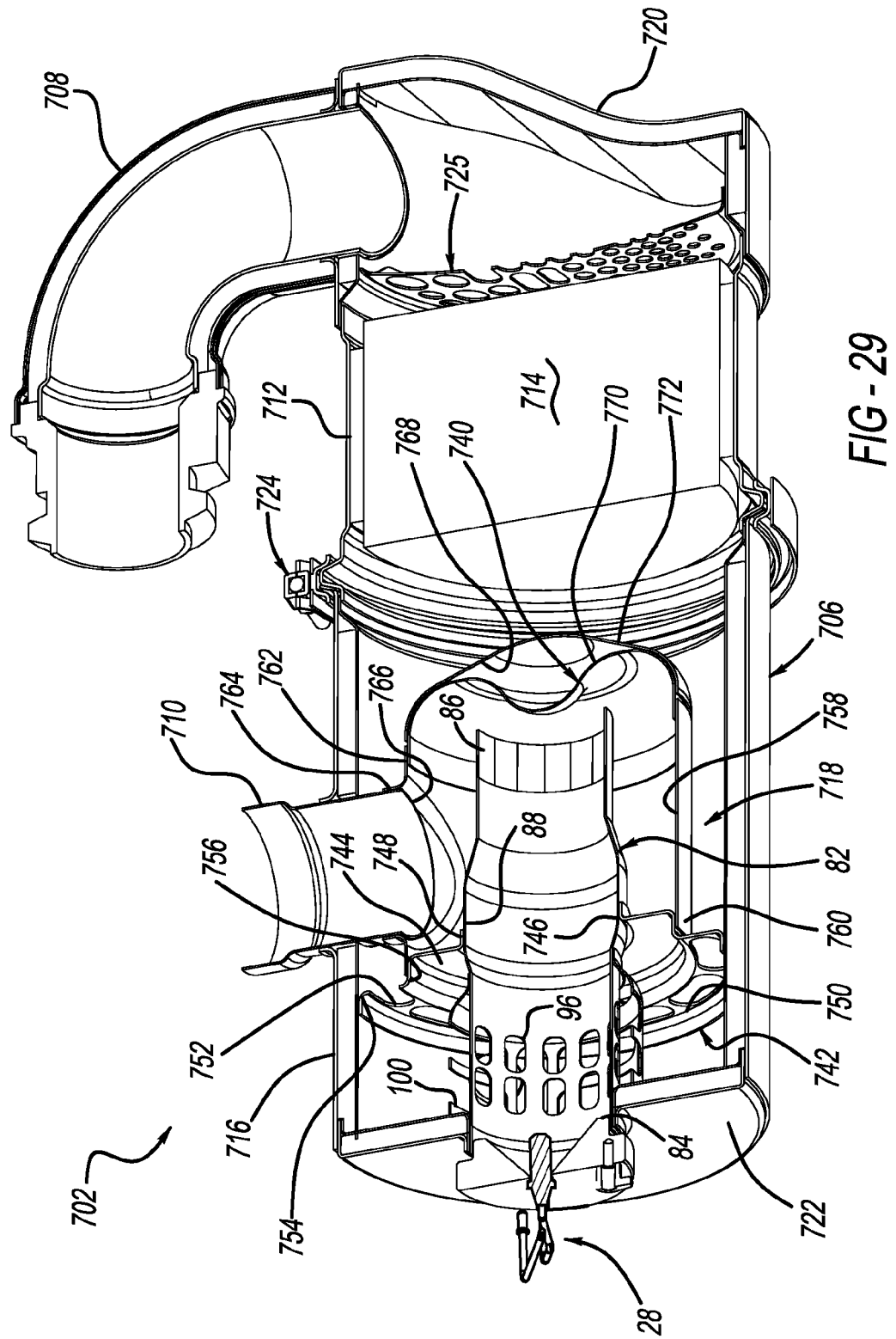
FIG. 29 is a cross-sectional perspective view of the exhaust treatment component illustrated in FIG. 25.
Figure 30:
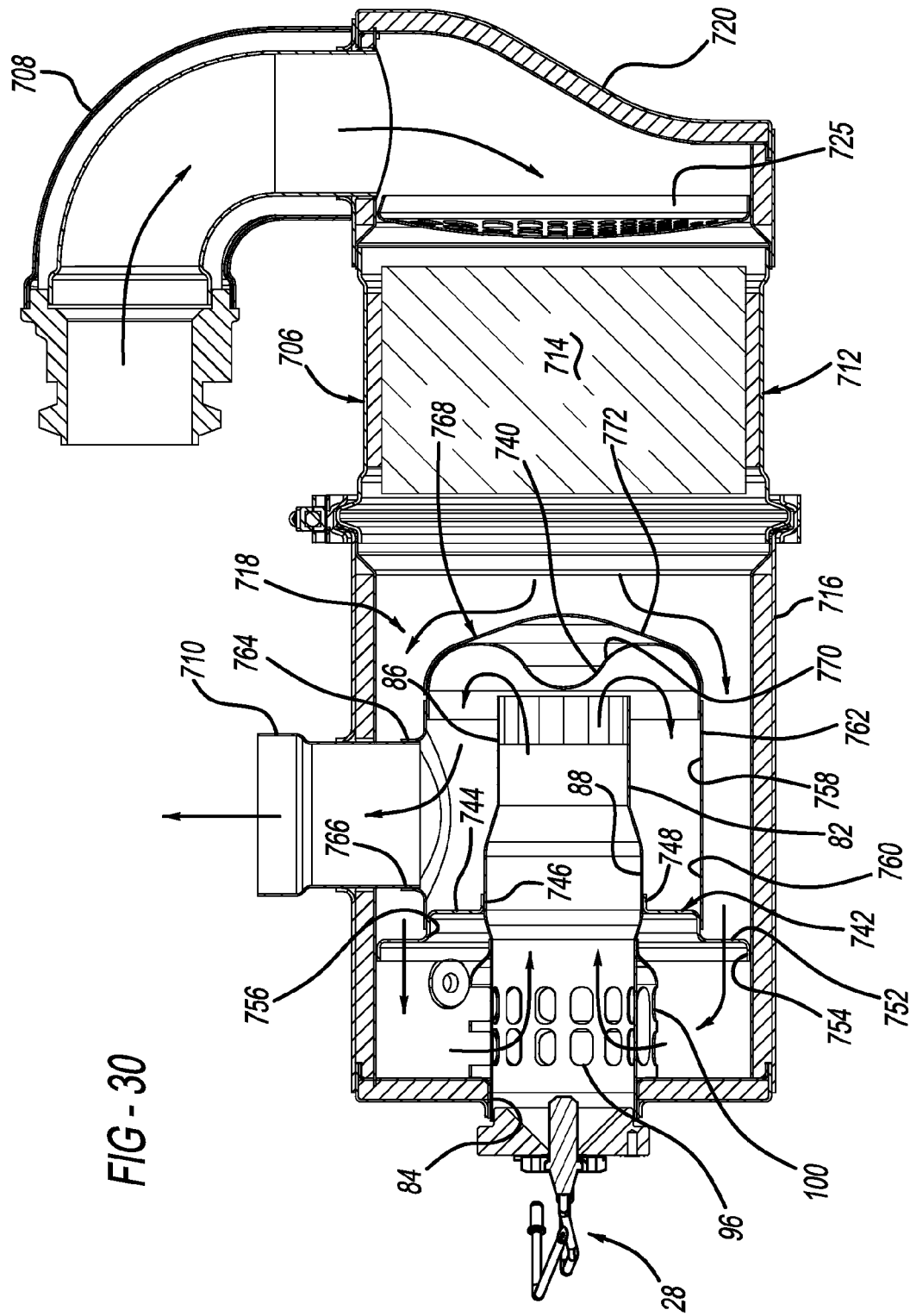
FIG. 30 is a cross-sectional view of the exhaust treatment component illustrated in FIG. 25.

Housing 706 can be cylindrically-shaped and may include a first section 712 supporting a DOC 714, and a second section 716 supporting a mixing assembly 718 (FIGS. 29 and 30). DOC 714 may be replaced by for example, a DPF or catalyst-coated DPF without departing from the scope of the present disclosure. Opposing ends of housing 706 can include end caps 720 and 722 to hermetically seal housing 706. End caps 720 and 722 can be slip-fit and welded to first and second sections 712 and 716, respectively. First and second sections 712 and 716 may be secured by a clamp 724. Alternatively, first and second sections 712 and 716 may be slip fit or welded, without departing from the scope of the present disclosure. The use of clamp 724 allows for easy removal of DOC 714 or mixing assembly 718 for maintenance, cleaning, or replacement of these components. A perforated baffle 725 may be positioned immediately downstream from inlet 708 and upstream for DOC 714. Exhaust from exhaust passage 14 will enter inlet 708, pass through perforated baffle 725, DOC 714, and mixing assembly 718, and exit outlet 710 before entering exhaust treatment component 704.

Exhaust treatment component 704 is substantially similar to exhaust treatment component 702. In this regard, exhaust treatment component 704 may include a housing 726, an inlet 728, and an outlet 730. Inlet 728 communicates with outlet 710 of exhaust treatment component 702, and outlet 730 may be in communication with a downstream section of exhaust passage 14.

Housing 726 can be cylindrically-shaped and may support an SCR 732 and ammonia slip catalyst 734. SCR 732 is preferably located upstream of ammonia slip catalyst 734. Opposing ends of housing 726 can include end caps 736 and 738 to hermetically seal housing 726. End caps 736 and 738 can be slip-fit and welded to housing 726. Alternatively, end caps 736 and 738 can be secured to housing 726 by clamps (not shown). Exhaust from outlet 710 of exhaust treatment component 702 will enter inlet 728, pass through SCR 732 and ammonia slip catalyst 734, and exit outlet 730 before entering the downstream section of exhaust passage 14.

Dosing module 28 may be positioned on end cap 722 at a location proximate outlet 710. As in previously described embodiments, dosing module 28 is operable to inject a reductant such as a urea exhaust treatment fluid into the exhaust stream before the exhaust stream passes through SCR 732. A sufficient intermingling of the exhaust and exhaust treatment fluid should occur to optimize the removal of $NO_x$ from the exhaust stream before the mixture passes through SCR 732. To assist in intermingling of the exhaust stream and the urea exhaust treatment fluid, mixing assembly 718 may be positioned downstream from DOC 714 and upstream of SCR 732. Mixing assembly 718 is positioned proximate dosing module 28 such that dosing module 28 may dose the urea exhaust treatment fluid directly into mixing assembly 718 where it may intermingle with the exhaust stream.

FIGS. 29 and 30 best illustrate mixing assembly 718. Similar to previously described embodiments, mixing assembly 718 includes a decomposition tube 82 including first end portion 84 that may be secured to end cap 722 and second end portion 86 that is positioned proximate DOC 714. Decomposition tube 82 may be substantially cylindrical, with radially expanded portion 88 positioned between the first and second end portions 84 and 86. A flow reversing device 740 at second end portion 86. In addition to decomposition tube 82 being fixed to end cap 722, mixing assembly 718 may be supported within housing 706 by a perforated support plate 742.

Support plate 742 includes an annular central portion 744 surrounding an aperture 746 defined by an axially extending flange 748 that is fixed to decomposition tube 82. An annular outer portion 750 of support plate 742 includes a plurality of through-holes 752 for allowing the exhaust to flow therethrough. Outer portion 750 also includes an axially-extending flange 754 for fixing support plate 742 to housing 706. An axially-extending shoulder portion 756 may be positioned between the annular central portion 744 and annular outer portion 750. Shoulder portion 756 provides a mounting surface for a cylindrical shell 758 of mixing assembly 718. Shell 758 includes a proximal end 760 fixed to shoulder portion 756 and a distal end 762 fixed to flow reversing device 740. A radially extending mounting flange 764 receives an end 766 of outlet 710.

As best shown in FIG. 30, the exhaust flow will enter inlet 708, pass through perforated baffle 725, and enter DOC 714.

After the exhaust exits DOC 714, the exhaust will approach mixing assembly 718. Although not required by the present disclosure, mixing assembly 718 may cup-shaped nose 768 fixed to an outer surface 770 of flow-reversing device 740. Cup-shaped nose 768 may include a conical, hemispherical, or ellipsoid outer surface 772 that, upon contact by the exhaust, directs the exhaust around mixing assembly 718. Cup-shaped nose 768 may also have a concave surface relative to the direction of the exhaust. In addition, cup-shaped nose 768 may have raised or recessed features (e.g., bumps or dimples, not shown) formed on outer surface 772. Although cup-shaped nose 768 is illustrated as being fixed to flow-reversing device 740, it should be understood that cup-shaped nose 768 can be supported by a support plate (not shown) at a position proximate flow-reversing device 740. For example, a support plate similar to support plate 742 having through-holes 752 to allow for exhaust flow may be used, with annular central portion 744 defining cup-shaped nose 768 rather than aperture 746.

After passing around mixing assembly 718, the exhaust will pass through through-holes 752 of support plate 742. After passing through support plate 742, the exhaust may enter mixing assembly 718 through perforations 96 and 100. To assist in feeding the exhaust gas into mixing assembly 718, end cap 722 may define curved surfaces (i.e., similar to flow-reversing device 740, not shown) that direct the exhaust into mixing assembly 718. After entering decomposition tube 82, the exhaust flow will be exposed to the exhaust treatment fluid (e.g., urea) dosed into mixing assembly 718 by dosing module 28. As the exhaust flows through decomposition tube 82, the exhaust will be directed in a reverse direction by flow reversing device 740 into shell 758. The exhaust may then exit shell 758 through outlet 710 and enter exhaust treatment component 704 where SCR 732 and ammonia slip catalyst 734 are located.

According the above-described configuration, the exhaust flow will be forced to reverse direction within exhaust treatment component 702 twice. That is, the exhaust flow will firstly reverse direction as it enters mixing assembly 718, and the exhaust will secondly reverse direction due to contact with flow-reversing device 740. Due to the exhaust flow reversing in direction twice as it travels through exhaust treatment component 702, the exhaust flow will become tortuous, which increases the ability to intermingle the exhaust treatment fluid with the exhaust before the exhaust enters SCR 732. Due to the increased intermingling of the exhaust treatment fluid and the exhaust, the efficacy of SCR 732 in removing $NO_x$ from the exhaust can be increased.

Although not illustrated in FIGS. 29 and 30, it should be understood that flow-reversing device 740 may include deflecting members such as vanes 114. Alternatively, any of mixing assemblies 200, 300, 400, and 500 may be used in exhaust treatment component 702 without departing from the scope of the present disclosure.

Figure 31:
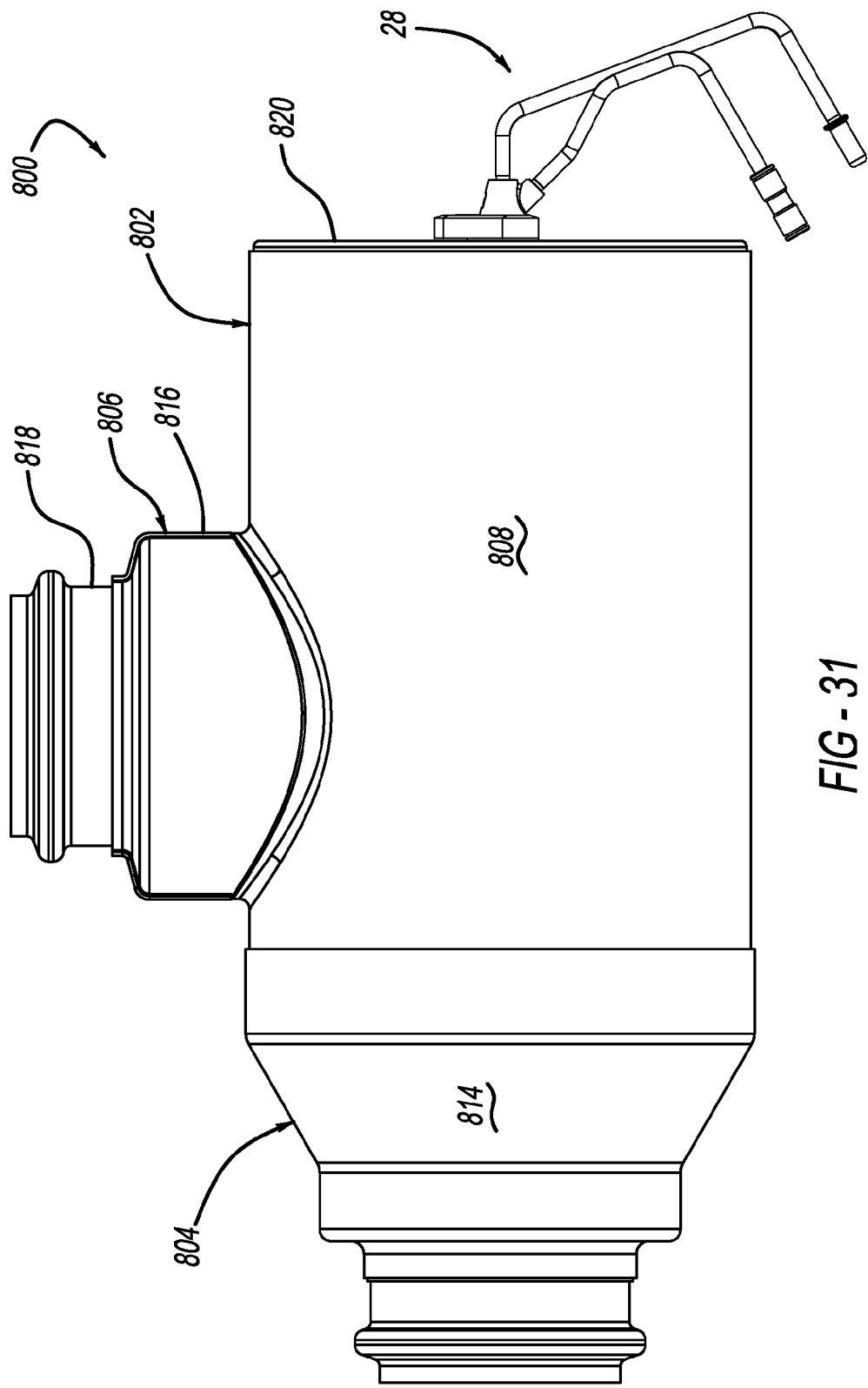
FIG. 31 is a side-perspective view of an exhaust treatment component according to a principle of the present disclosure.
Figure 32:
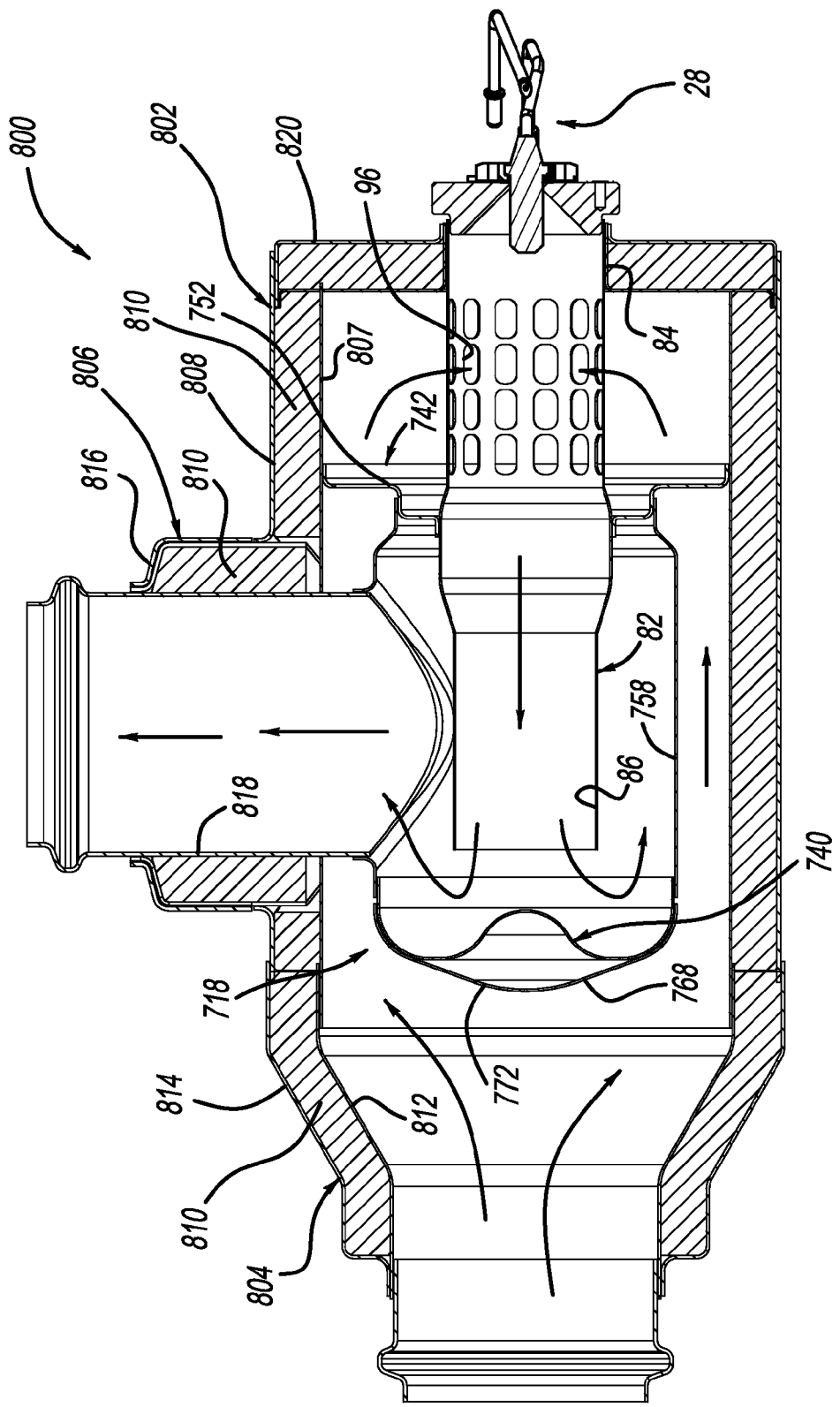
FIG. 32 is a cross-sectional view of the exhaust treatment component illustrated in FIG. 31.

Now referring to FIGS. 31 and 32, an exhaust treatment component 800 is illustrated. Exhaust treatment component 800 includes a housing 802, an inlet 804, and an outlet 806. Housing 802 may include an inner shell 807 and an outer shell 808. An insulating material 810 may be disposed between inner shell 806 and outer shell 808. Inlet 804 may be coupled to exhaust passage 14, and includes an inner cone 812 and an outer cone 814. Insulating material 810 may be disposed between inner cone 812 and outer cone 814. Inner cone 812 may be fixed to inner shell 807, and outer cone 814 may be fixed to outer shell 808. Inner cone 812 may first be fixed to outer cone 814, and then inlet 804 may be fixed to inner and outer shells 807 and 808. Outlet 806 may include an outer sleeve 816 fixed to outer shell 808, and an inner sleeve 818. Inner sleeve 818 may be constructed of one or more sections that are hermetically sealed. Insulating material 810 may be disposed between inner sleeve 818 and outer sleeve 816. Outlet 806 may extend radially outward from housing 802, while inlet 804 may be co-axial with housing 802.

An end cap 820 may be coupled to housing 802 at an end of housing 802 opposite to inlet 804. Dosing module 28 may be positioned on end cap 820 (or on an additional flange (not shown) at a location proximate outlet 806. As in previously described embodiments, dosing module 28 is operable to inject a reductant such as a urea exhaust treatment fluid into the exhaust stream before the exhaust stream passes through an SCR (not shown). A sufficient intermingling of the exhaust and exhaust treatment fluid should occur to optimize the removal of $NO_x$ from the exhaust stream before the mixture passes through the SCR. To assist in intermingling of the exhaust stream and the urea exhaust treatment fluid, mixing assembly 718 may be positioned between inlet 804 and outlet 806. Mixing assembly 718 is positioned proximate dosing module 28 such that dosing module 28 may dose the exhaust treatment fluid directly into mixing assembly 718 where it may intermingle with the exhaust stream.

FIG. 32 best illustrates mixing assembly 718 within exhaust treatment component 800. Mixing assembly 718 includes a decomposition tube 82 including first end portion 84 that may be secured to end cap 820 and second end portion 86 that is positioned proximate inlet 804. The exhaust flow will enter inlet 804 and approach mixing assembly 718. Although not required by the present disclosure, mixing assembly 718 may include cup-shaped nose 768 fixed to an outer surface 770 of flow-reversing device 740. Cup-shaped nose 768 may include a conical, hemispherical, or ellipsoid outer surface 772 that, upon contact by the exhaust, directs the exhaust around mixing assembly 718. Cup-shaped nose 768 may also have a concave surface relative to the direction of the exhaust. In addition, cup-shaped nose 768 may have raised or recessed features (e.g., bumps or dimples, not shown) formed on outer surface 772. After passing around mixing assembly 718, the exhaust will pass through through-holes 752 of support plate 742. After passing through support plate 742, the exhaust may enter mixing assembly 718 through perforations 96. Although mixing assembly 718 is illustrated in FIG. 32 as not including perforated collar 98, it should be understood that the illustrated embodiment may include perforated collar 98 without departing from the scope of the present disclosure.

After entering decomposition tube 82, the exhaust flow will be exposed to the exhaust treatment fluid (e.g., urea) dosed into mixing assembly 718 by dosing module 28. As the exhaust flows through decomposition tube 82, the exhaust will be directed in a reverse direction by flow reversing device 740 into shell 758. The exhaust may then exit shell 758 through outlet 806 and enter another exhaust treatment component (e.g., exhaust treatment component illustrated in FIG. 24) where an SCR may be located.

Although not illustrated in FIG. 32, it should be understood that flow-reversing device 740 may include deflecting members such as vanes 114. Alternatively, any of mixing assemblies 200, 300, 400, and 500 may be used in exhaust treatment component 800 without departing from the scope of the present disclosure.

According the above-described configuration, the exhaust flow will be forced to reverse direction within exhaust treatment component 800 twice. That is, the exhaust flow will firstly reverse direction as it enters mixing assembly 718, and the exhaust will secondly reverse direction due to contact with flow-reversing device 740. Due to the exhaust flow reversing in direction twice as it travels through exhaust treatment component 800, the exhaust flow will become tortuous, which increases the ability to intermingle the exhaust treatment fluid with the exhaust before the exhaust enters an SCR. Due to the increased intermingling of the exhaust treatment fluid and the exhaust, the efficacy of the SCR in removing $NO_x$ from the exhaust can be increased.

Moreover, it should be understood that exhaust treatment component 800 does not include a DOC, DPF, SCR, or some other type of exhaust treatment substrate. Without any of these devices, component 800 may be made to be compact. Such a design allows for existing exhaust after-treatment systems including an SCR to be retro-fit with component 800 to assist in increasing intermingling of the exhaust and urea exhaust treatment fluid.

It should be understood that each of the above-described configurations may be modified, as desired. For example, although inlet 708 illustrated in FIG. 24 is illustrated as having a 90 degree bend, the present disclosure contemplates a co-axial inlet like that illustrated in FIG. 31 (i.e., inlet 804) or a radially-positioned inlet like inlet 728. Similarly, outlet 710 may be replaced by a co-axial outlet (similar to co-axial inlet 804) or an outlet having a 90 degree bend (similar to inlet 708). Similar modifications may be made in component 800, without departing from the scope of the present disclosure.

Figure 33:
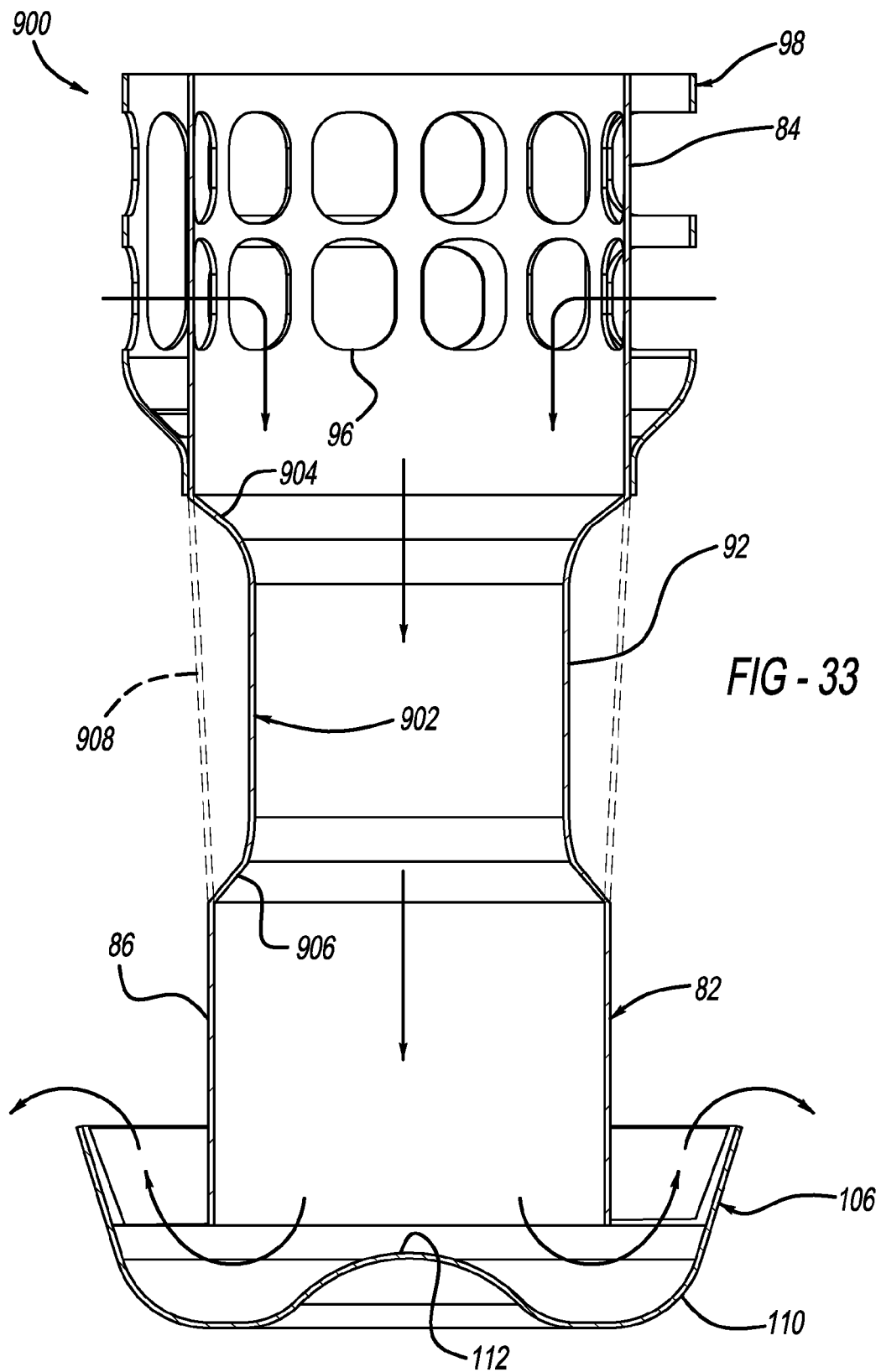
FIG. 33 is a cross-sectional view of a mixing assembly according to a principle of the present disclosure.

FIG. 33 illustrates another mixing assembly 900 according to the present disclosure. Similar to previously described embodiments, mixing assembly 90 includes a decomposition tube 82 including a first end portion 84 that may be secured to end cap 74 and a second end portion 86 that is positioned proximate SCR 70. Decomposition tube 82 may be substantially cylindrical, with a radially narrowed portion 902 positioned between the first and second end portions 84 and 86.

Radially narrowed portion 902 includes a conically-narrowing portion 904 that narrows decomposition tube 82, a cylindrical portion 92 downstream from the first conically-narrowing portion 904 having a diameter that is less than that of first and second end portions 84 and 86, and a conically-expanding portion 906 that radially expands decomposition tube 82. It should be understood that first and second end portions 84 and 86 may have different diameters, without departing from the scope of the present disclosure. It should also be understood that the present disclosure does not require conically-expanding portion 906. That is, radially narrowed portion 902 may extend over the entire length of second end portion 86. Radially narrowing decomposition tube 82 results in an increase in the velocity of the exhaust gas as it travels through decomposition tube 82. The increase in velocity assists in atomization of the reagent exhaust treatment fluid.

Although mixing assemblies such as mixing assembly 80 (see e.g., FIG. 9) and mixing assembly 900 (see e.g., FIG. 33) have been described as including either a radially expanded portion 88 or a radially narrowed portion 902, the present disclosure should not be limited thereto. In this regard, it should be understood that the present disclosure contemplates a mixing assembly including an entirely cylindrical decomposition tube 82 where decomposition tube 82 has the same diameter along the entire length thereof. An entirely cylindrical decomposition tube 82 is illustrated, for example, in FIG. 33 at 908.

Now referring to FIGS. 34-37, another exhaust treatment system 1000 will be described. Exhaust treatment system 1000 includes exhaust treatment components 18 and 20, where exhaust treatment component 18 may include a DOC 52 and/or a DPF 56 positioned within a housing 44 and exhaust treatment component 20 may include an SCR 70 and/or an ammonia slip catalyst 72 within a housing 64. A common hood 1002 fluidly and mechanically connects exhaust treatment components 18 and 20.

Hood 1002 includes a peripheral outer surface 1004 defining a connection flange 1006 for connecting to each housing 44 and 64. Connection flange 1006 may be welded to each housing 44 and 64, or connection flange 1006 may be secured to each housing 44 and 64 using a clamp 1005. To prevent exhaust gases from escaping hood 1002 as the exhaust gases travel from exhaust treatment component 18 to exhaust treatment component 20, a solid connection plate 1008 may be positioned between exhaust treatment component 18 and exhaust treatment component 20. Connection plate 1008 may include apertures 1010 for receipt of housings 44 and 64. To ensure a gas-tight fit between connection plate 1008 and housings 44 and 64, connection plate 1008 may be welded to each housing 44 and 64, or a gasket (not shown) may be positioned between housings 44 and 64 and apertures 1010. An end plate 1012 of hood 1002 is integral with peripheral outer surface 1004. End plate 1012 may include a contoured surface 1014 at exhaust treatment component 18 that assists in directing the exhaust gases toward exhaust treatment component 20. In addition, hood 1002 may include a mounting device 1016 for receipt of a dosing module 28 operable to dose reagent exhaust treatment fluid into the exhaust gases.

To assemble exhaust treatment system 1000, connection plate 1008 may be secured to each exhaust treatment component 18 and 20 by welding, or with a gasket (not shown) that allows connection plate 1008 and exhaust treatment components 18 and 20 to be secured by an interference fit therebetween. After connection plate 1008 is secured to exhaust treatment components 18 and 20, hood 1002 may then be secured to exhaust treatment components 18 and 20 and connection plate 1008 by welding or by a clamp (not shown).

Figure 34:
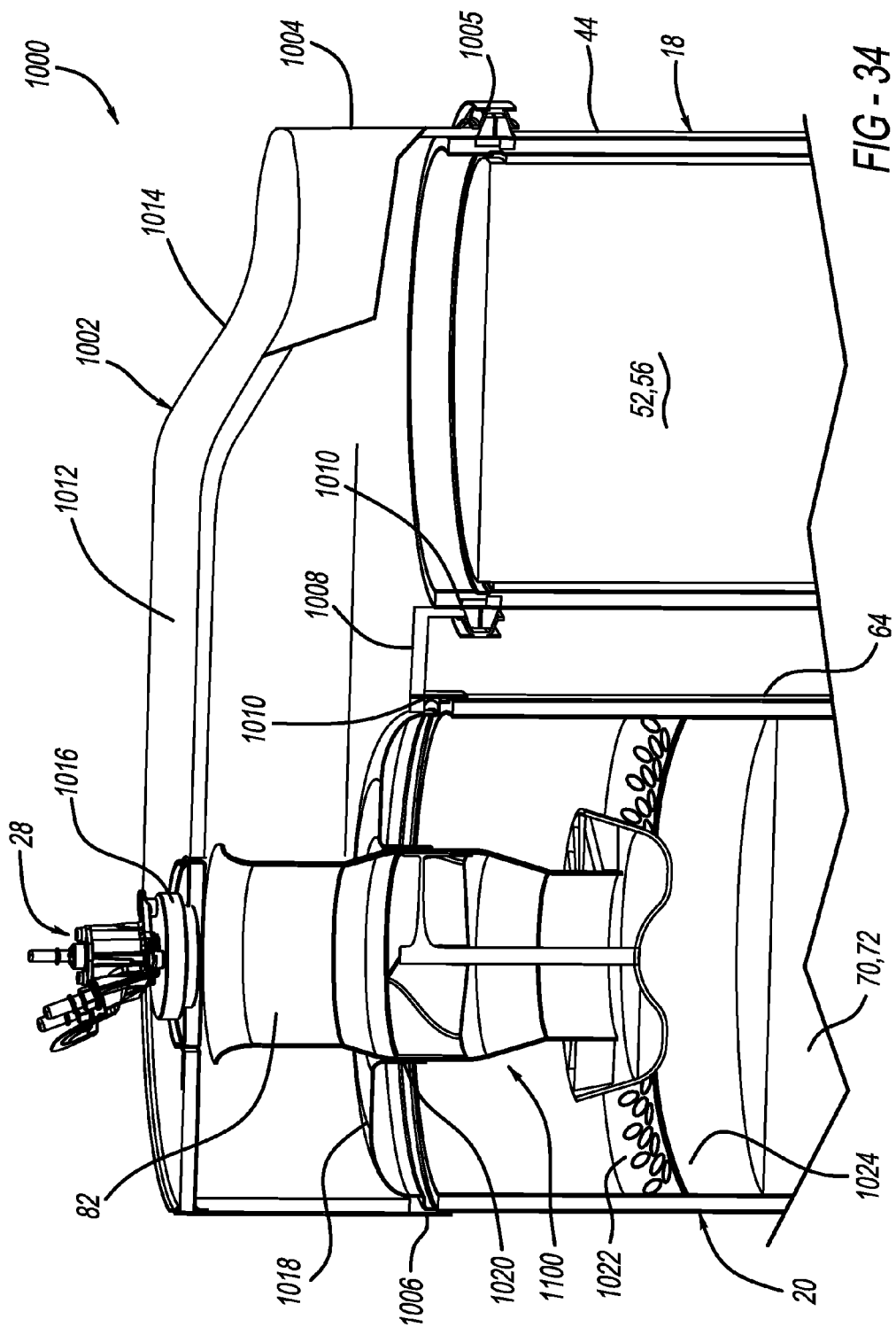
FIG. 34 is a perspective partial cross-sectional view of an exhaust treatment system according to a principle of the present disclosure.

Exhaust treatment system 1000 includes a mixing assembly 1100 positioned upstream from SCR 70 that assists in intermixing the exhaust gases and reagent exhaust treatment fluid. As illustrated in FIG. 34, mixing assembly 1100 extends between hood 1002 and exhaust treatment component 20. To secure mixing assembly 1100 between hood 1002 and exhaust treatment component 20, a solid partition plate 1018 that axially aligns mixing assembly 1100 with SCR 70 may be used. Partition plate 1018 includes a central axially extending flange 1020 that is coupled to decomposition tube 82 of mixing assembly 1100 by welding or any other attachment method known to one skilled in the art. Partition plate 1018 may be secured to housing 64 or may be secured to connection plate 1008. After the exhaust exits mixing assembly 1100, the exhaust gas may pass through a perforated baffle ring 1022 positioned upstream from SCR 70 that further assists in intermingling the exhaust gases and reagent exhaust treatment fluid. Baffle ring 1022 may be secured to an interior surface 1024 of housing 64. Alternatively, baffle ring 1022 can be secured in a separate housing that is coupled to an end of housing 64.

Figure 35:
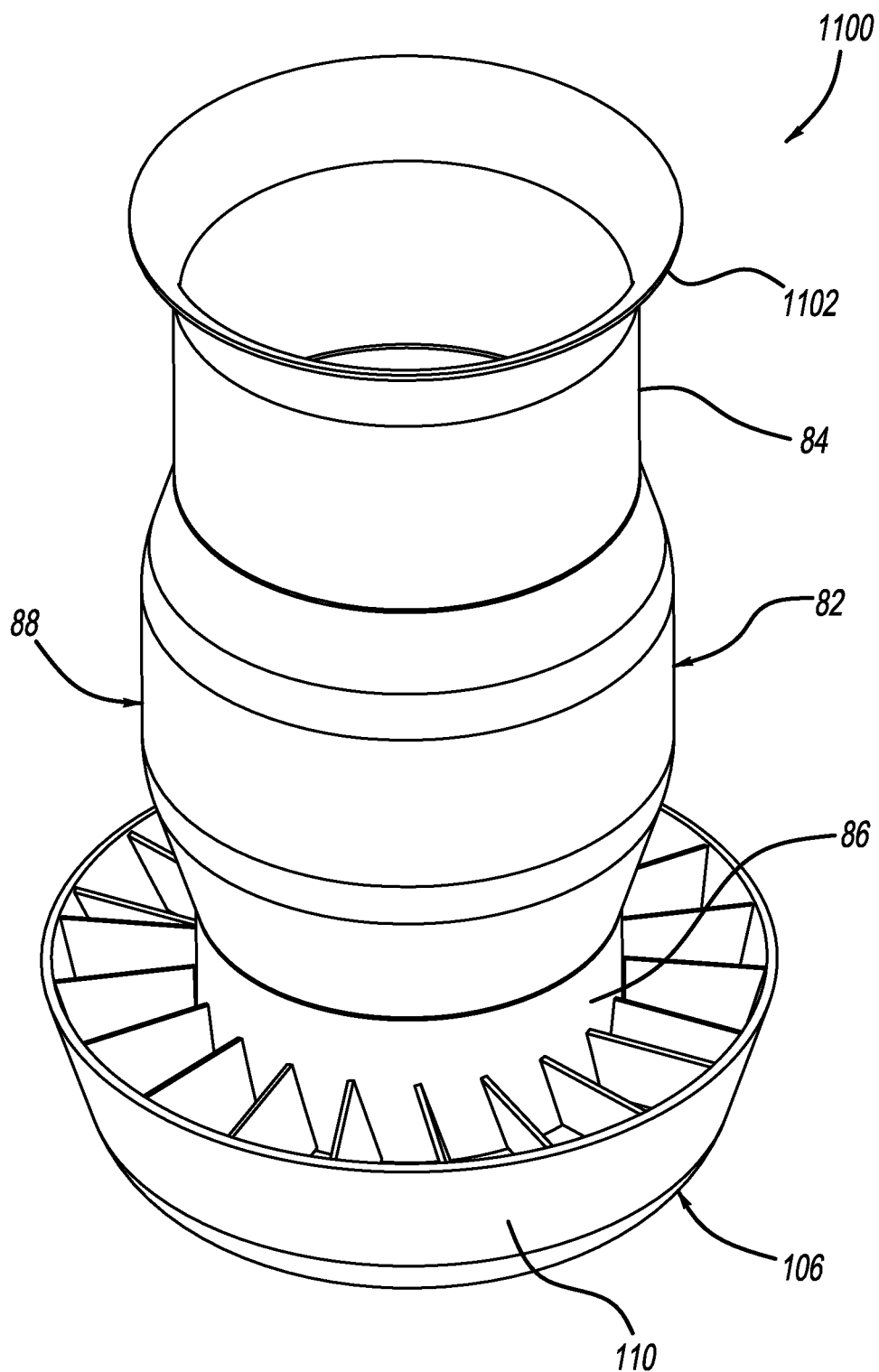
FIG. 35 is a perspective view of a mixing assembly according to a principle of the present disclosure.
Figure 36:
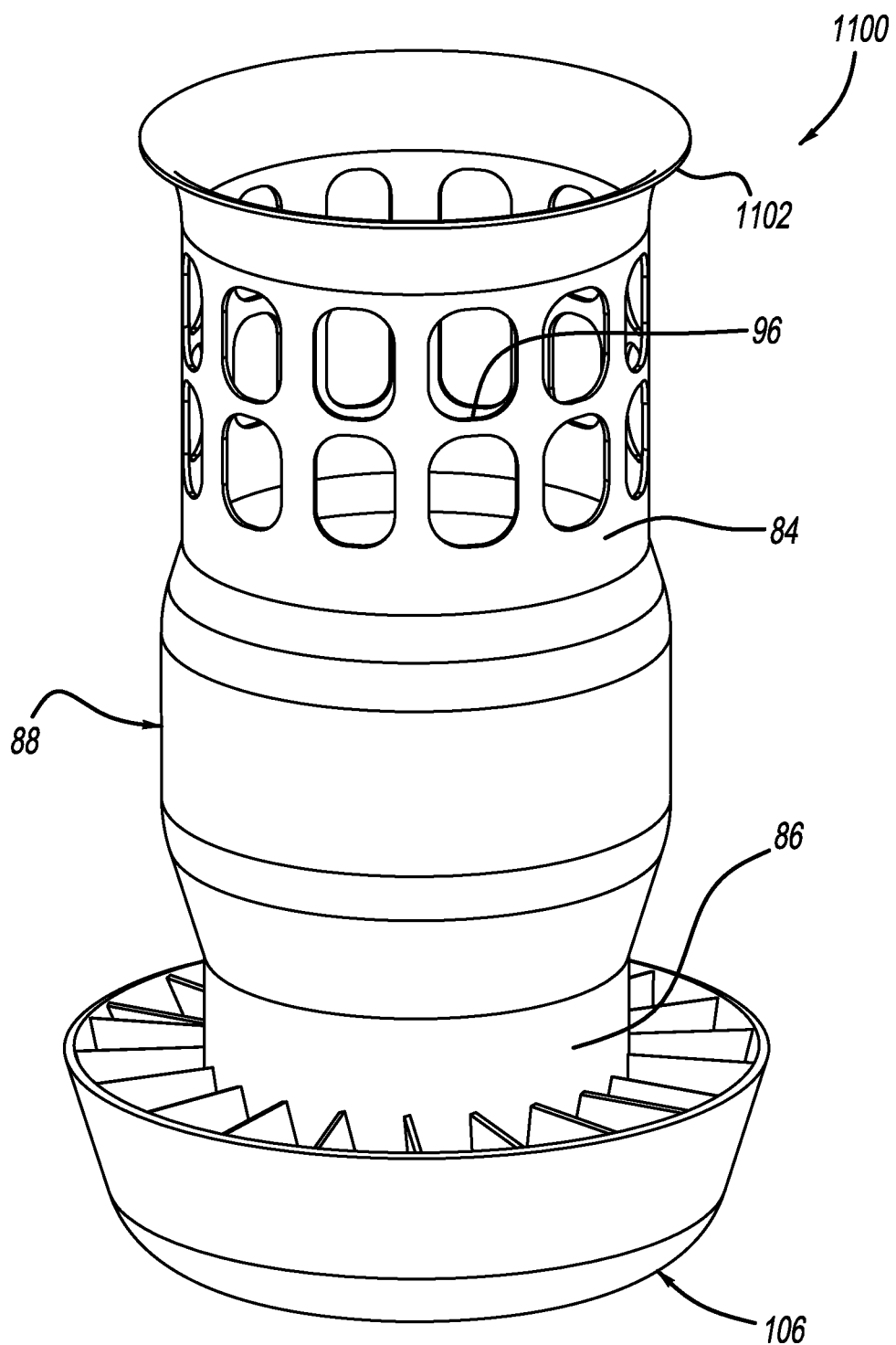
FIG. 36 is a perspective view of a mixing assembly according to a principle of the present disclosure.

As illustrated in FIGS. 35 and 36, mixing assembly 1100 includes decomposition tube 82 with radially expanded portion 88. It should be understood, however, that decomposition tube 82 can be entirely cylindrical or include a radially narrowed portion like mixing assembly 900 illustrated in FIG. 33. Regardless, mixing assembly 1100 is not fixed to end plate 1012 of hood 1002. Rather, mixing assembly 1100 is spaced apart from end plate 1012 of hood 1002.

In accordance with the present disclosure, first end portion 84 of decomposition tube 82 includes a flared edge 1102. Flared edge 1102 increases the diameter of first end 84 of decomposition tube 82, and is designed to increase the ease with which the exhaust gases may enter mixing assembly 1100. By increasing the ease with which the exhaust gases may enter mixing assembly 1100, backpressures within exhaust treatment system 1000 may also be reduced. It should be understood that although FIG. 35 illustrates first end 84 of decomposition tube 82 as being devoid of perforations 96, the present disclosure contemplates the use of perforations 96 in first end 84 as illustrated in FIG. 36.

As in previously described embodiments, perforations 96 can vary in size around the circumference of first end 84, and assist in creating turbulence and increasing velocity of the exhaust stream as it enters decomposition tube 82. Moreover, although not illustrated in FIGS. 35 and 36, it should be understood that mixing assemblies 1100 may also include a perforated collar 98 like that shown in FIG. 9 without departing from the scope of the present disclosure. Similar to previously described embodiments, mixing assemblies 1100 include a flow reversing device 106 at second end 86. Any of the flow reversing devices 106 such as those illustrated in FIGS. 7, 11, 15, 19, and 21 may be used.

Figure 37:
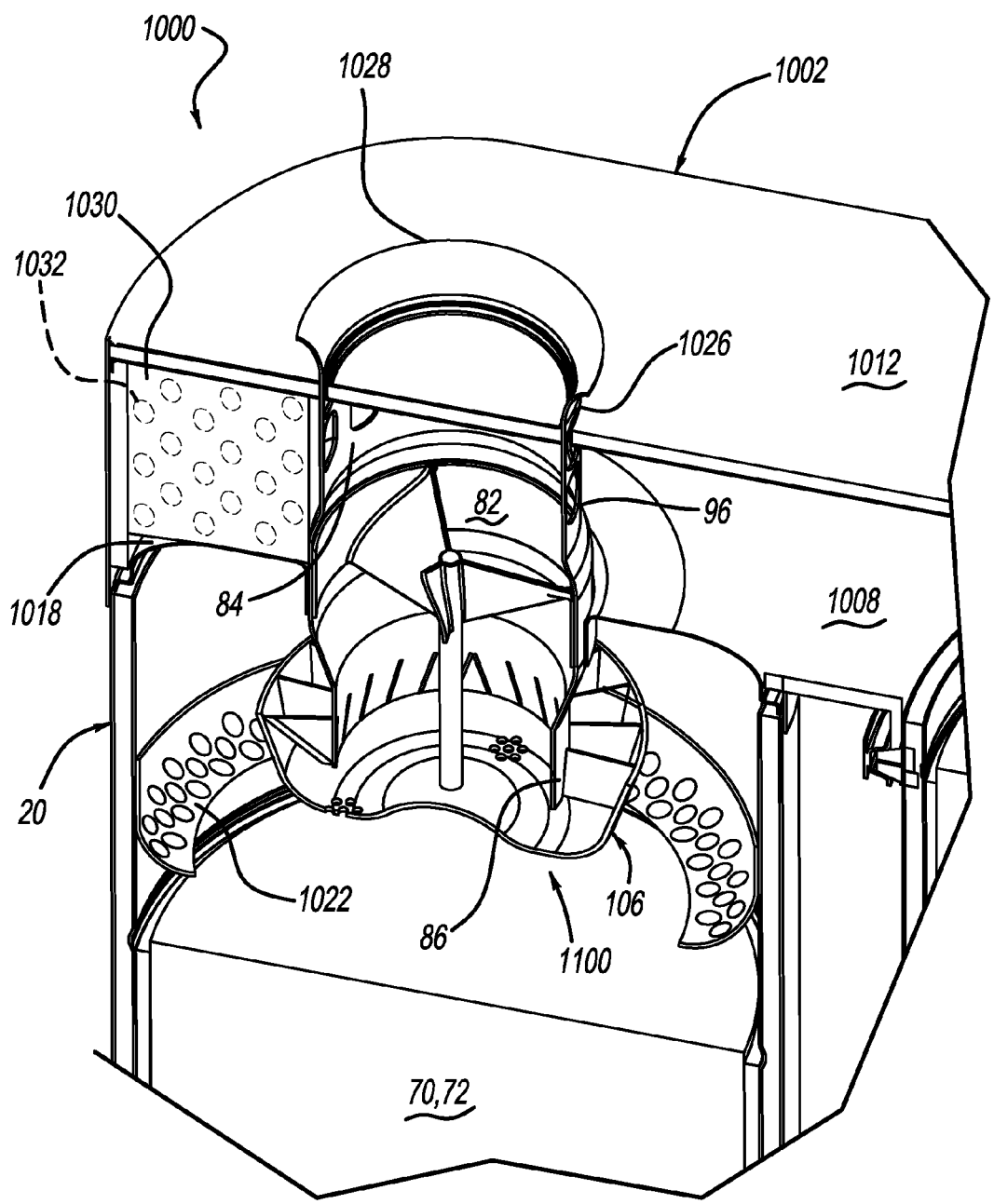
FIG. 37 is a perspective cross-sectional view of a mixing assembly according to a principle of the present disclosure.

Although exhaust treatment system 1000 has been described above as including a mixing assembly 1100 spaced apart from end plate 1012, it should be understood that the present disclosure should not be limited thereto. Specifically, as best shown in FIG. 37, it can be seen that hood 1002 can include an aperture 1026 for receipt of first end portion 84 of decomposition tube 82 such that decomposition tube 82 can be directly attached to end plate 1012 of hood 1002. To mount dosing module (not shown) relative to end plate 1012 and decomposition tube 82, a mounting ring 1028 can be secured to first end portion 84 such that dosing module can dose the reagent exhaust treatment fluid directly into decomposition tube 82.

As illustrated in FIG. 37, a flow distribution plate 1030 can be positioned in hood 1002 relative to first end portion 84 of decomposition tube 82. Flow distribution plate 1030 can be a solid plate, or flow distribution plate 1030 can include a plurality of perforations 1032 as show in phantom. Flow distribution plate 1030 can be secured to either hood 1002 or first end portion 84 of decomposition tube by welding, brazing, or the like. Regardless, flow distribution plate 1030 assists in preventing the exhaust flow from swirling about first end portion 84 of decomposition tube 82 before entering perforations 96 of decomposition tube 82. In other words, flow distribution plate 1030 blocks the flow of exhaust around first end portion 84 and assists in forcing the exhaust to enter decomposition tube 82.

Figure 38:
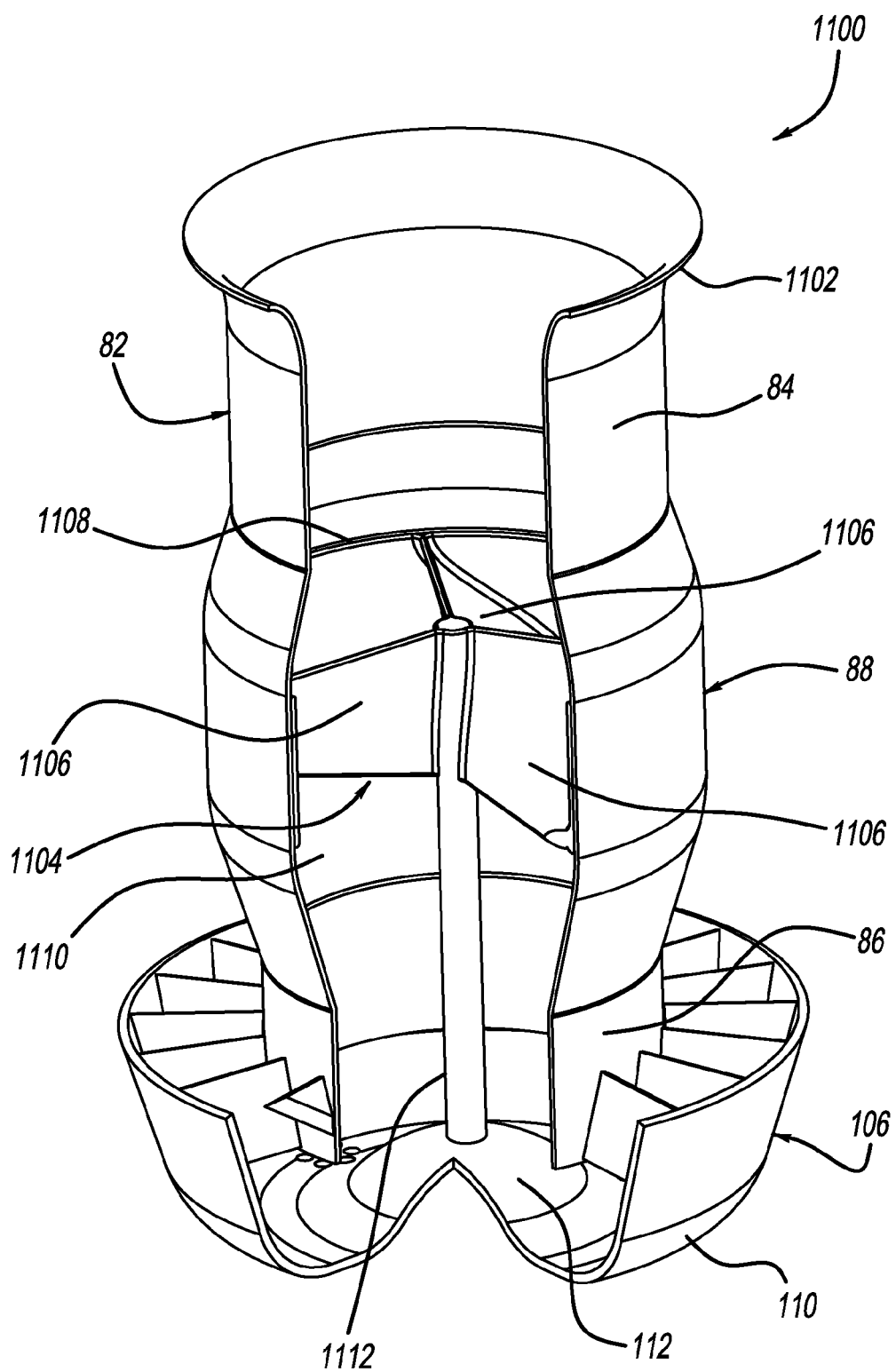
FIG. 38 is a perspective partial cross-sectional view of an exhaust treatment system according to a principle of the present disclosure.

Now referring to FIG. 38, it can be seen that mixing assembly 1100 may additionally include a static mixer 1104 positioned within decomposition tube 82 at a location upstream from flow reversing device 106. Static mixer 1104 may include a plurality of mixing blades 1106 secured within a mounting ring 1108 that is secured by an interference fit or welding to an interior surface 1110 of decomposition tube 82. Preferably, static mixer 1104 is positioned between first end 84 and second end 86 at radially expanded portion 88. Mixing blades 1106 may be slightly twisted to swirl the mixture of exhaust gas and reagent exhaust treatment fluid as the mixture passes through decomposition tube 82. It should be understood, however, that any type of static mixer can be used as is known in the art. Regardless, static mixer 1104 further assists in the intermingling of the exhaust gas and the reagent exhaust treatment fluid.

Static mixer 1104 can include a support rod 1112 that axially extends from mixing blades 1106 in a direction toward flow reversing device 106. Support rod 1112 provides an attachment point for flow reversing device 106 such that flow reversing device 106 may be secured to support rod 1112 by welding, brazing, or the like. The use of support rod 1112 to secure flow reversing device 106 relative to decomposition tube 82 removes the need for a separate support baffle (now shown) that secures flow reversing device 106 to an interior surface of housing 64. It should be understood, however, that static mixer 1104 is not required to include support rod 1112.

Figure 39:
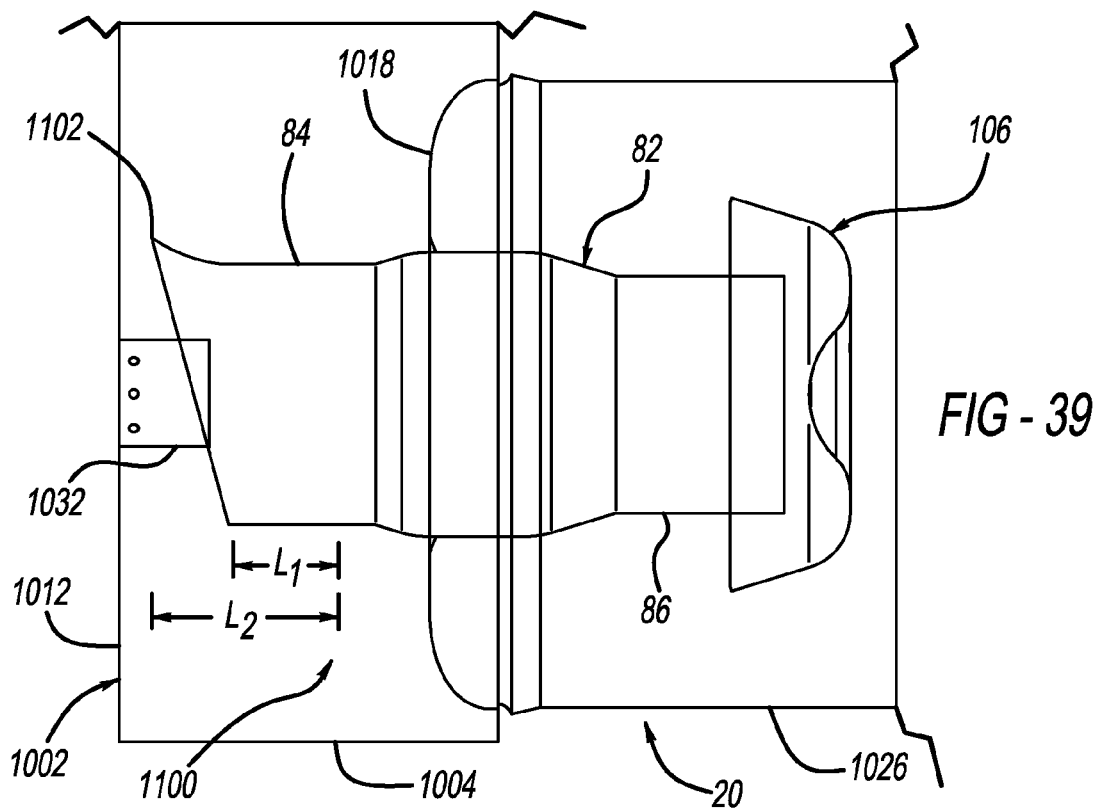
FIG. 39 is a side-perspective view of a mixing assembly according to a principle of the present disclosure.
Figure 40:
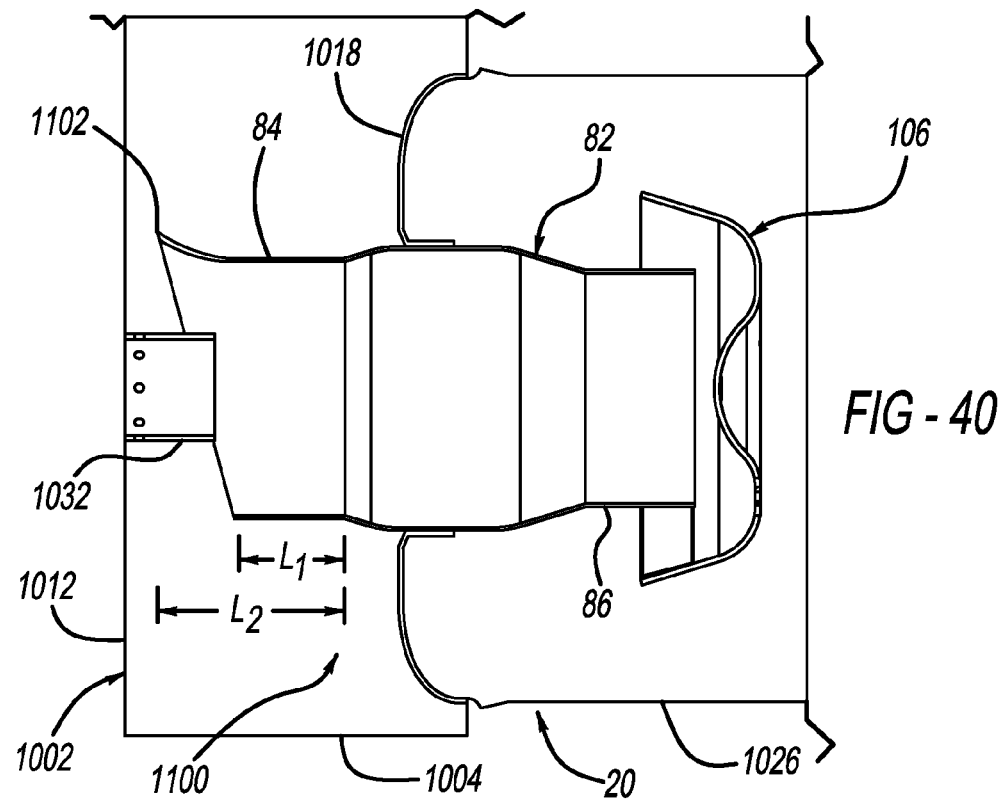
FIG. 40 is a cross-sectional view of the mixing assembly illustrated in FIG. 39.

Now referring to FIGS. 39 and 40, yet another configuration of mixing assembly 1100 is illustrated. Similar to the mixing assemblies illustrated in FIGS. 35-37, mixing assembly 1100 illustrated in FIGS. 39 and 40 is designed to be spaced apart from end plate 1012 of hood 1002. Mixing assembly 1100 differs from those illustrated in FIGS. 35-37 in that first end portion 84 is truncated. In other words, a length L of first end portion 84 is variable in an axial direction along a circumference thereof. More specifically, a length of first end portion 84 along a circumference thereof decrease from flared edge 1102 in a direction toward second end portion 86 such that a length L1 at terminal end of first end portion 84 at flared edge 1102 is greater than a length L2 at a location closer to second end portion 86. The amount that the length of first end portion 84 decreases along a circumference thereof is variable, and can be tuned as necessary. The truncation of first end portion 84 allows the exhaust gases to more easily enter decomposition tube 82, assists in reducing back-pressure in exhaust treatment system 1000, and increases the turbulence with which the exhaust gases enter the decomposition tube 82.

Although not required by the present disclosure, the use of a mixing assembly 1100 with a truncated first end portion 84 can be in combination with a cylindrical spray guide 1032 attached to end plate 1012. Spray guide 1032 ensures that the reagent exhaust treatment fluid fed into the exhaust by dosing module 28 will enter decomposition tube 92. This can be particularly important with the truncated first end portion 84, which has a larger opening in comparison to previously described embodiments and is spaced apart from end plate 1012. It should be understood, however, that cylindrical spray guide 1026 may be used in combination with any mixing assembly that is spaced apart from end plate 1012 to ensure proper entry of the reagent exhaust treatment fluid into decomposition tube 82.

Figure 41:
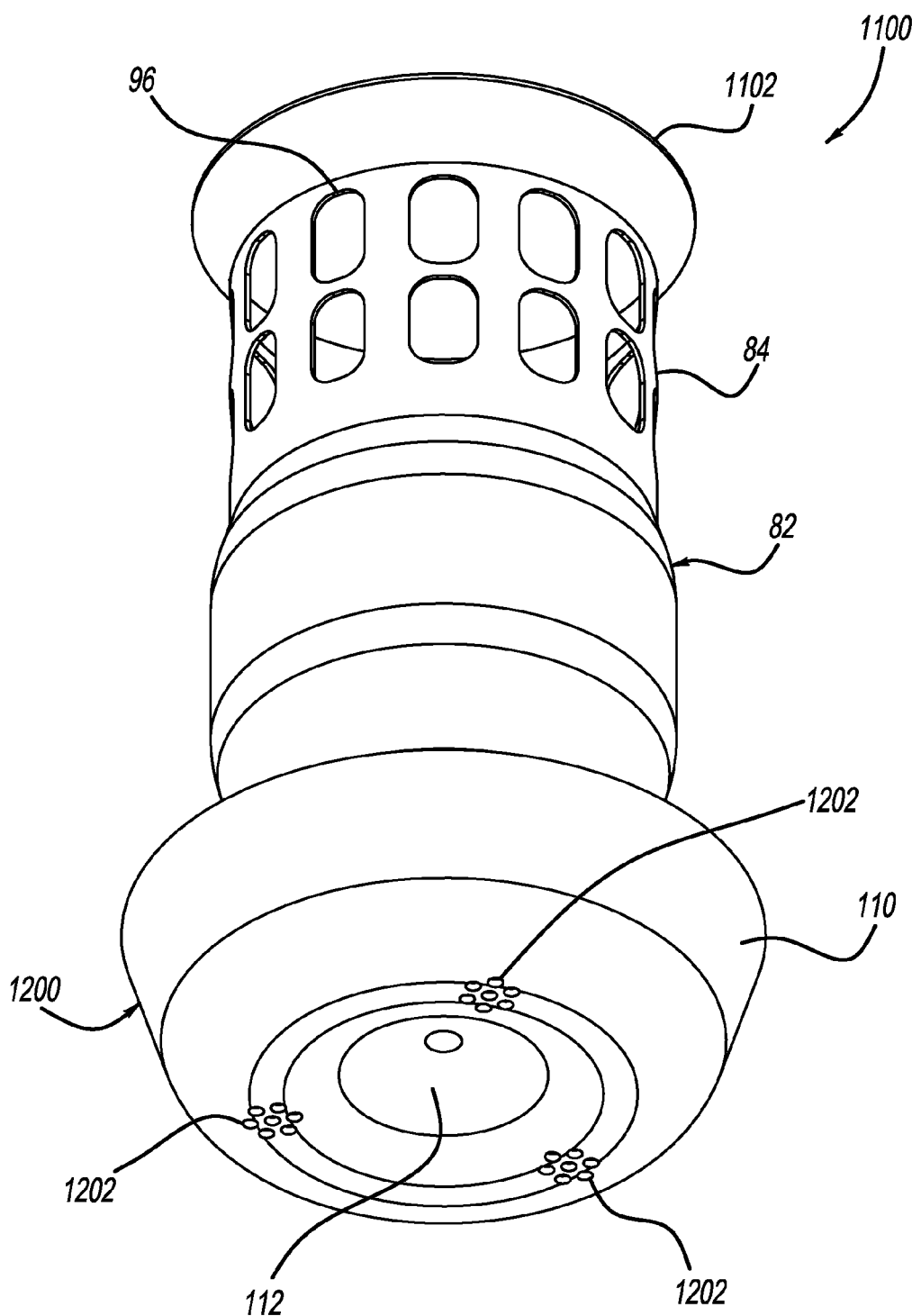
FIG. 41 is a perspective view of a mixing assembly according to a principle of the present disclosure.
Figure 42:
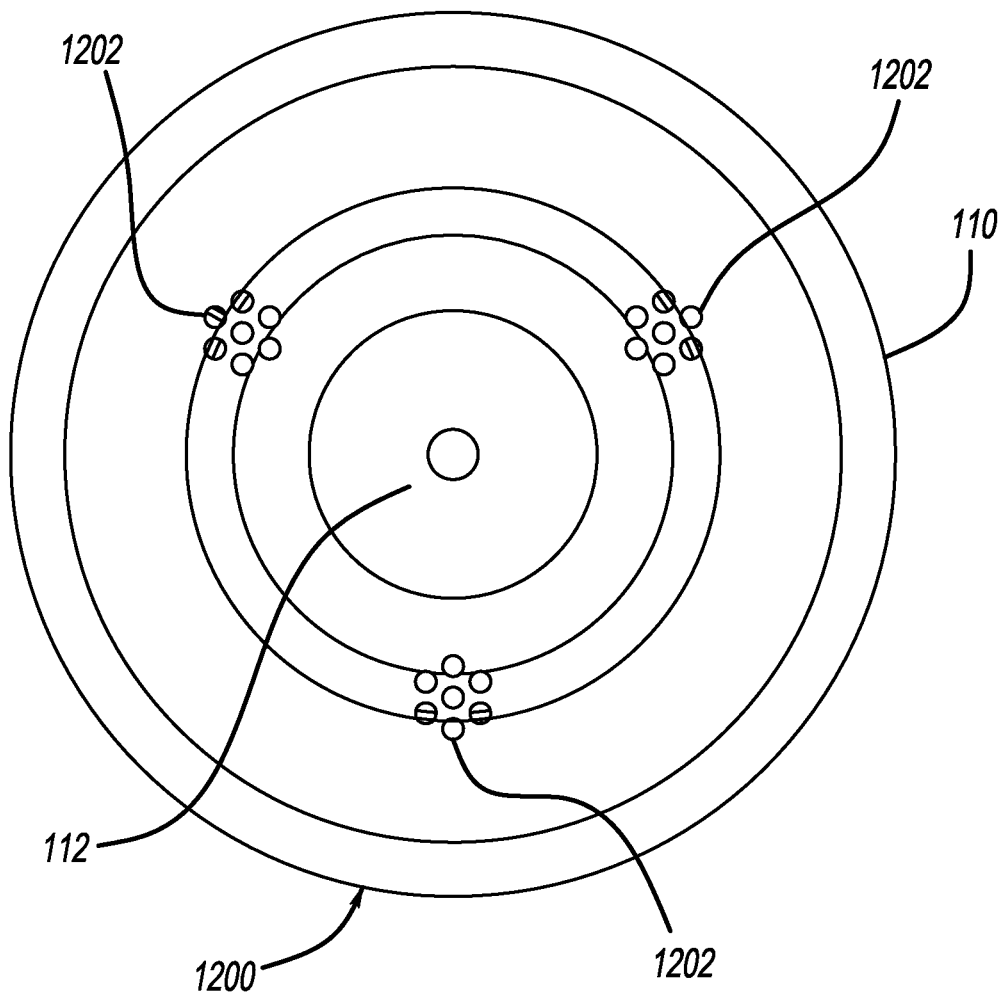
FIG. 42 is a bottom perspective view of the mixing assembly illustrated in FIG. 41.

Now referring to FIGS. 41 and 42, a flow reversing device 1200 will be described. Flow reversing device 1200 is similar to previously described flow reversing device 106 in that flow reversing device 1200 is a substantially cup-shaped member 110 having a central bulge 112 formed therein. Flow reversing device 1200 has a diameter greater than that of second end portion 86 of decomposition tube 82 such that as the exhaust flow enters the cup-shaped member 110, the exhaust flow will be forced to flow in a reverse direction. Reversing the flow direction assists in intermingling of the reagent exhaust treatment fluid and the exhaust stream before the exhaust stream reaches SCR 70. Flow reversing device 1200 may also be configured to include deflecting members like those illustrated in FIGS. 7, 11, 15, 19, and 21.

In accordance with the present disclosure, flow reversing device 1200 may include a plurality of through-holes 1202 formed in a bottom surface 1204 of cup-shaped member 110. Although through-holes 1202 allow a small portion of the exhaust stream to pass through cup-shaped member 110 without reversing direction, through-holes 1202 are designed to allow any reagent exhaust treatment fluid that has not atomized to flow therethrough. By allowing liquid reagent exhaust treatment fluid to pass through cup-shaped member 110, the prevention of urea deposits can be prevented from forming within cup-shaped member 110. In this regard, if liquid reagent exhaust treatment fluid collects within cup-shaped member 110 and subsequently evaporates, urea deposits may form within cup-shaped member 110 that may eventually obstruct exhaust flow from decomposition tube 82 and through flow reversing device 1200. Although flow reversing device 1200 is illustrated as having through-holes 1202, it should be understood that any type of perforation i.e. such as elongate slots is acceptable so long as any liquid reagent exhaust treatment fluid is allowed to pass therethrough.

Now referring to FIGS. 43 and 44, a flow reversing device 1300 will be described. Flow reversing device 1300 is similar to previously described flow reversing device 106 in that flow reversing device 1300 is a substantially cup-shaped member 110 having a central bulge 112 formed therein. Flow reversing device 1300 has a diameter greater than that of second end portion 86 of decomposition tube 82 such that as the exhaust flow enters the cup-shaped member 110, the exhaust flow will be forced to flow in a reverse direction. Reversing the flow direction assists in intermingling of the reagent exhaust treatment fluid and the exhaust stream before the exhaust stream reaches SCR 70.

Flow reversing device 1300 includes a plurality of deflecting members 1302 coupled to an axially extending ring 1304 that is fixed to second end portion 86 of decomposition tube 82. Deflecting members 1302 further assist in intermingling the reagent exhaust treatment fluid and the exhaust stream. Deflecting members 1302 may be formed as a plurality of helically curved vanes 1306 that extend radially outward from ring 1304. Although vanes 1306 are illustrated as being secured to ring 1304, it should be understood that vanes 1306 may be secured to second end portion 86 of decomposition tube 82, without departing from the scope of the present disclosure.

Vanes 1306 induce a high turbulence swirl of the exhaust stream to increase intermingling of the reagent exhaust treatment fluid and the exhaust gases. The high turbulence swirl generated by vanes 1306 results in the reagent exhaust treatment fluid being circumferentially distributed throughout the exhaust stream as it is swirled by vanes 1306. Although six vanes 1306 are illustrated, it should be understood that the number of vanes 1306 is variable. Moreover, the helical pitch of vanes 1306 may also be varied dependent on the amount of swirl desired to be generated. Lastly, it should be understood that flow reversing device 1300 can be used in conjunction with any of the decomposition tubes 82 described including tubes 82 with a radially expanded portion 88, a radially narrowed portion 902, a flared edge 1102, and a truncated first portion 84 (FIG. 39).

FIG. 45 illustrates another exhaust treatment component 1400 according to the present disclosure. Exhaust treatment component 1400 is substantially similar to exhaust treatment component 20 illustrated in FIG. 6. In this regard, exhaust treatment component 1400 may include a housing 64, an inlet 66, and an outlet 68. Inlet 66 communicates with outlet 48 of exhaust treatment component 18, and outlet 68 may be in communication with a downstream section of exhaust passage 14.

Housing 64 can be cylindrically-shaped and may support an SCR 70 and ammonia slip catalyst 72. SCR is preferably located upstream of ammonia slip catalyst 72. Opposing ends of housing 64 can include end caps 74 and 76 to hermetically seal housing 64. End caps 74 and 76 can be slip-fit and welded to housing 64. Alternatively, end caps 74 and 76 can be secured to housing 64 by clamps (not shown). Exhaust from outlet 48 of exhaust treatment component 18 will enter inlet 66, pass through SCR 70 and ammonia slip catalyst 72, and exit outlet 68 before entering the downstream section of exhaust passage 14.

In contrast to exhaust treatment component 20 illustrated in FIG. 6, dosing module 28 may be positioned on a dosing module mount 1402 that is fixed to end cap 74 at a location proximate inlet 66. Although dosing module mount 1402 is illustrated in FIGS. 45 and 45A as being fixed to end cap 74 by welding, brazing, or the like, it should be understood that dosing module mount 1402 can be unitarily formed with end cap 74 without departing from the scope of the present disclosure.

Dosing module mount 1402 includes an aperture 1404 for receipt of dosing module 28, which is operable to inject a reductant such as a urea exhaust treatment fluid into the exhaust stream before the exhaust stream passes through SCR 70. A sufficient intermingling of the exhaust and exhaust treatment fluid should occur to optimize the removal of $NO_x$ from the exhaust stream during as the mixture passes through SCR 70. To assist in intermingling of the exhaust stream and the urea exhaust treatment fluid, mixing assembly 80 may be positioned downstream from inlet 66 and upstream of SCR 70. Mixing assembly 80 is positioned proximate dosing module 28 such that dosing module 28 may dose the urea exhaust treatment fluid directly into mixing assembly 80 where it may intermingle with the exhaust stream.

As previously described, region A experiences low peak exhaust stream velocities in comparison to regions B, C, D, E, and F. Although mixing assembly 80 assists in intermingling the exhaust with the urea exhaust treatment fluid to overcome the low velocities at region A, it is desirable to further mitigate the effect of the initial low velocities at region A on the atomization of the urea exhaust treatment fluid. Exhaust treatment component 1400, therefore, includes ultrasonic transducers 1406 that assist in atomizing the urea exhaust treatment fluid immediately after dosing module 28 doses the exhaust treatment fluid into dosing module mount 1402 and before the urea exhaust treatment fluid enters mixing assembly 80. It should be understood that any mixing assembly previously described may be used in conjunction with exhaust treatment component 1400 without departing from the scope of the present disclosure.

As best shown in FIG. 45A, ultrasonic transducers 1406 are positioned on opposing sides of dosing module mount 1402, and are configured to emit ultrasonic waves 1408 into dosing module mount 1402 in a direction transverse to a direction in which the urea exhaust treatment fluid is dosed into dosing module mount 1402. In this manner, as ultrasonic waves 1408 propagate through dosing module mount 1402, ultrasonic waves 1408 will pass through the urea exhaust treatment fluid and the energy of the ultrasonic waves 1408 will be transferred to the urea exhaust treatment fluid. This assists in atomizing the urea exhaust treatment fluid. Although it is preferable that ultrasonic transducers 1406 emit ultrasonic waves in a direction transverse to the dosing direction, the present disclosure contemplates that ultrasonic transducers 1406 can be configured to emit ultrasonic waves 1408 in directions toward or away from dosing module 28 as well.

Further, it should be understood that the number of ultrasonic transducers 1406 can be greater than two. As shown in FIG. 45B, the ultrasonic transducers 1406 are arranged in rows 1403a and 1403b along dosing module mount 1402 in the axial direction. In addition, although only a pair of rows 1403a and 1403b are illustrated it should be understood than more than two rows 1403 are contemplated. Still further, it should be understood that each row 1403a and 1403b can include a number of ultrasonic transducers 1406 greater than two (e.g., 3, 4, 5, etc.). For example, three ultrasonic transducers 1406 can form each row 1403a and 1403b, with each transducer 1406 being spaced apart by 60 degrees. In addition, the transducers 1406 of upper row 1403a can be offset relative to the transducers 1406 in the lower row 1403b by thirty degrees such that the upper row 1403a is staggered around a periphery of dosing module mount 1402 relative to the transducers 1406 in lower row 1403b. These configurations are desirable when a larger diameter exhaust pipe is used. It should also be understood that dosing module mount 1402 is not necessarily required by the present disclosure. In contrast, it should be understood that ultrasonic transducers 1406 may be mounted to along any position of decomposition tube 82 where it is determined using computational flow dynamics (CFD) that the spray from injector 28 starts to break up due to interaction with the exhaust at high flow conditions. See the transducers 1406 illustrated in phantom in FIG. 45.

Ultrasonic transducers 1406 may communicate with controller 42 so that upon actuation of dosing module 28, ultrasonic transducers 1406 can propagate ultrasonic waves 1408 into dosing module mount 1402. Ultrasonic transducers 1406 can be operated simultaneously with dosing module 28, or may be operated immediately before or following actuation of dosing module 28.

In addition, ultrasonic transducers 1406 can be operated to increase or decrease the amount of ultrasonic energy provided to each ultrasonic wave 1408 based on various exhaust treatment system operating conditions. For example, atomization of the urea exhaust treatment fluid at cold exhaust temperatures is more difficult in comparison to atomization of the exhaust treatment fluid at hot exhaust temperatures. Ultrasonic transducers 1406, therefore, can propagate ultrasonic waves 1408 having a greater amplitude (i.e., energy) or frequency when the exhaust temperatures are low to further assist in atomization. In contrast, when exhaust temperatures are higher, ultrasonic transducers 1406 can propagate ultrasonic waves 1408 having a lower amplitude (i.e., energy) or frequency when the need for assistance in atomizing the urea exhaust treatment fluid is not as great.

Other operating conditions include an amount of NOx in the exhaust stream, a temperature of the exhaust treatment fluid, and the exhaust flow conditions that are based flow uniformity conditions or pipe geometry that are determined using CFD. Regardless, when ultrasonic transducers 1406 are to increase or decrease the amplitude or frequency of the ultrasonic waves 1408 based on a particular exhaust treatment system operating condition, controller 42 receives a signal indicative of the particular operating condition from the respective sensor (e.g., exhaust temperature sensor, NOx sensor, or exhaust treatment fluid sensor). Upon receipt of the signal from the respective sensor, controller 42 is configured to instruct ultrasonic transducers 1406 accordingly.

Now referring to FIG. 46, an exhaust treatment component 1500 substantially similar to exhaust treatment component 20 illustrated in FIGS. 22 and 23 is illustrated. In contrast to exhaust treatment component 20 illustrated in FIGS. 22 and 23, however, dosing module 28 may be positioned on a dosing module mount 1502 that is fixed to second portion 610 of conduit 606. Although dosing module mount 1502 is illustrated in FIG. 46 as being fixed to second portion 610 by welding, brazing, or the like, it should be understood that dosing module mount 1502 can be unitarily formed with second portion 610 without departing from the scope of the present disclosure.

Dosing module mount 1502 includes an aperture 1504 for receipt of dosing module 28, which is operable to inject a reductant such as a urea exhaust treatment fluid into the exhaust stream before the exhaust stream passes through SCR 618. Ultrasonic transducers 1506 are positioned on opposing sides of dosing module mount 1502, and are configured to emit ultrasonic waves 1508 into dosing module mount 1502 in a direction transverse to a direction in which the urea exhaust treatment fluid is dosed into dosing module mount 1502. In this manner, as ultrasonic waves 1508 propagate through dosing module mount 1502, ultrasonic waves 1508 will pass through the urea exhaust treatment fluid and the energy of the ultrasonic waves 1508 will be transferred to the urea exhaust treatment fluid. This assists in atomizing the urea exhaust treatment fluid before travelling through mixing assembly 80. It should be understood that any mixing assembly previously described may be used in conjunction with exhaust treatment component 1500 without departing from the scope of the present disclosure.

Similar to ultrasonic transducers 1406, ultrasonic transducers 1506 may communicate with controller 42 so that upon actuation of dosing module 28, ultrasonic transducers 1506 can propagate ultrasonic waves 1508 into dosing module mount 1502. Ultrasonic transducers 1406 can be operated simultaneously with dosing module 28, or may be operated immediately before or following actuation of dosing module 28. In addition, ultrasonic transducers 1506 can be operated to increase or decrease the amount of ultrasonic energy provided to each ultrasonic wave 1508 based on various exhaust treatment system operating conditions as previously described.

Now referring to FIG. 47, an exhaust treatment component 1600 substantially similar to exhaust treatment component 702 illustrated in FIGS. 25-30 is illustrated. In contrast to exhaust treatment component 702 illustrated in FIGS. 25-30, however, dosing module 28 may be positioned on a dosing module mount 1602 that is fixed to second portion end cap 722 of housing 706. Although dosing module mount 1602 is illustrated in FIG. 47 as being fixed to second portion end cap 722 by welding, brazing, or the like, it should be understood that dosing module mount 1602 can be unitarily formed with second portion end cap 722 without departing from the scope of the present disclosure.

Dosing module mount 1602 includes an aperture 1604 for receipt of dosing module 28, which is operable to inject a reductant such as a urea exhaust treatment fluid into the exhaust stream before the exhaust stream passes through SCR 732. Ultrasonic transducers 1606 are positioned on opposing sides of dosing module mount 1602, and are configured to emit ultrasonic waves 1608 into dosing module mount 1602 in a direction transverse to a direction in which the urea exhaust treatment fluid is dosed into dosing module mount 1602. In this manner, as ultrasonic waves 1608 propagate through dosing module mount 1602, ultrasonic waves 1608 will pass through the urea exhaust treatment fluid and the energy of the ultrasonic waves 1608 will be transferred to the urea exhaust treatment fluid. This assists in atomizing the urea exhaust treatment fluid before travelling through mixing assembly 718. It should be understood that any mixing assembly previously described may be used in conjunction with exhaust treatment component 1600 without departing from the scope of the present disclosure.

Similar to ultrasonic transducers 1406 and 1506, ultrasonic transducers 1606 may communicate with controller 42 so that upon actuation of dosing module 28, ultrasonic transducers 1606 can propagate ultrasonic waves 1608 into dosing module mount 1602. Ultrasonic transducers 1606 can be operated simultaneously with dosing module 28, or may be operated immediately before or following actuation of dosing module 28. In addition, ultrasonic transducers 1606 can be operated to increase or decrease the amount of ultrasonic energy provided to each ultrasonic wave 1608 based on various exhaust treatment system operating conditions as previously described.

Now referring to FIG. 48, an exhaust treatment component 1700 substantially similar to exhaust treatment component 1000 illustrated in FIG. 34 is illustrated. In contrast to exhaust treatment component 1000 illustrated in FIG. 34, however, dosing module 28 may be positioned on a dosing module mount 1702 that is fixed to end plate 1012 of hood 1002. Although dosing module mount 1702 is illustrated in FIG. 48 as being fixed to second portion end plate 1012 by welding, brazing, or the like, it should be understood that dosing module mount 1702 can be unitarily formed with end plate 1012 without departing from the scope of the present disclosure.

Dosing module mount 1702 includes an aperture 1704 for receipt of dosing module 28, which is operable to inject a reductant such as a urea exhaust treatment fluid into the exhaust stream before the exhaust stream passes through SCR 70. Ultrasonic transducers 1706 are positioned on opposing sides of dosing module mount 1702, and are configured to emit ultrasonic waves 1708 into dosing module mount 1702 in a direction transverse to a direction in which the urea exhaust treatment fluid is dosed into dosing module mount 1702. In this manner, as ultrasonic waves 1708 propagate through dosing module mount 1702, ultrasonic waves 1708 will pass through the urea exhaust treatment fluid and the energy of the ultrasonic waves 1708 will be transferred to the urea exhaust treatment fluid. This assists in atomizing the urea exhaust treatment fluid before travelling through mixing assembly 1100. It should be understood that any mixing assembly previously described may be used in conjunction with exhaust treatment component 1700 without departing from the scope of the present disclosure.

Similar to ultrasonic transducers 1406, 1506, and 1606, ultrasonic transducers 1706 may communicate with controller 42 so that upon actuation of dosing module 28, ultrasonic transducers 1706 can propagate ultrasonic waves 1708 into dosing module mount 1702. Ultrasonic transducers 1706 can be operated simultaneously with dosing module 28, or may be operated immediately before or following actuation of dosing module 28. In addition, ultrasonic transducers 1706 can be operated to increase or decrease the amount of ultrasonic energy provided to each ultrasonic wave 1708 based on various exhaust treatment system operating conditions as previously described.

Now referring to FIGS. 49-51, another exhaust treatment system 1800 will be described. Exhaust treatment system 1800 is similar to exhaust treatment system 1000 illustrated in FIG. 34. In this regard, exhaust treatment system 1800 includes exhaust treatment components 18 and 20, where exhaust treatment component 18 may include a DOC 52 and/or a DPF 56 positioned within a housing 44 and exhaust treatment component 20 may include an SCR 70 and/or an ammonia slip catalyst 72 within a housing 64. A common hood 1002 fluidly and mechanically connects exhaust treatment components 18 and 20.

Hood 1002 includes a peripheral outer surface 1004 defining a connection flange 1006 for connecting to each housing 44 and 64. Connection flange 1006 may be welded to each housing 44 and 64, or connection flange 1006 may be secured to each housing 44 and 64 using a clamp 1005. To prevent exhaust gases from escaping hood 1002 as the exhaust gases travel from exhaust treatment component 18 to exhaust treatment component 20, a solid connection plate 1008 may be positioned between exhaust treatment component 18 and exhaust treatment component 20. Connection plate 1008 may include apertures 1010 for receipt of housings 44 and 64. To ensure a gas-tight fit between connection plate 1008 and housings 44 and 64, connection plate 1008 may be welded to each housing 44 and 64, or a gasket (not shown) may be positioned between housings 44 and 64 and apertures 1010. An end plate 1012 of hood 1002 is integral with peripheral outer surface 1004. End plate 1012 may include a contoured surface 1014 at exhaust treatment component 18 that assists in directing the exhaust gases toward exhaust treatment component 20. In addition, hood 1002 may include a mounting device 1016 for receipt of a dosing module 28 operable to dose reagent exhaust treatment fluid into the exhaust gases.

Exhaust treatment system 1800 includes a mixing assembly 1802 positioned upstream from SCR 70 that assists in intermixing the exhaust gases and reagent exhaust treatment fluid. As illustrated in FIG. 49, mixing assembly 1802 extends between hood 1002 and exhaust treatment component 20. To secure mixing assembly 1802 between hood 1002 and exhaust treatment component 20, a solid partition plate 1018 that axially aligns mixing assembly 1802 with SCR 70 may be used. Partition plate 1018 includes a central axially extending flange 1020 that is coupled to decomposition tube 1804 of mixing assembly 1802 by welding or any other attachment method known to one skilled in the art. Partition plate 1018 may be secured to housing 64 or may be secured to connection plate 1008. After the exhaust exits mixing assembly 1802, the exhaust gas may pass through a perforated baffle ring 1022 positioned upstream from SCR 70 that further assists in intermingling the exhaust gases and reagent exhaust treatment fluid. Baffle ring 1022 may be secured to an interior surface 1024 of housing 64. Alternatively, baffle ring 1022 can be secured in a separate housing that is coupled to an end of housing 64.

As illustrated in FIG. 49, mixing assembly 1802 includes decomposition tube 1804 that is devoid of the perforated first end portion 84 utilized in previously-described embodiments (e.g., FIG. 8). Decomposition tube 1804, rather, includes a radially expanded portion 1806 as an inlet at a first end portion 1808 thereof. Radially expanded portion 1806 includes a conically-expanding portion 1810 that expands the decomposition tube 1802, a cylindrical portion 1812 downstream from the conically-expanding portion 1810, and a conically-narrowing portion 1814 that radially narrows decomposition tube 1804. A second end portion 1816 is connected to conically-narrowing portion 1814, and extends toward a flow-reversing device 1818. Although not illustrated, it should be understood that flow-reversing device 1818 can include deflecting members like those in the previously-described above embodiments that assist in creating turbulent flow in the exhaust stream as the exhaust stream flows through flow-reversing device 1818.

In lieu of decomposition tube 1804 including perforated first end portion 84, mixing assembly 1802 includes a perforated swirl device 1820. As best shown in FIGS. 50 and 51, perforated swirl device 1820 includes a perforated cylindrical tube defining an inlet 1822 that includes a plurality of perforations or apertures 1824. Perforations 1824 are illustrated as being staggered about a circumference of inlet 1822, but it should be understood that the arrangement of perforations 1824 and size of the perforations 1824 can vary to assist in creating turbulence and increasing velocity of the exhaust stream as it enters perforated swirl device 1820. In addition, as the exhaust enters inlet 1822, the exhaust will be begin to swirl which, as the reagent exhaust treatment fluid is dosed into the exhaust stream by injector 28, will keep the reagent exhaust treatment fluid suspended along axis A of swirl device 1820 as it travels along axis A toward exhaust treatment component 70, 72. Although not illustrated in FIGS. 50 and 51, it should be understood that perforated swirl device 1820 may also include a perforated collar 98 like that shown in FIG. 9 without departing from the scope of the present disclosure.

A terminal end 1826 of inlet 1822 is configured to be fixed to end plate 1012 at aperture 1026 by welding or the like where injector mounting device 1016 is located so that the urea exhaust treatment fluid can be injected directly into inlet 1822. Alternatively, terminal end 1826 may be spaced apart from end plate 1012 and include a flared edge (not shown) similar to the embodiment illustrated in FIG. 36. Another alternative is for exhaust treatment system 1800 to include dosing module mount that includes ultrasonic transducers like that shown in FIG. 48. In such a configuration, inlet 1822 may be fixed to an opposing surface of end plate 1012 at a location where dosing module mount is fixed to end plate 1012.

A swirl member 1828 is attached to inlet 1822. Swirl member 1828 may be unitary with inlet 1822, or swirl member 1828 can be separately manufactured and then fixed to inlet 1822 by welding, brazing, or the like. Swirl member 1828 is preferably fixed to first end portion 1808 of decomposition tube 1804 by welding, brazing, or the like. Alternatively, swirl member 1828 may extend into decomposition tube 1804 (not shown). In such a configuration, however, it should be understood that a support baffle (not shown) will be required to support swirl device 1820. Regardless, swirl member 1828 is a collar-like member that conically expands outward from inlet 1822 and includes a plurality of apertures that allows a portion of the exhaust to bypass inlet 1822 and enter decomposition tube 1804. Specifically, swirl member 1828 includes a plurality of tabs 1830 separated by elongate slots 1832. Slots 1832 are illustrated in FIGS. 50 and 51 as including a first portion 1832*a* and a second portion 1832*b*, with an obtuse angle being defined between first portion 1832*a* and 1832*b*. It should be understood, however, that slot 1832 can be linear or extend substantially co-axially with an axis A of swirl member 1828 without departing from the scope of the present disclosure.

Tabs 1830 each include a main body portion 1834 that assists in defining the conical expansion of swirl member 1828 outward from inlet 1822. Main body portions 1834 include a first end 1836 attached to inlet 1822, and a second end 1838 distal from inlet 1822. As illustrated in FIGS. 50 and 51, second ends 1838 are bent relative to first ends 1836 in a radially inward direction.

Tabs 1830 also each include a swirl portion 1840 that extend in the circumferential direction about swirl member 1828. In other words swirl portions 1840 extend axially away from main body portion 1834 in a downstream direction. Swirl portions 1840 are bent in an axially downward direction relative to main body portions 1834, and are designed to induce a swirl in the exhaust stream as it passes over swirl portions 1840. Each swirl portion 1840 can be identically bent relative main body portions 1834, or each swirl portion 1840 can be bent to a different degree relative to main body portion 1834 in comparison to other tabs 1830 of swirl device 1822. That is, it should be understood that the orientation of each swirl portion 1840 can be individually tailored, as desired. Further, it should be understood that swirl portions 1840 may be helically twisted to swirl the mixture of exhaust gas and reagent exhaust treatment fluid as the mixture passes through decomposition tube 1804. Regardless, swirl member 1828 further assists in the intermingling of the exhaust gas and the reagent exhaust treatment fluid as it passes through decomposition tube before reaching flow-reversing device 1818, and also maintains the reagent exhaust treatment fluid suspended along axis A away from walls of decomposition tube 1804. This prevents, or at least substantially minimizes, the build-up of deposits in decomposition tube 1804.

Alternatively, swirl device 1820 may be replaced by swirl device 1820a illustrated in FIG. 52. The swirl device 1820a may include a tubular portion 1821 defining an inlet portion 1822a, and a swirl member 1828a. A first portion of the exhaust gas flowing through the exhaust pipe 12 may flow into the tubular portion 1821 and a second portion of the exhaust gas may flow around the tubular portion 1821 and through the swirl member 1828a. The tubular portion 1821 may include a plurality of openings 1823 and a plurality of deflectors 1825 arranged in rows extending around the diameter of the tubular portion 1821 and in columns extending along an axial length of the tubular portion 1821. The deflectors 1825 may be partially cut or stamped out of the tubular portion 1821 (thereby forming the openings 1823) and bent inward into the tubular portion 1821.

Some of the exhaust may enter the tubular portion 1821 through the openings 1823 and may be directed by the deflectors 1825 in a rotational direction to generate a first swirling flow pattern (e.g., in a clockwise direction) within the tubular portion 1821. This swirling flow pattern facilitates atomization of the reagent exhaust treatment fluid and mixing of the reagent exhaust treatment fluid with the exhaust gas. The swirling flow pattern also restricts or prevents impingement of the reagent exhaust treatment fluid on the surfaces of the tubular portion 1821, which reduces the formation and/or buildup of reductant deposits on the tubular portion 1821. As the reagent/exhaust mixture reaches swirl member 1828a, the tabs 1830a will generate a second swirling flow pattern that may be opposite to that of the first swirling flow pattern (e.g., in a counter-clockwise direction). The opposite flow pattern balances the flow through swirl device 1820a. In some embodiments, the swirl device 1820a may include a hydrolysis coating to further reduce the formation and/or buildup of reductant deposits thereon.

While the deflectors 1825 are shown in FIG. 52 as extending inward into the tubular portion 1821, in some embodiments, the deflectors 1825 may be formed to extend outward from the tubular portion 1821 (not shown). With the deflectors 1825 extending radially outward, the opportunity for reductant deposits to form on the deflectors 1825 may be further reduced, while the swirling flow pattern within the tubular portion 1821 is still able to be effectively generated.

With reference to FIG. 53, another swirl device 1820b is illustrated that may be used instead of the swirl devices 1820 and 1820a. The structure and function of the swirl device 1820b may be similar or identical to that of swirl devices 1820 and 1820a, apart from any differences described below and/or shown in the figure. The swirl device 1820b may include a tubular portion 1821b including a plurality of blades 1827 extending from a downstream end 1829 of the tubular portion 1821b, as well as an upstream portion 1831. As described above with respect to the swirl devices 1820 and 1820a, the swirl device 1820b may induce turbulence in the flow of exhaust gas to facilitate mixing of the reductant with the exhaust gas.

The tubular portion 1821b may a plurality of openings 1823b. While the openings 1823b shown in FIG. 53 have a circular shape, it will be appreciated that the openings 1823b could have any shape, such as rectangular, square, or oval, for example. Furthermore, the size of each opening 1823b and the total number of openings 1823b can vary, as well. The openings 1823b may be arranged in a plurality of parallel rows extending circumferentially around the tubular portion 1821b, or may be misaligned with each other.

The blades 1827 may extend downstream away from the downstream end 1829 of the tubular portion 1821b and radially outward therefrom. The blades 1827 curve as they extend downstream. As shown in FIG. 53, the blades 1827 and the tubular portion 1821b may define a unitary body integrally formed from a common sheet of material. Transitions 1833 between the tubular portion 1821b and the blades 1827 may be smooth, edgeless and/or seamless. That is, the transitions 1833 may not include steps or ridges, for example. The smooth, edgeless transitions 1833 may reduce backpressure in the flow of exhaust through the swirl device 1820b. The smooth, edgeless transitions 1833 may also reduce or prevent the buildup of reductant deposits and/or other deposits on the swirl device 1820b.

In some embodiments, the blades 1827 may include a generally L-shaped cross section or profile. In this manner, a first portion 1835 of each blade 1827 may extend substantially radially outwardly and a second portion 1837 of each blade 1827 may extend substantially in the downstream direction. In some embodiments, the blades 1827 may have a generally helical shape. In some embodiments, the blades 1827 may be generally flattened and angled, rather than helical. The precise number, shape and spacing of the blades 1827 may be varied. The shape and configuration of the blades 127 promote turbulence in the exhaust gas flow while reducing backpressure relative to other blade configurations. That is, the blades 1827 may be designed so that most or all of the structure that increases backpressure will also generate turbulence (i.e., the swirl device 1820b has very little structure that increases backpressure without also increasing turbulence). It will be appreciated that any suitable number, shape and/or spacing may be employed to suit a given application.

With reference to FIG. 54, another swirl device 1820c is illustrated that may be used instead of swirl devices 1820, 1820a, and 1820b. The structure and function of the swirl device 1820c may be similar or identical to that of either of the swirl devices 1820, 1820a, and 1820b, apart from any differences described below and/or shown in the figure. Therefore, similar features will not be described again in detail.

The mixing pipe 1820c may include a tubular portion 1821c and a plurality of blades 1827c. The tubular portion 1821c may include a plurality of openings 1823c. Deflectors 1825c may be partially cut or stamped out of the tubular portion 1821c (thereby forming the openings 1823c) and may extend generally radially outward from the tubular portion 1823c and in a generally upstream direction. As described above, the deflectors 1825c may increase the turbulence of the fluid flow and promote a swirling motion in the fluid flow.

Now referring to FIGS. 55-58, a flow reversing device 1900 will be described. Flow reversing device 1900 is similar to previously described flow reversing device 1300 in that flow reversing device 1900 is a substantially cup-shaped member 110 having a central bulge 112 formed therein. Flow reversing device 1900 has a diameter greater than that of second end portion 86 of decomposition tube 82 such that as the exhaust flow enters the cup-shaped member 110, the exhaust flow will be forced to flow in a reverse direction. Reversing the flow direction assists in intermingling of the reagent exhaust treatment fluid and the exhaust stream before the exhaust stream reaches SCR 70.

Flow reversing device 1900 can include a plurality of deflecting members 1302 coupled to second end portion 86 of decomposition tube 82. Deflecting members 1302 further assist in intermingling the reagent exhaust treatment fluid and the exhaust stream. Deflecting members 1302 may be formed as a plurality of helically curved vanes 1306. Vanes 1306 induce a high turbulence swirl of the exhaust stream to increase intermingling of the reagent exhaust treatment fluid and the exhaust gases. The high turbulence swirl generated by vanes 1306 results in the reagent exhaust treatment fluid being circumferentially distributed throughout the exhaust stream as it is swirled by vanes 1306. It should be understood that the number of vanes 1306 is variable. Moreover, the helical pitch of vanes 1306 may also be varied dependent on the amount of swirl desired to be generated. It should also be understood that flow reversing device 1900 can be used in conjunction with any of the decomposition tubes 82 described previously, including tubes 82 with a radially expanded portion 88, a radially narrowed portion 902, a flared edge 1102 (FIG. 26), a truncated first portion 84 (FIG. 39), and a perforated swirl device 1802 (FIGS. 50-54).

Although the high turbulence swirl generated by vanes 1306 is efficient at intermingling the exhaust treatment fluid with the exhaust stream, the velocity distribution of the exhaust stream after passing over vanes 1306 is affected. To normalize the velocity distribution of the exhaust stream after passing over vanes 1306 in cup-shaped member 110, flow reversing device 1900 includes swirl arrester device 1910 positioned downstream from vanes 1306 in cup-shaped member 110. Swirl arrester device 1910 includes a cylindrical ring 1912 that includes a plurality of radially extending blade members 1914. Blade members 1914 can be unitary with cylindrical ring 1912 such that blade members 1914 are punched from the material that forms cylindrical ring 1912, or blade members 1914 can be separately manufactured and attached to cylindrical ring 1912 by welding, brazing, or the like. Regardless, blade members 1914 are angled or helically twisted relative to cylindrical ring 1912 and are configured to reduce the swirl generated by vanes 1306. The number of blade members 1914 can be varied, dependent on the velocity profiles of the exhaust gases as the exhaust stream exits cup-shaped member 110.

More specifically, it should be understood that blade members 1914 are not configured to reverse the swirl generated by vanes 1306. Rather, blade members 1914 are configured to reduce, stop, or arrest the swirl generated by vanes 1306. In this manner, the velocity profiles of the exhaust gases can be more evenly distributed throughout the exhaust stream, which assists in conducting the selective catalytic reduction of NOx in the exhaust stream as it passes through the SCR substrate. Accordingly, the number of blade members 1914 used to reduce, stop, or arrest the swirl generated by vanes 1306 can be selected such that a reverse swirl is not generated by blade members 1914 during high flow conditions. The number of blade members 1914 selected is based on high flow conditions because the blade members 1914 influence the exhaust flow to a greater extent during high flow conditions in comparison to low flow conditions.

Cylindrical ring 1912 can be coupled to an interior surface of exhaust treatment component 20 with blade members extending radially inward toward cup-shaped member 110 including vanes 1306. Alternatively, blade members 1914 can be coupled to an exterior surface 1916 of cup-shaped member 110 such that cylindrical ring 1912 is spaced apart from the interior surface of exhaust treatment component 20.

Alternatively, as shown in FIGS. 57 and 58, blade members 1914 can be separately manufactured and attached about an interior circumference of exhaust treatment component 20. In this regard, blade members 1914 can be prefabricated and helically twisted (or twisted like a ribbon with 360 degree rotation) as desired before being attached to the interior surface of exhaust treatment component 20 by welding, brazing, or any other attachment method known to one skilled in the art. Blade members 1914 may also include a reinforcing rib 1915 (FIG. 57) that prevents deformation of blade members 1914 during high flow conditions, or a plurality of through holes 1917 that increase turbulence in the exhaust flow. In addition, blade members 1914 can have a width D that changes along a length thereof (FIG. 58). In another alternative embodiment, a twist angle of blade members 1914 can change along a length thereof. Regardless, similar to the above-described embodiment, blade members 1914 are not configured to reverse the swirl generated by vanes 1306. Rather, blade members 1914 are configured to reduce, stop, or arrest the swirl generated by vanes 1306. In this manner, the velocity profiles of the exhaust gases can be more evenly distributed throughout the exhaust stream, which assists in conducting the selective catalytic reduction of NOx in the exhaust stream as it passes through the SCR substrate. Accordingly, the number of blade members 1914 used to reduce, stop, or arrest the swirl generated by vanes 1306 can be selected such that a reverse swirl is not generated by blade members 1914. It should also be understood that individual blade members 1914 can be oriented or shaped to account for a greater or lesser degree of swirl arrest in comparison to the other blade members 1914 based on specific flow characteristics of a particular exhaust after-treatment system.

FIG. 59 illustrates a variation of exhaust treatment component 800. Specifically, exhaust treatment component 800 in FIG. 59 includes an exhaust mixing device 1900a that includes at least one of the swirl arrester devices 1910 described above. Swirl arrester devices 1910 may be positioned within and fixed to decomposition tube 84 to arrest swirling of the exhaust as it enters decomposition tube 84. In another configuration, swirl arrester device 1910 may be positioned downstream from flow reversing device 740 to arrest swirling of the exhaust as it exits reversing device 740. In this regard, cylindrical ring 1912 may be fixed to shell 758. In yet another configuration, swirl arrester device 1910 may be fixed within inner sleeve 818 to arrest swirling of the exhaust before it exits exhaust treatment component 800. As noted above, component 800 includes at least one of the swirl arrester devices 1910. Preferably, component 800 includes at least two of the swirl arrester devices 1910. Most preferably, component 800 includes each of the three swirl arrester devices 1910. Although not illustrated, a swirl arrester device 1910 may be fixed (e.g., welded or monolithically formed) to central bulge 112 (see FIGS. 7-9) of flow reversing device 740.

Now referring to FIGS. 60-61, another exhaust treatment system 2000 will be described. Exhaust system 2000 is similar to exhaust treatment system 1000 illustrated in FIG. 34 in that exhaust system 2000 includes exhaust treatment components 18 and 20, where exhaust treatment component 18 may include a DOC 52 and/or a DPF 56 positioned within a housing 44 and exhaust treatment component 20 may include an SCR 70 and/or an ammonia slip catalyst 72 within a housing 64. A common hood 1002 fluidly and mechanically connects exhaust treatment components 18 and 20.

Exhaust treatment system 2000 includes a mixing assembly 2100 positioned upstream from SCR 70 that assists in intermixing the exhaust gases and reagent exhaust treatment fluid. As illustrated in FIG. 60, mixing assembly 2100 extends between hood 1002 and exhaust treatment component 20. As best shown in FIG. 61, mixing assembly 2100 includes decomposition tube 82 with radially expanded portion 88. It should be understood, however, that decomposition tube 82 can be entirely cylindrical or include a radially narrowed portion like mixing assembly 900 illustrated in FIG. 33. First end portion 84 of decomposition tube 82 may include a flared edge 1102. Flared edge 1102 increases the diameter of first end 84 of decomposition tube 82, and is designed to increase the ease with which the exhaust gases may enter mixing assembly 2100. By increasing the ease with which the exhaust gases may enter mixing assembly 2100, backpressures within exhaust treatment system 2000 may also be reduced. It should be understood that although FIG. 60 illustrates first end 84 of decomposition tube 82 as being devoid of perforations 96, the present disclosure contemplates the use of perforations 96 in first end 84 as illustrated in FIG. 36.

As in previously described embodiments, perforations 96 can vary in size around the circumference of first end 84, and assist in creating turbulence and increasing velocity of the exhaust stream as it enters decomposition tube 82. Moreover, although not illustrated in FIG. 61, it should be understood that mixing assemblies 2100 may also include a perforated collar 98 like that shown in FIG. 9 without departing from the scope of the present disclosure. Similar to previously described embodiments, mixing assembly 2100 includes a flow reversing device 106 at second end 86. Any of the flow reversing devices 106 such as those illustrated in FIGS. 7, 11, 15, 19, 21, 41, 44, and 52 may be used.

Although exhaust treatment system 2000 has been described above as including a mixing assembly 2100 spaced apart from end plate 1012, it should be understood that the present disclosure should not be limited thereto. Specifically, as best shown in FIG. 37, it can be seen that hood 1002 can include an aperture 1026 for receipt of first end portion 84 of decomposition tube 82 such that decomposition tube 82 can be directly attached to end plate 1012 of hood 1002. To mount dosing module (not shown) relative to end plate 1012 and decomposition tube 82, a mounting ring 1028 can be secured to first end portion 84 such that dosing module can dose the reagent exhaust treatment fluid directly into decomposition tube 82.

Mixing assembly 2100 may additionally include a static mixer 2104 positioned within decomposition tube 82 at a location upstream from flow reversing device 106. Static mixer 2104 may include a plurality of mixing blades 2106 secured within a mounting ring 2108 that is secured by an interference fit or welding to an interior surface 2110 of decomposition tube 82. Preferably, static mixer 2104 is positioned between first end 84 and second end 86 at radially expanded portion 88. Mixing blades 2106 may be slightly twisted to swirl the mixture of exhaust gas and reagent exhaust treatment fluid as the mixture passes through decomposition tube 82.

Injector 28 in exhaust treatment system 2000 is configured to dose the exhaust stream with a urea exhaust treatment fluid. Specifically, the injector 28 includes an orifice (not shown) that forms a plurality of spray paths of the urea exhaust treatment fluid. As best shown in FIG. 60, injector 28 is configured to form three (or four, five, six, etc.) conical spray paths 2111 of the urea exhaust treatment fluid when the injector 28 is actuated. With the number of spray paths 2111 in mind, static mixer 2104 can be configured to include a number of mixing blades 2106 that is equal to the number of spray paths 2111. For example, in the exemplary embodiment illustrated in FIG. 61, static mixer 2104 includes three mixing blades 2106 that is equal to the number of spray paths 2111 illustrated in FIG. 60.

Further, mixing blades 2106 can be aligned with spray paths 2111 such that each spray path will impinge on a respective mixing blade 2106 and assist in breaking up large droplets of the urea exhaust treatment fluid. To align each of the spray paths 2111 and the mixing blades 2106, injector 28 is first aligned relative to common hood 1002. In this regard, injector 28 may include an alignment feature (not shown) that may align with an alignment feature (not shown) formed on common hood 1002. Once injector 28 is properly aligned, mixing blades 2106 can be aligned with spray paths 2111.

When mixing blades 2106 are aligned with spray paths 2111, mixing blades 2106 may include a plurality of throughholes 2113 for allowing any collected urea exhaust treatment fluid to pass through mixing blades 2106. In this manner, the formation of urea deposits can be prevented, or at least substantially minimized. It should be understood that the number and/or size of through-holes 2113 can be varied according to system requirements. In addition, it should be understood that through-holes 2113 can be configured to include a louver (not shown) that generates swirl in the exhaust. In an alternative configuration, mixing blades 2106 can be aligned such that spray paths 2111 do not impinge on mixing blades 2106. In such a configuration, it is desirable that flow reversing device 106 include through holes 1202 like those illustrated in FIG. 41 to allow any collected urea exhaust treatment fluid to pass through mixing assembly 2100, if needed. In yet another embodiment illustrated in FIG. 60A, it can be seen that decomposition tube 82 includes a plurality of ultrasonic transducers 1406 that are arranged to correspond to each of the conical flow paths 2111 emitted by injector 28. By clocking the ultrasonic transducers 1406 with the conical flow paths 2111, the break-up and atomization of the reagent exhaust treatment fluid can be enhanced. In such a configuration, it should be understood that static mixer 2104 is not necessarily present.

Static mixer 2104 can include a support rod 2112 that axially extends from mixing blades 2106 in a direction toward flow reversing device 106. Support rod 2112 provides an attachment point for flow reversing device 106 such that flow reversing device 106 may be secured to support rod 2112 by welding, brazing, or the like. The use of support rod 2112 to secure flow reversing device 106 relative to decomposition tube 82 removes the need for a separate support baffle (now shown) that secures flow reversing device 106 to an interior surface of housing 64. It should be understood, however, that static mixer 2104 is not required to include support rod 2112.

Although static mixer 2104 is described above as having a plurality of mixing blades 2106, it should be understood that other types of static mixers can be used as is known in the art. For example, plate mixer or a perforated mixer can be used without departing from the scope of the present disclosure. In addition, a mesh screen can be used without departing from the scope of the present application. More particularly, as best shown in FIG. 62, a static mixer 2104a is illustrated including an outer cylindrical mounting ring 2108a and an inner cylindrical mounting ring 2108b. A plurality of mesh screens 2150 connect outer mounting ring 2108a to inner mounting ring 2108b. Mesh screens 2150 may be round, oval-shaped, or any other shape desired by one skilled in the art so long as each mesh screen 2150 is aligned with a conical spray path 2111 emitted by injector 28. Accordingly, the number of mesh screens 2150 is preferably equal to the number of conical spray paths 2111 emitted by injector 28. In addition, it should be understood that mesh screens 2150 can be shaped like blade members 2106 (e.g., twisted) without departing from the scope of the present disclosure. Similar to static mixer 2104, mixer 2104a is configured to be mounted within decomposition tube 82.

FIGS. 63 and 64 illustrate alternative configurations for the decomposition tubes 82 described in the above-noted exemplary configurations. In this regard, the decomposition tubes 82a and 82b illustrated in FIGS. 63 and 64, respectively, can be used in the configurations illustrated in each of FIGS. 6, 7, 10, 14, 17, 20, 23, 29, 32-38, 41, 43, 45-49, 55, 57, and 59-61 without departing from the scope of the present disclosure. In FIG. 63, decomposition tube 82a includes a first end portion 84a and a second end portion 86a. Decomposition tube 82a may be substantially cylindrical, with a radially expanded portion 88a positioned between the first and second end portions 84a and 86a. Radially expanded portion 88a includes a conically-expanding portion 90a that expands the decomposition tube 82a, a cylindrical portion 92a downstream from the conically-expanding portion 90a having a diameter that is greater than that of first and second end portions 84a and 86a, and a conically-narrowing portion 94a that narrows decomposition tube 82a. It should be understood that first and second end portions 84a and 86a may have different diameters, without departing from the scope of the present disclosure. It should also be understood that the present disclosure does not require conically-narrowing portion 94a. That is, radially expanded portion 88a may extend over the entire length of second end portion 86a.

First end portion 84a includes a plurality of louvered panels 85a. Louvered panels 85a may each include a length L3 that extends substantially along an entire length of first end portion 84a. Louvered panels 85a may be stamped from first end portion 84a, and may be tilted either radially outward or radially inward such that a plurality of elongate slots 87a are formed in first end portion 84a that allow the exhaust gas to enter first end portion 84a. An angle of inclination may be varied for each louvered panel 85a such that each louvered panel 85a is tilted the same amount, or each louvered panel 85a is tilted a different amount. Louvered panels 85a assist in creating a high-velocity swirl within the first end portion 84a such that the mixture of exhaust treatment fluid and the exhaust gases will prevent or substantially prevent impinging of the mixture on an inner surface of the decomposition tube 82a. While first end portion 84a of decomposition tube 82a is illustrated as being cylindrical, it should be understood that first end portion 84a can be cone-shaped without departing from the scope of the present disclosure. Although louvered panels 85a and elongate slots 87a are illustrated as extending axially along a length of the first end portion 84a, it should be understood that louvered panels 85a and elongate slots 87a may be angled around a circumference of first end portion 84a. A size and shape of louvered panels 85a and elongate slots 87a may also be variable.

In FIG. 64, decomposition tube 82b includes a first end portion 84b and a second end portion 86b. Decomposition tube 82b may be substantially cylindrical, with a radially expanded portion 88b positioned between the first and second end portions 84b and 86b. Radially expanded portion 88b includes a conically-expanding portion 90b that expands the decomposition tube 82b, a cylindrical portion 92b downstream from the conically-expanding portion 90b having a diameter that is greater than that of first and second end portions 84b and 86b, and a conically-narrowing portion 94b that narrows decomposition tube 82b. It should be understood that first and second end portions 84b and 86b may have different diameters, without departing from the scope of the present disclosure. It should also be understood that the present disclosure does not require conically-narrowing portion 94b. That is, radially expanded portion 88b may extend over the entire length of second end portion 86b.

First end portion 84b includes a plurality of louvered panels 85b. Louvered panels 85b may each include a length L4 that extends substantially along a half to three-quarters a length of first end portion 84b. Louvered panels 85b may be stamped from first end portion 84b, and may be tilted either radially outward or radially inward such that a plurality of elongate slots 87b are formed in first end portion 84b that allow the exhaust gas to enter first end portion 84b. An angle of inclination may be varied for each louvered panel 85b such that each louvered panel 85b is tilted the same amount, or each louvered panel 85b is tilted a different amount. Louvered panels 85b assist in creating a high-velocity swirl within the first end portion 84b such that the mixture of exhaust treatment fluid and the exhaust gases will prevent or substantially prevent impinging of the mixture on an inner surface of the decomposition tube 82b. While first end portion 84b of decomposition tube 82b is illustrated as being cylindrical, it should be understood that first end portion 84b can be cone-shaped without departing from the scope of the present disclosure. Although louvered panels 85b and elongate slots 87b are illustrated as extending axially along a length of the first end portion 84b, it should be understood that louvered panels 85b and elongate slots 87b may be angled around a circumference of first end portion 84b. A size and shape of louvered panels 85b and elongate slots 87b may also be variable.

Decomposition tube 82b may also include perforations 96b that can vary in size around the circumference of first end portion 84b, and assist in creating turbulence and increasing a velocity of the exhaust stream as it enters decomposition tube 82b. Although perforations 96b are illustrated as being positioned in a pair of rows around a circumference of first portion 84b, it should be understood that perforations 96b can be staggered without departing from the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust after-treatment system for treating an exhaust produced by an engine, comprising:
   an exhaust conduit;
   an injector for dosing a reagent exhaust treatment fluid into the exhaust conduit;
   a swirl device for mixing the reagent exhaust treatment fluid and the exhaust within the exhaust conduit, the swirl device including a cylindrical tube downstream from the injector that defines an inlet for receipt of the reagent exhaust treatment fluid and the exhaust, and a swirl member attached to the cylindrical tube, the swirl member conically expanding outward from the cylindrical tube and including a plurality of tabs separated by elongate slots, the plurality of tabs being configured to swirl the reagent exhaust treatment fluid and a portion of the exhaust and minimize contact between the reagent exhaust treatment fluid and the exhaust conduit; and
   a flow reversing device positioned downstream from the swirl member, the flow reversing device configured to direct a mixture of the exhaust and reagent exhaust treatment fluid as the mixture exits the swirl member in a direction back toward the cylindrical tube.

2. The system of claim 1, wherein the tabs each include a main body portion, the main body portions including a first end attached to the cylindrical tube and a second end distal from the cylindrical tube.

3. The system of claim 2, wherein the tabs each include a swirl portion that extend outward in a circumferential direction of the swirl member.

4. The system of claim 3, wherein the swirl portions extend outward from the main body portion in a downstream direction.

5. The system of claim 3, wherein the swirl portions are bent in an axial direction relative to the main body portions.

6. The system of claim 5, wherein each of the swirl portions are helically twisted.

7. The system of claim 1, wherein each elongate slot includes a first portion and a second portion with an obtuse angle being defined between the first portion and the second portion.

8. The system of claim 1, wherein the cylindrical tube is perforated, or includes a plurality of openings that each include a deflector.

9. An exhaust treatment system for treating an exhaust produced by an engine, comprising:
a first exhaust treatment component;
a common hood that mechanically supports the first exhaust treatment component;
a dosing module mounted to the common hood at a position upstream from the first exhaust treatment component, the dosing module operable to dose a reagent exhaust treatment fluid into the exhaust;
a decomposition tube configured to receive the reagent exhaust treatment fluid dosed by the injector at a position upstream from the first exhaust treatment component;
a cylindrical tube positioned upstream from the decomposition tube defining an inlet for receipt of the reagent exhaust treatment fluid and the exhaust;
a swirl member attached to the cylindrical tube and fixed to a first end of the decomposition tube, the swirl member conically expanding outward from the cylindrical tube and including a plurality of swirl portions separated by slots, the plurality of swirl portions being configured to swirl the reagent exhaust treatment fluid and a portion of the exhaust and minimize contact between the reagent exhaust treatment fluid and the decomposition tube; and
a flow reversing device positioned downstream from the swirl member, the flow reversing device configured to direct a mixture of the exhaust and reagent exhaust treatment fluid as the mixture exits the swirl member in a direction back toward the cylindrical tube.

10. The exhaust treatment system of claim 9, wherein the swirl portions are defined by tabs that each include a main body portion, the main body portions including a first end attached to the cylindrical tube and a second end distal from the cylindrical tube.

11. The exhaust treatment system of claim 10, wherein the tabs each include a portion that extends outward in a circumferential direction of the swirl member.

12. The exhaust treatment system of claim 11, wherein the portions extend axially outward from the main body portions.

13. The exhaust treatment system of claim 11, wherein the portions are bent in an axially downward direction relative to the main body portions.

14. The exhaust treatment system of claim 13, wherein each of the portions are helically twisted.

15. The exhaust treatment system of claim 9, wherein each slot includes a first portion and a second portion with an obtuse angle being defined between the first portion and the second portion.

16. The exhaust treatment system of claim 9, wherein the flow reversing device includes a plurality of deflecting members for intermixing the exhaust and reagent exhaust treatment fluid.

17. The exhaust treatment system of claim 9, wherein the inlet of the cylindrical tube is perforated, or includes a plurality of openings that each include a deflector.

18. An exhaust treatment system for treating an exhaust produced by an engine, comprising:
an exhaust conduit;
a dosing module operable to dose an exhaust treatment fluid into the exhaust conduit;
a decomposition tube downstream from the dosing module, the decomposition tube configured to receive the reagent exhaust treatment fluid dosed by the injector and the exhaust;
a perforated cylindrical tube positioned upstream from the decomposition tube defining an inlet for receipt of the reagent exhaust treatment fluid and a portion of the exhaust, the perforated cylindrical tube being configured to swirl the reagent exhaust treatment fluid and the exhaust and minimize contact between the reagent exhaust treatment fluid and the decomposition tube;
a conically-expanding member fixed to the cylindrical tube and fixed to a first end of the decomposition tube, the conically-expanding member including a plurality of apertures for allowing a portion of the exhaust to bypass the cylindrical tube and enter the decomposition tube; and
a flow reversing device positioned downstream from the decomposition tube, the flow reversing device configured to direct a mixture of the exhaust and reagent exhaust treatment fluid as the mixture exits the decomposition tub in a direction back toward the cylindrical tube.

19. The exhaust treatment system of claim 18, wherein conically-expanding member includes a plurality of tabs that swirl the reagent exhaust treatment fluid and the exhaust and minimize contact between the reagent exhaust treatment fluid and the decomposition tube.

20. The exhaust treatment system of claim 19, wherein the tabs each include a swirl portion that extend outward in a circumferential direction of the swirl member.

21. The exhaust treatment system of claim 19, wherein the swirl portions extend axially outward from the main body portions.

22. The exhaust treatment system of claim 21, wherein the swirl portions are bent in an axially downward direction relative to the main body portions.

23. The exhaust treatment system of claim 22, wherein each of the swirl portions are helically twisted.

24. The exhaust treatment system of claim 18, wherein each aperture includes a first portion and a second portion with an obtuse angle being defined between the first portion and the second portion.

25. The exhaust treatment system of claim 18, wherein the flow reversing device includes a plurality of deflecting members for intermixing the exhaust and reagent exhaust treatment fluid.

26. The exhaust treatment system of claim 18, wherein the perforations of the perforated cylindrical tube each include a deflector.

* * * * *

UNITED STATES PATENT AND TRADEMARK OFFICE
CERTIFICATE OF CORRECTION

PATENT NO.        : 9,352,276 B2                                        Page 1 of 1
APPLICATION NO.   : 14/486213
DATED             : May 31, 2016
INVENTOR(S)       : Sampath It is certified that error appears in the above-identified patent and that said Letters Patent is hereby corrected as shown below:

In the specification,

| | | |
|---|---|---|
| Col. 14, line 60 | : | Delete "806" and insert --807-- |
| Col. 16, line 28 | : | Delete "90" and insert --900-- |
| Col. 19, line 33 | : | Delete "92." and insert --82.-- |
| Col. 19, line 38 | : | Delete "1026" and insert --1032-- |
| Col. 22, line 66 | : | Delete "618." and insert --70.-- |
| Col. 25, line 40 | : | Delete "1802," and insert --1804,-- |
| Col. 26, line 58 | : | Delete "1822." and insert --1820.-- |
| Col. 28, line 24 | : | Delete "127" and insert --1827-- |
| Col. 29, line 14 | : | Delete "1802" and insert --1820-- |
| Col. 30, line 29 | : | Delete "84" and insert --82-- |
| Col. 30, line 30 | : | Delete "84." and insert --82.-- |
| Col. 32, line 58 | : | Delete "2106" and insert --1914-- |

Signed and Sealed this
Second Day of August, 2016

Michelle K. Lee
*Director of the United States Patent and Trademark Office*